(12) United States Patent
Hisada

(10) Patent No.: US 8,755,387 B2
(45) Date of Patent: Jun. 17, 2014

(54) COMMUNICATION SYSTEM AND RELAY APPARATUS

(75) Inventor: Toshiya Hisada, Osaka (JP)

(73) Assignees: Autonetworks Technologies, Ltd., Mie (JP); Sumitomo Wiring Systems, Ltd., Mie (JP); Sumitomo Electric Industries, Ltd., Osaka (JP)

(*) Notice: Subject to any disclaimer, the term of this patent is extended or adjusted under 35 U.S.C. 154(b) by 1066 days.

(21) Appl. No.: 12/678,943

(22) PCT Filed: Oct. 6, 2008

(86) PCT No.: PCT/JP2008/068178
§ 371 (c)(1),
(2), (4) Date: Apr. 1, 2010

(87) PCT Pub. No.: WO2009/044915
PCT Pub. Date: Apr. 9, 2009

(65) Prior Publication Data
US 2010/0215043 A1    Aug. 26, 2010

(30) Foreign Application Priority Data
Oct. 5, 2007   (JP) ................................. 2007-262592

(51) Int. Cl.
H04L 12/28    (2006.01)
(52) U.S. Cl.
USPC ............................ 370/393; 370/406; 370/408
(58) Field of Classification Search
None
See application file for complete search history.

(56) References Cited

U.S. PATENT DOCUMENTS

| | | | |
|---|---|---|---|
| 5,825,749 A * | 10/1998 | Terayama et al. | 370/244 |
| 6,111,888 A | 8/2000 | Green et al. | |
| 6,744,771 B1 | 6/2004 | Barber et al. | |
| 7,518,988 B2 | 4/2009 | Sekihata | |
| 2003/0041138 A1* | 2/2003 | Kampe et al. | 709/223 |
| 2004/0081083 A1 | 4/2004 | Sekihata | |
| 2005/0286539 A1* | 12/2005 | Okuyama | 370/400 |

(Continued)

FOREIGN PATENT DOCUMENTS

| JP | 2004147172 A * | 5/2004 | ............ H04L 12/437 |
|---|---|---|---|
| JP | A-2004-147172 | 5/2004 | |

(Continued)

OTHER PUBLICATIONS

International Search Report issued in International Patent Application No. PCT/JP2008/068178, on Nov. 25, 2008 (with English language translation).

(Continued)

*Primary Examiner* — Ian N Moore
*Assistant Examiner* — Eric P Smith
(74) *Attorney, Agent, or Firm* — Oliff PLC

(57) ABSTRACT

A trunk line topology network is configured with an electronic control units being communication apparatuses transmitting and receiving data, and gateway apparatuses and a distribution apparatus being a specific gateway apparatus that are connected to a communication line being a trunk line, for relaying, through the gateway apparatuses, data transmitted among the electronic control units. The distribution apparatus includes a storage region utilized for a database. The data transmitted from the electronic control units are relayed by the gateway apparatuses and then aggregated by the distribution apparatus. The relayed data are stored once on the database. When transmitting data to the electronic control units, the distribution apparatus reads out data from the database and transmits the data at the adjusted transmission timing. The gateway apparatuses relay the transmitted data.

16 Claims, 40 Drawing Sheets

(56) References Cited

U.S. PATENT DOCUMENTS

| | | | |
|---|---|---|---|
| 2006/0013237 A1* | 1/2006 | Furuta et al. ................ | 370/401 |
| 2006/0095146 A1 | 5/2006 | Hesse et al. | |
| 2006/0168328 A1* | 7/2006 | Shimada et al. ............ | 709/238 |
| 2007/0245204 A1* | 10/2007 | Yomo et al. .................. | 714/749 |
| 2007/0274328 A1* | 11/2007 | Sonoda et al. ............... | 370/401 |

FOREIGN PATENT DOCUMENTS

| JP | A-2005-159568 | 6/2005 | | |
|---|---|---|---|---|
| JP | A-2006-042310 | 2/2006 | | |
| JP | 2007174085 A | * 7/2007 | ............. | H04L 12/46 |
| JP | A-2007-174085 | 7/2007 | | |
| JP | 2007251290 A | * 9/2007 | ............ | H04L 12/437 |
| JP | A-2007-228232 | 9/2007 | | |
| JP | A-2007-251290 | 9/2007 | | |
| JP | B2-4020753 | 10/2007 | | |

OTHER PUBLICATIONS

Bosch, "CAN Specification Version 2.0," 1991.
Sep. 10, 2013 German Office Action issued in German Patent Application No. 11 2008 002 688.2 (with translation).

* cited by examiner

FIG. 3

(a) TRANSMISSION SOURCE INFORMATION

| MESSAGE ID | TRANSMISSION SOURCE ECU |
|---|---|
| 0001 | 2 |
| 0002 | 1 |
| 0003 | 1 |
| ... | ... |
| 0020 | 20 |
| ... | ... |

(b) TRANSMISSION TIMING INFORMATION

| MESSAGE ID | TRANSMISSION DESTINATION ECU | TRANSMISSION TIMING |
|---|---|---|
| 0001 | 1 | EVERY 10 MILLISECONDS |
| 0002 | 3, 10 | EVERY 5 MILLISECONDS |
| ... | ... | ... |
| 0010 | 2 | IN RESPONSE TO CHANGE |
| ... | ... | ... |

(c) CONNECTION INFORMATION

| ECU | TRANSMISSION DESTINATION APPARATUS | COMMUNICATION PORT |
|---|---|---|
| 1 | 2 | 2 |
| 2 | 3 | 1 |
| 3 | 1 | 2 |
| ... | ... | ... |

FIG. 4
(a) UNICAST TRANSMISSION
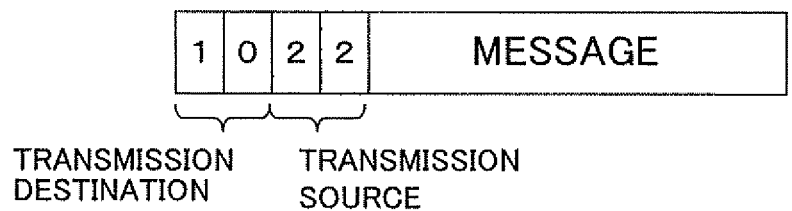
(b) MULTICAST TRANSMISSION
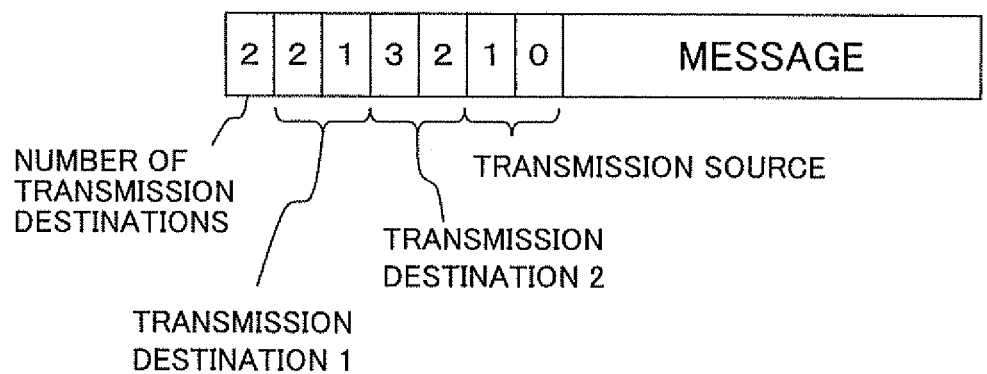

FIG. 8
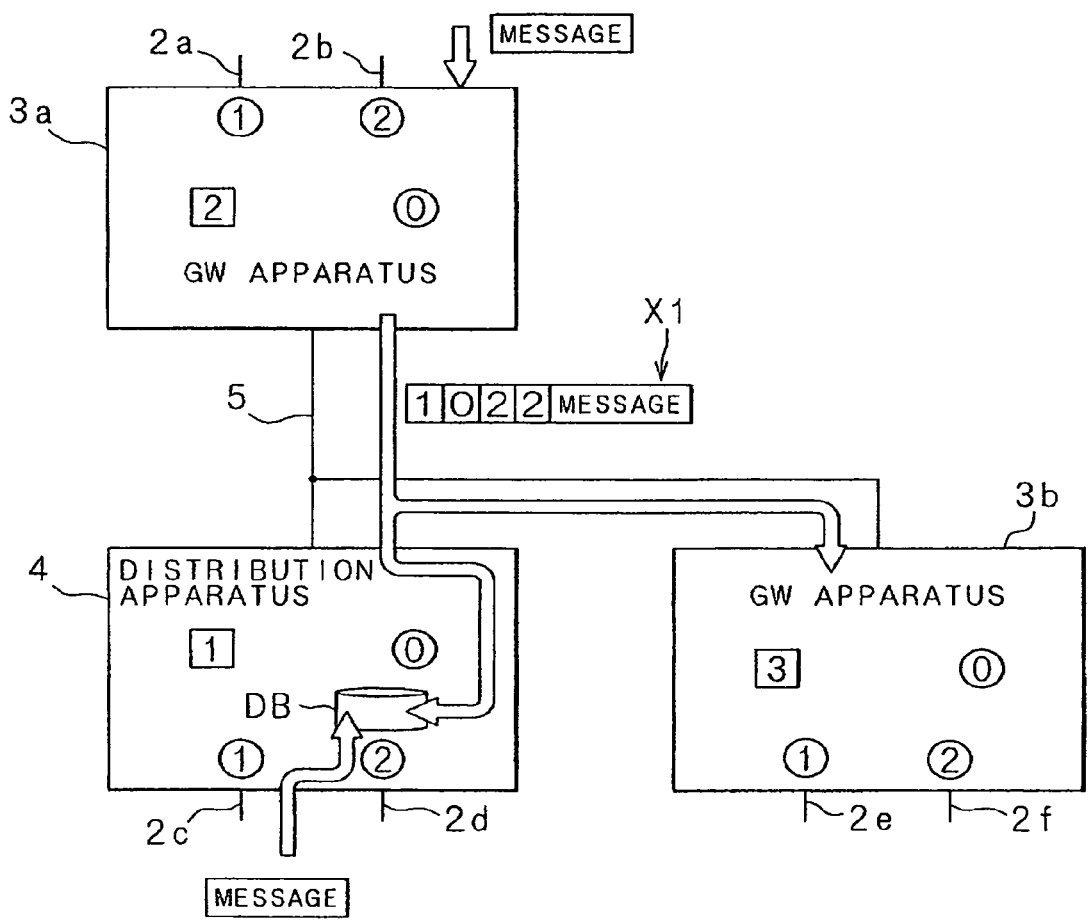
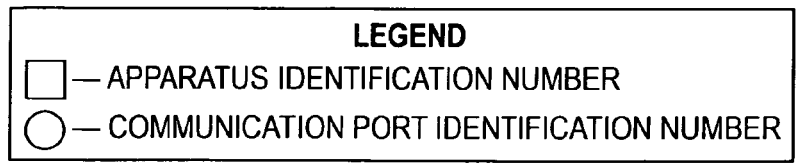

F I G. 1 1
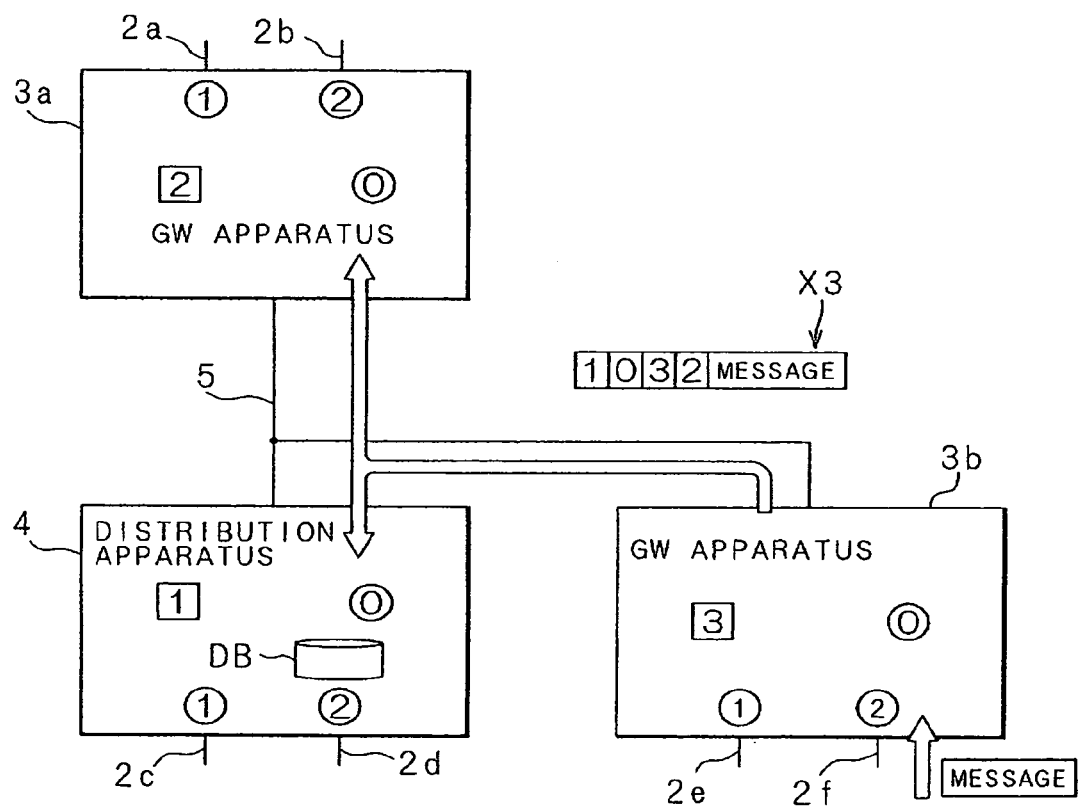

FIG. 12

| ECU | TRANSMISSION DESTINATION APPARATUS | COMMUNICATION PORT |
|---|---|---|
| 1 | 2 | 2 |
| 2 | 3 | 1 |
| 3 | 1 | 2 |
| ... | ... | ... |
| 20 | 3 | 2 |
| ... | ... | ... |

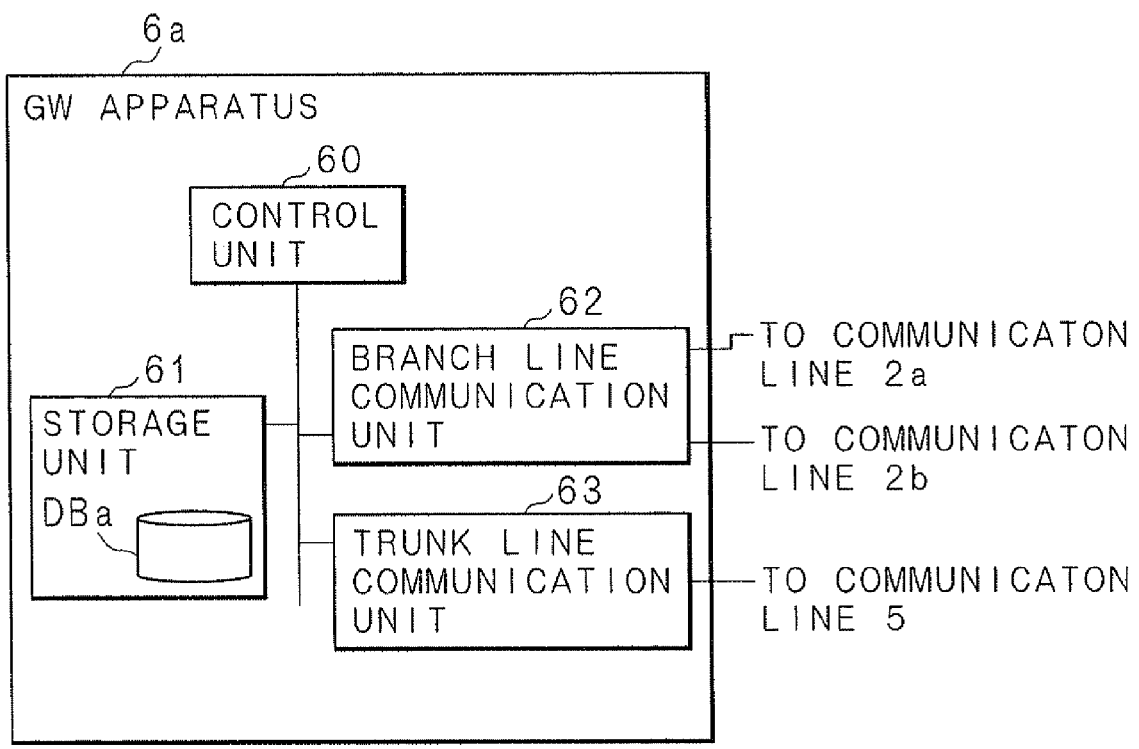
F I G. 17

UNSELECTED STATUS OF DISTRIBUTION APPARATUS

FIG. 25

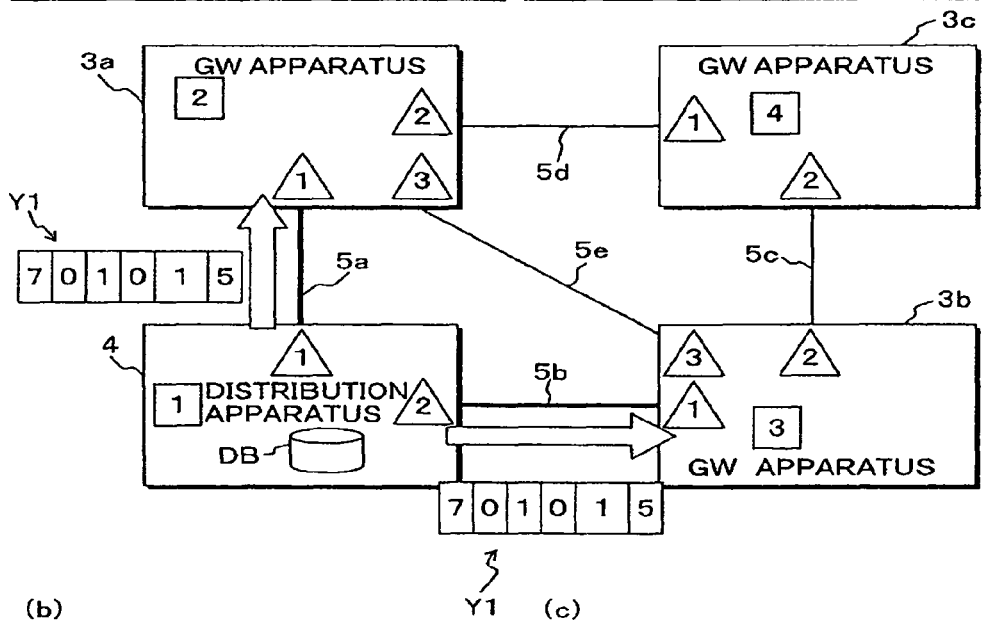

(a)

| LINK CATEGORY | COMMUNICATION PORT |
|---|---|
| ROOT SIDE LINK | 1 |
| LEAF SIDE LINK | 2, 3 |
| UNUSED LINK | — |

(d)

| LINK CATEGORY | COMMUNICATION PORT |
|---|---|
| ROOT SIDE LINK | — |
| LEAF SIDE LINK | — |
| UNUSED LINK | — |

(b)

| LINK CATEGORY | COMMUNICATION PORT |
|---|---|
| LEAF SIDE LINK | 1 |
| | 2 |

(c)

| LINK CATEGORY | COMMUNICATION PORT |
|---|---|
| ROOT SIDE LINK | 1 |
| LEAF SIDE LINK | 2, 3 |
| UNUSED LINK | — |

LEGEND
△ — COMMUNICATION PORT IDENTIFICATION NUMBER
□ — APPARATUS IDENTIFICATION NUMBER

FIG. 26
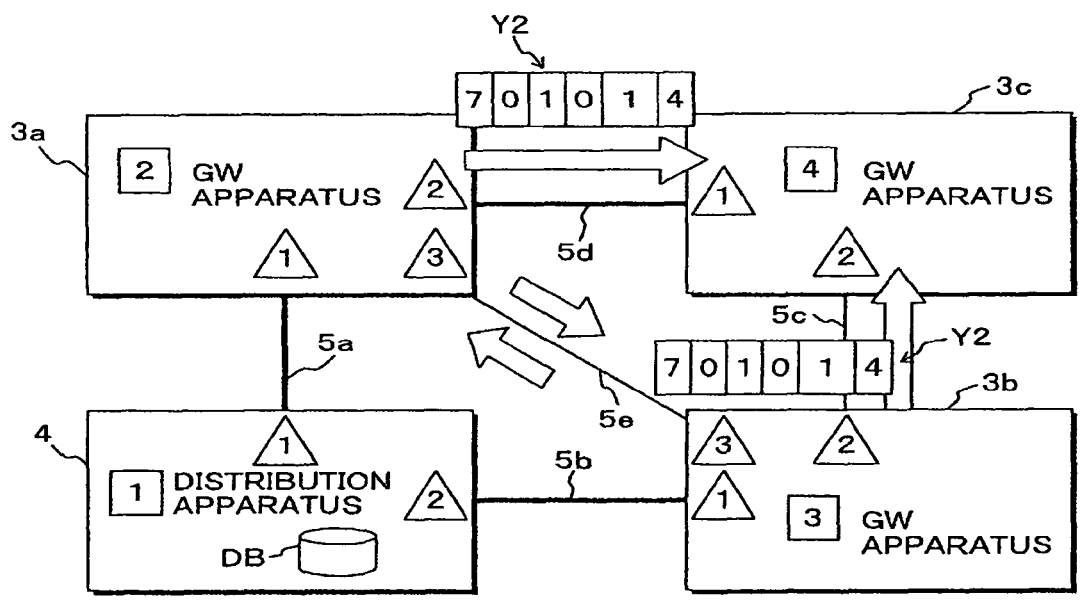
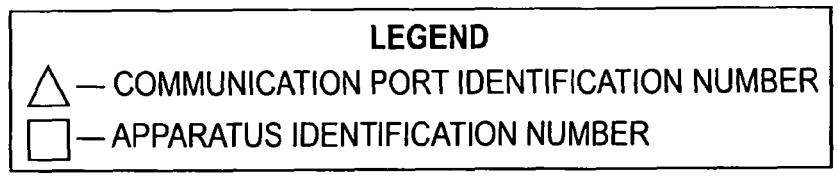

F I G. 28
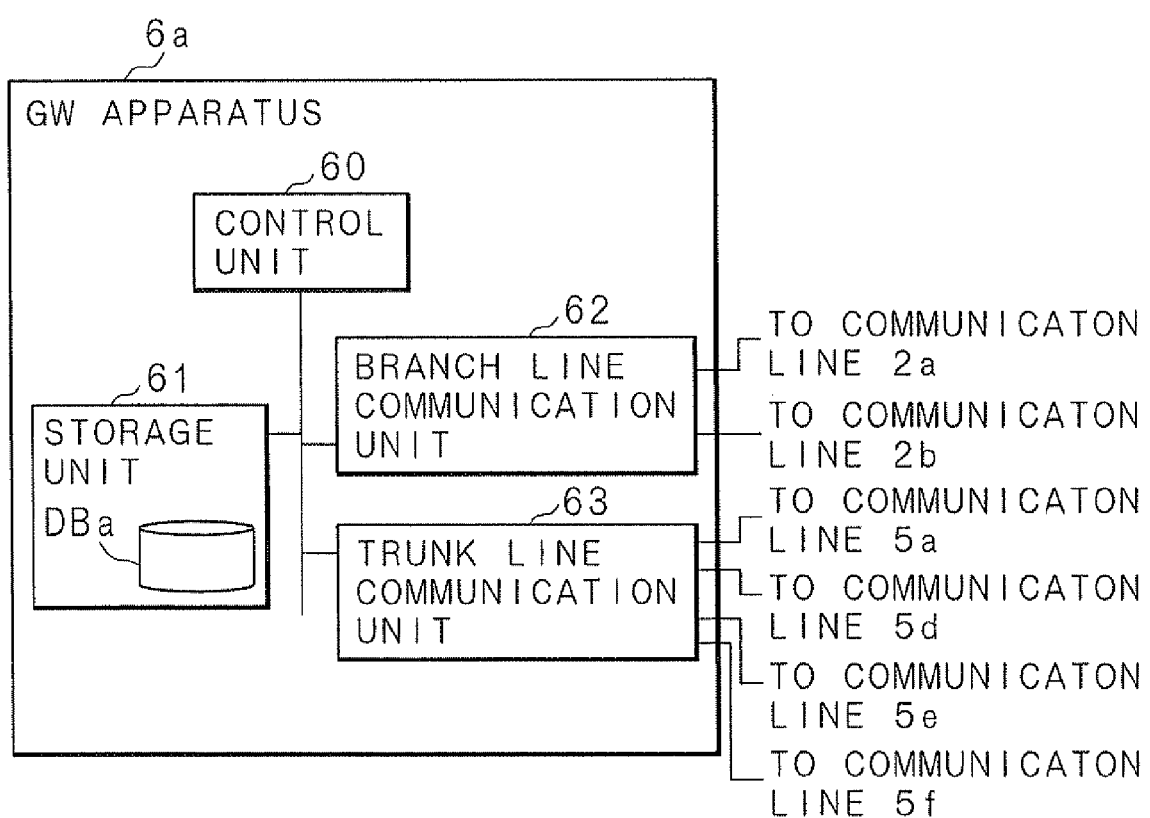

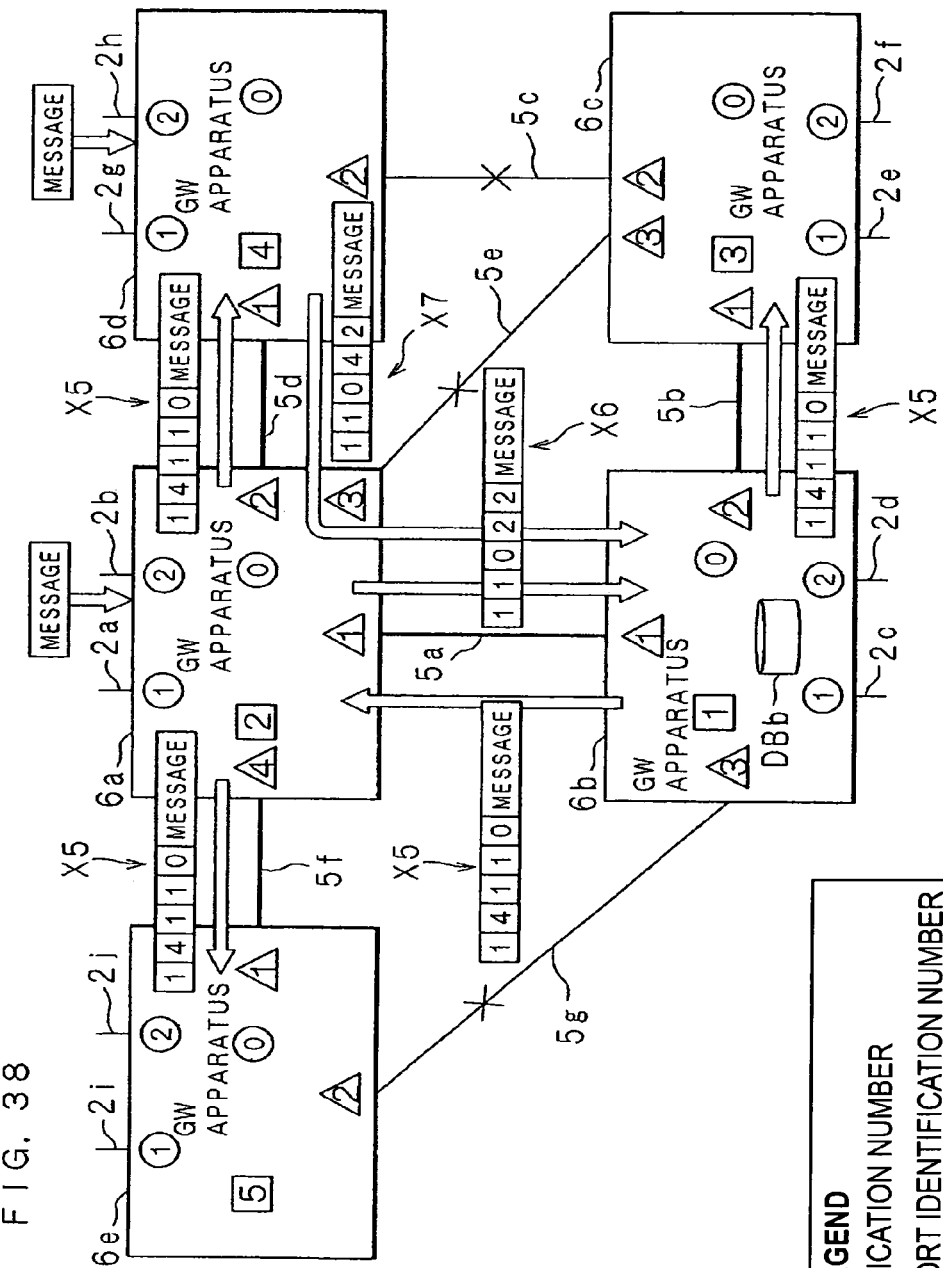
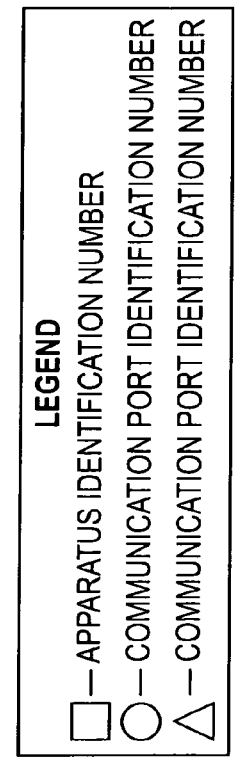
FIG. 38

| TRANSMISSION DESTINATION APPARATUS | COMMUNICATION PORT | AVAILABLE PERIOD |
|---|---|---|
| 1 | 1 | 5 |
| — | — | — |
| — | — | — |

(b)

| TRANSMISSION DESTINATION APPARATUS | COMMUNICATION PORT | AVAILABLE PERIOD |
|---|---|---|
| 1 | 1 | 4 |
| 4 | 2 | 5 |
| 5 | 4 | 3 |

(c)

| TRANSMISSION DESTINATION APPARATUS | COMMUNICATION PORT | AVAILABLE PERIOD |
|---|---|---|
| 1 | 1 | 2 |
| 4 | 3 | 5 |
| 5 | 4 | 1 |

(d)

| TRANSMISSION DESTINATION APPARATUS | COMMUNICATION PORT | AVAILABLE PERIOD |
|---|---|---|
| 1 | 1 | 5 |
| 4 | 3 | 4 |
| 5 | 4 | 0 |

COMMUNICATION SYSTEM AND RELAY APPARATUS

This application is the national phase under 35 U.S.C. §371 of PCT International Application No. PCT/JP 2008/068178 which has an International filing date of Oct. 6, 2008 and designated the United States of America.

BACKGROUND OF THE INVENTION

1. Field of the Invention

The present invention relates to a communication system that performs data transmission among communication apparatuses via a relay apparatus. Especially, the present invention relates to a communication system and a relay apparatus included in the communication system for preventing data transmission delay and for reducing a communication load.

2. Description of Related Art

It is recently known in several fields to utilize a system having many communication apparatuses, in which each communication apparatus is provided with a certain function and connected with other communication apparatuses in order to perform many operations through data exchange between many communication apparatuses. For example, it is known in a field of local area network (LAN) mounted on a motor vehicle to utilize electronic control units (ECUs) as the communication apparatuses, to make each ECU perform a certain operation and to exchange data between the ECUs, in order to provide many functions to be implemented by a system.

A number and a type are increased of the communication apparatuses connected to a communication medium in a system, proportionally to a specializing degree of the function provided to each communication apparatus, as well as an increasing degree of the functions performed by each communication apparatus. Furthermore, the system is expected to perform much more various functions. Thus, each communication apparatus is required to share data and to interact with other communication apparatuses. Then, it results in an increase of exchanged data amount.

To accommodate the increase of exchanged data amount, communication apparatuses of the system is generally divided into some groups, and then each group is connected to a communication line, respectively. Thus, a number of communication apparatuses connected to the communication line is reduced. Therefore, it is possible to reduce a communication amount and to avoid, for example, data collisions. Furthermore, it is thought to focus on data type treated by the groups of communication apparatus, and then to connect each group to each of communication lines respectively having different communication speed. In such a configuration, a communication apparatus is connected with another communication apparatus, by a gateway (GW) apparatus that relays data transmission.

A patent document 1 discloses that: ECUs in a field of LAN mounted on a motor vehicle are divided into some groups; each group is connected to each of communication lines mounted on the motor vehicle; the communication lines are connected to each other by a gateway apparatus; priority information is added to the received and the sent data to recognize data priority; the data priority is recognized through the priority information and the data having high priority is preferentially sent and received when the gateway apparatus performs data transmission between different communication lines, to prevent data transmission delay of data having high priority even when the communication lines take high communication load for data transmission.

[Patent document 1] Japanese Patent Application Laid-Open No. 2005-159568

SUMMARY OF THE INVENTION

However, it is difficult to reduce communication load of a communication line with a configuration that a gateway apparatus relays data sent from an ECU to all the other ECUs. Furthermore, the configuration may increase data transmission delay in a case of a plurality of relays.

The present invention was made in view of such circumstances, and has a primary object to provide a communication system and a relay apparatus included in the communication system that can prevent data transmission delay and can reduce communication load in a network, with using a trunk line topology network that data transmission among a communication apparatus group is relayed among a plurality of relay apparatuses connected to a communication medium as a trunk line, and with using a configuration that a relay apparatus among relay apparatuses works as a specific relay apparatus, collects data transmitted from a communication apparatus, stores the collected data and transmits the stored data to each communication apparatus.

Another object according to the present invention is to provide a communication system that can properly prevent data from being transmitted to a communication apparatus which is not a transmission destination of the data and can reduce communication load in a network, with using a configuration that address information is added to the data transmitted at a trunk line between a relay apparatus and the specific apparatus.

Another object according to the present invention is to provide a communication system that can implement proper data transmission, can prevent data transmission delay and can reduce communication load, with using a configuration that address information based on data transmission destination and data transmission source is added in accordance with various connection topology of communication apparatuses.

Another object according to the present invention is to provide a communication system that can implement efficient data transmission, can prevent data transmission delay and can reduce communication load in a network, with using a configuration that learns data transmission destination among relay apparatuses in flexible accordance with various system topology.

Another object according to the present invention is to provide a communication system that can implement proper data transmission, can prevent data transmission delay and can reduce communication load in a network, with using a configuration that data transmission direction is properly set among relay apparatuses in flexible accordance with various system topology.

Another object according to the present invention is to provide a communication system that can implement proper data transmission, can prevent data transmission delay and can reduce communication load in a network, with using a configuration that a relay apparatus works as a specific relay apparatus in flexible accordance with various system topology.

A communication system according to a first aspect comprises: a plurality of communication apparatus groups, each of which has a plurality of communication apparatuses; a plurality of communication lines that connect the communication apparatuses based on the plurality of communication apparatus groups; a plurality of relay apparatuses that are connected one or more communication lines among the plurality of communication lines and relays data transmitted from a communication apparatus via a communication line to another communication apparatus, wherein the plurality of relay apparatuses are connected with a communication medium different from the communication line and comprise: a means for transmitting data from each communication apparatus connected via a communication line toward a specific relay apparatus; and a means for transmitting data from the specific relay apparatus toward each communication apparatus, and the specific relay apparatus comprises: a means for storing data transmitted from another relay apparatus and a communication apparatus connected via a communication line, into a storage; a means for reading out data from a storage and for transmitting the data to another relay apparatus or the communication apparatus.

A communication system according to a second aspect includes the plurality of relay apparatus and the specific relay apparatus that comprise a means for adding address information showing where data is transmitted from and to.

A communication system according to a third aspect includes: the communication apparatus comprising a means for transmitting data with identification information for identifying the communication apparatus toward the specific relay apparatus when connected to a communication line; and the specific relay apparatus comprising a means for obtaining address information of each communication apparatus as an transmission destination based on the receiving identification information and the address information added on the data.

A communication system according to a fourth aspect includes the plurality of relay apparatuses and the specific relay apparatus comprising: a means for storing, when receiving data, a relationship between a transmission source shown by address information added on the data and a receiving path of the data; and a means for transmitting data on a path based on a transmission destination when transmitting data.

A communication system according to a fifth aspect includes the plurality of relay apparatuses being connected in a ring topology or mesh topology via the communication medium, and comprising a tree generating means for generating tree information showing directions of data transmission at each of the plurality of relay apparatuses, wherein each relay apparatus transmits data to another relay apparatus or the specific relay apparatus on the basis of tree information generated by the tree generating means.

A communication system according to a sixth aspect includes some or all repay apparatuses among the plurality of relay apparatuses comprising a storage medium that stores data transmitted from each communication apparatus, wherein each of said some or all repay apparatuses comprises: a means for cyclically transmitting candidacy notification for becoming the specific relay apparatus; a means for determining whether withdrawing the candidacy notification or not, when receiving a candidacy notification from another relay apparatus; a means for stopping the transmission of the candidacy notification when determining to withdraw the candidacy; and a means for transmitting selection notification showing a success in selection, when the transmission of the candidacy notification is not stopped after a predetermined time.

A communication system according to a seventh aspect includes a means for connecting to a plurality of external apparatuses with different communication mediums, respectively, and relays data transmission via different communication mediums, and comprises: a means for storing, on a storage medium, data received from an external apparatus and data relayed by said another relay apparatus; a means for reading out data from a storage medium and for relaying the data to said another relay apparatus; and a means for reading out data from a storage medium and for transmitting the data to an external apparatus.

In accordance with the first and the seventh aspect, data transmitted from the communication apparatus is relayed by the relay apparatus and stored on a storage medium of the specific relay apparatus. Then, data being read out from the storage medium by the specific relay apparatus is relayed by a relay apparatus and is transmitted to each communication apparatus. The specific relay apparatus transmits data from a communication apparatus to each communication apparatus, rather than normal relay apparatuses transmits all data from a communication apparatus to different communication apparatus.

In accordance with the second aspect, address information indicating a data transmission source and destination is added onto the data transmitted between a relay apparatus and the specific relay apparatus. Thus, it is possible, for example, to discard data for a relay apparatus connected to a communication apparatus that does not require the data. Therefore, it is possible to prevent a wasteful transmission of the data to the communication apparatus that does not require the data.

In accordance with the third aspect, when a communication apparatus is connected to a communication line, data is transmitted with identification information of the communication apparatus, and further with address information as a data transmission source. Thus, it is possible to obtain address information as a data transmission destination of the communication apparatus.

In accordance with the fourth aspect, even in a case that there are multistep of relaying data via a plurality of relay apparatuses, a path can be learned for transmitting data to a destination in accordance with various connection topologies.

In accordance with the fifth aspect, even in a case that connecting configuration is changed among relay apparatuses, a proper relay direction can be automatically set in accordance with various connection topologies.

In accordance with the sixth aspect, even in a case that there are a plurality of relay apparatuses having a storage medium which stores data received from communication apparatus, any one of the relay apparatus can be automatically selected as the specific relay apparatus.

In accordance with the present invention, a network is configured in a trunk line topology that a plurality of communication apparatus groups are connected to a relay apparatus and that data from a communication apparatus is transmitted among relay apparatuses. Furthermore, a specific relay apparatus once collects data and transmits to each communication apparatus if the data is required. Thus, it is possible to prevent wasteful transmission of data to a communication apparatus that does not require the data, with performing data transmission over control of data transmission timing at the specific relay apparatus, control of specifying a data transmission destination. Therefore, it is possible to prevent data transmission delay and reduce communication load in the network.

In accordance with the present invention, data is relayed among relay apparatuses with additional address information. Therefore, it is possible to properly prevent the data from being transmitted to a communication apparatus that is connected to a relay apparatus but is not a transmission destination of the data. Hence, it is possible to reduce communication load.

In accordance with the present invention, it is possible to add proper address information based on various system configurations, for example, in a case that a new communication apparatus is added into the communication system or a connecting configuration with relay apparatus is changed. Thus, it is possible to prevent wasteful transmission of data to a communication apparatus that does not require the data, even when a communication apparatus is added into the system or the connecting configuration is changed in the system. Therefore, it is possible to prevent data transmission delay and reduce communication load in the network.

In accordance with the present invention, it is possible to learn relationship between a transmission destination and a path for transmitting data, in flexible accordance with various system configurations, such as a case of a ring topology or a mesh topology to connect the relay apparatuses, a case of the communication apparatus connected with a plurality of relay apparatuses or a case of a change in the connecting configuration during working the system. Therefore, it is possible to prevent data transmission delay and reduce communication load.

In accordance with the present invention, it is possible to transmit data with an optimal relay direction, in flexible accordance with various system configurations, such as a case of a ring topology or a mesh topology to connect the relay apparatuses, or a case of the communication apparatus connected with a plurality of relay apparatuses. Thus, it is possible to avoid a problem, for example, transmitting data endlessly like a loop. Therefore, it is possible to implement efficient data transmission. Hence, it is possible to prevent data transmission delay and reduce communication load.

In accordance with the present invention, it is possible to implement proper data transmission flexibly based on various system configurations. Therefore, it is possible to prevent data transmission delay and reduce communication load.

The above and further objects and features of the invention will more fully be apparent from the following detailed description with accompanying drawings.

BRIEF DESCRIPTION OF THE DRAWINGS

FIG. 3A, FIG. 3B and FIG. 3C are explanation views showing contents about transmission source information, transmission timing information and connection information stored in a storage unit of the distribution apparatus according to the embodiment 1.

FIG. 4A and FIG. 4B are explanation views showing contents about address information added by a control unit of the distribution apparatus according to the embodiment 1.

FIG. 8 is a schematic view showing an example of contents and flows of message transmitted in the communication system mounted on the motor vehicle according to the embodiment 1.

FIG. 11 is a schematic view showing an example of contents and flows of message transmitted from a new ECU in the communication system mounted on the motor vehicle according to the embodiment 2.

FIG. 12 is an explanation view showing contents about connection information added by a process of the control unit of the distribution apparatus according to the embodiment 2.

FIG. 17 is a block diagram showing inner components of a GW apparatus included in the communication system mounted on the motor vehicle according to the embodiment 3.

FIG. 25 is a schematic view showing an example of the transmission path selected by the communication system mounted on the motor vehicle according to the embodiment 4.

FIG. 26 is a schematic view showing an example of the transmission path selected by the communication system mounted on the motor vehicle according to the embodiment 4.

FIG. 28 is a block diagram showing inner components of a GW apparatus included in the communication system mounted on the motor vehicle according to the embodiment 5.

FIG. 38 is a schematic view showing an example of contents and flows of message transmitted in a communication system mounted on a motor vehicle according to an embodiment 6.

FIG. 40 is an explanation view showing contents about relationship stored in the storage unit through learning processes performed by the control unit of the GW apparatus included in the communication system mounted on the motor vehicle according to the embodiment 6.

DESCRIPTION OF THE PREFERRED EMBODIMENTS

Hereinafter, embodiments of the present invention are described in detail with reference to drawings. In the embodiments described below, a communication system according to the present invention is described in the context of a communication system that is applied to a LAN mounted on a motor vehicle such as a car and connected to a plurality of ECUs sending and receiving data.

(Embodiment 1)

Figure 1:
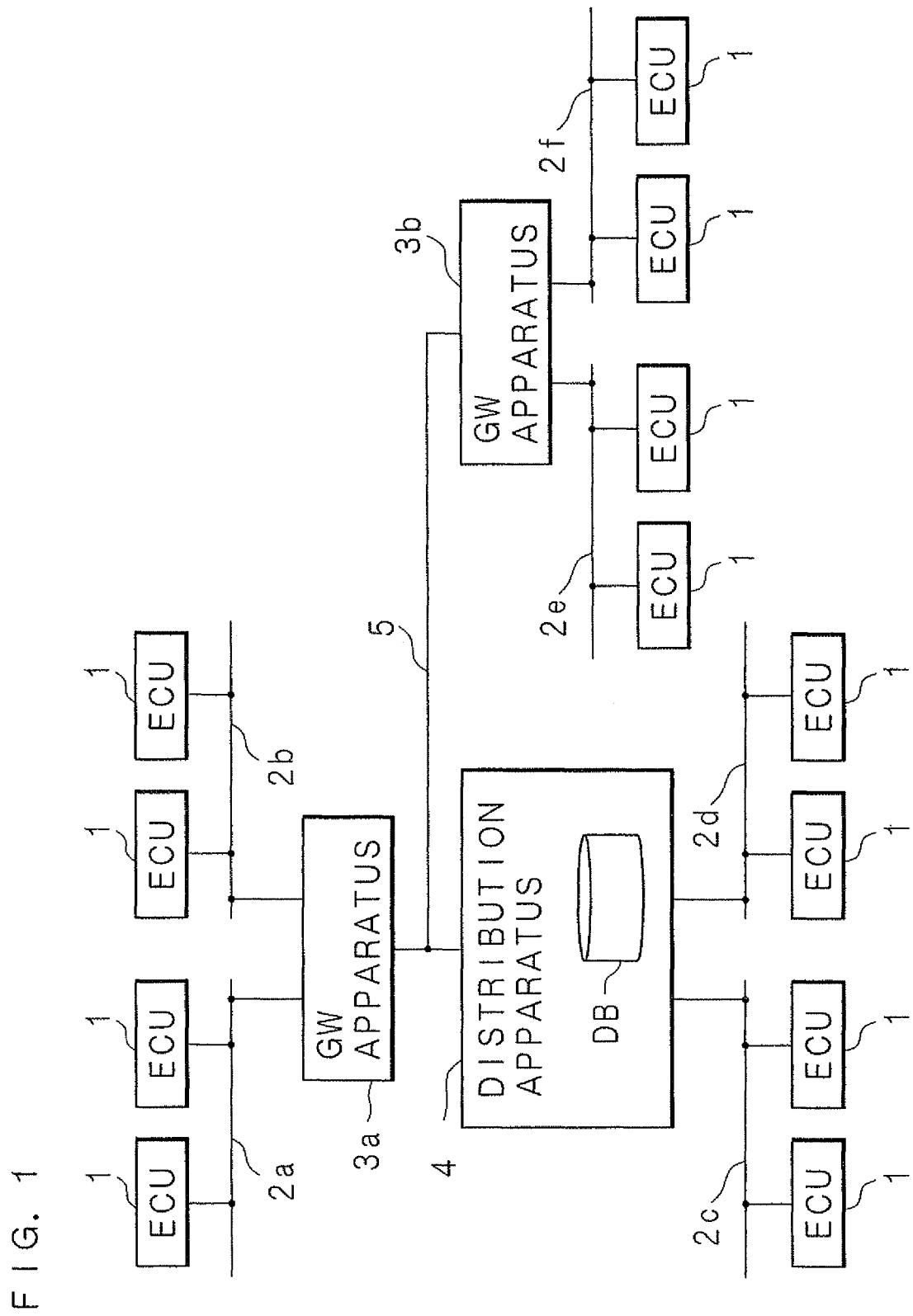
FIG. 1 is a block diagram showing components of a communication system mounted on a motor vehicle according to an embodiment 1.

FIG. 1 is a block diagram showing components of a communication system mounted on a motor vehicle according to an embodiment 1. The communication System mounted on the motor vehicle according to the embodiment 1 includes: communication apparatuses that are ECUs 1, and transmit and receive data; communication lines 2a, 2b, 2c, 2d, 2e, 2f that connect ECUs 1; GW apparatuses 3a, 3b that relay data transmitted among ECUs 1 respectively connected to different communication lines 2a, 2b, 2c, 2d, 2e, 2f; a distribution apparatus 4 that is a specific GW apparatus; and a communication line 5 that connects the GW apparatuses 3a, 3b and the distribution apparatus 4.

The ECUs 1 can send data including numerical information of several physical quantities, such as measured values, computed values and control values. Furthermore, the ECUs 1 can control an engine, brake or the like, with utilizing a microcomputer. For example, an ECU 1 is connected to a GW apparatus 3a via a communication line 2a, is connected with a sensor (not shown) for detecting rotation speeds of wheels (wheel speed), and works as an antilock brake system (ABS). The ECU 4a controls the brake in accordance with the wheel speed detected through the sensor during braking time of the car, and sends data including measured values of the wheel speed toward another ECUs 1 and the GW apparatus 3a.

ECUs 1 are categorized into some groups and ECUs 1 are connected to each of communication lines 2a, 2b, 2c, 2d, 2e, 2f, for each of the groups. ECUs 1 transmit and receive data based on Control Area Network (CAN) protocol. ECUs 1 are connected to communication lines 2a, 2b, 2c, 2d, 2e, 2f in a bus topology. Each of communication lines 2a, 2b, 2c, 2d, 2e, 2f is connected to any one of the GW apparatuses 3a, 3b and the distribution apparatus 4.

The GW apparatuses 3a, 3b and the distribution apparatus 4 are relay apparatuses that respectively relay data transmitted among ECUs 1 connected to different communication lines 2a, 2b, 2c, 2d, 2e, 2f. The distribution apparatus 4 is a specific GW apparatus (a specific relay apparatus) among the three GW apparatuses 3a, 3b, 4, which has a storage region used for a database DB. The distribution apparatus 4 aggregates and stores data transmitted from ECUs 1 onto the database DB. Further, the distribution apparatus 4 transmits data to ECUs 1 through another GW apparatuses 3a, 3b. The GW apparatuses 3a, 3b respectively transmit data from ECUs 1 to the distribution apparatus 4. Further, the GW apparatuses 3a, 3b respectively transmit data from the distribution apparatus 4 to ECUs 1 via the communication lines 2a, 2b, 2c, 2d, 2e, 2f.

The GW apparatuses 3a, 3b and the distribution apparatus 4 are connected one another with the communication line 5 that works as a trunk line. Thus, a trunk line type network is configured that is mounted on a motor vehicle and relays data transmitted among ECUs 1 categorized into a plurality of groups by the GW apparatuses 3a, 3b and the distribution apparatus 4. For connecting the GW apparatuses 3a, 3b and the distribution apparatus 4, the communication line 5 may be desirable to be a communication medium that has a band width properly wide and implements high speed communication, such as a LAN cable based on Ethernet (registered trade mark). The connection topology in the embodiment 1 is a bus topology that connects the GW apparatuses 3a, 3b and the distribution apparatus 4 with the communication line 5. Hereinafter, the communication lines 2a, 2b, 2c, 2d, 2e, 2f are called a "branch line" and the communication line 5 is called a "trunk line", in order to discriminate between the communication lines 2a, 2b, 2c, 2d, 2e, 2f and the communication line 5 and to explain the configurations properly.

In the following description, the data transmitted between the GW apparatuses 3a, 3b and the distribution apparatus 4 is illustrated to be "message" composed of a plurality of data. An ECU 1 transmits constellations of data, as the message, which are obtained by own performance. Having received the message, the distribution apparatus 4 reads out data from the message and stores the read data on the database DB. The distribution apparatus 4 is configured to transmit a message including one or more data having been read out from the database DB.

Figure 2:
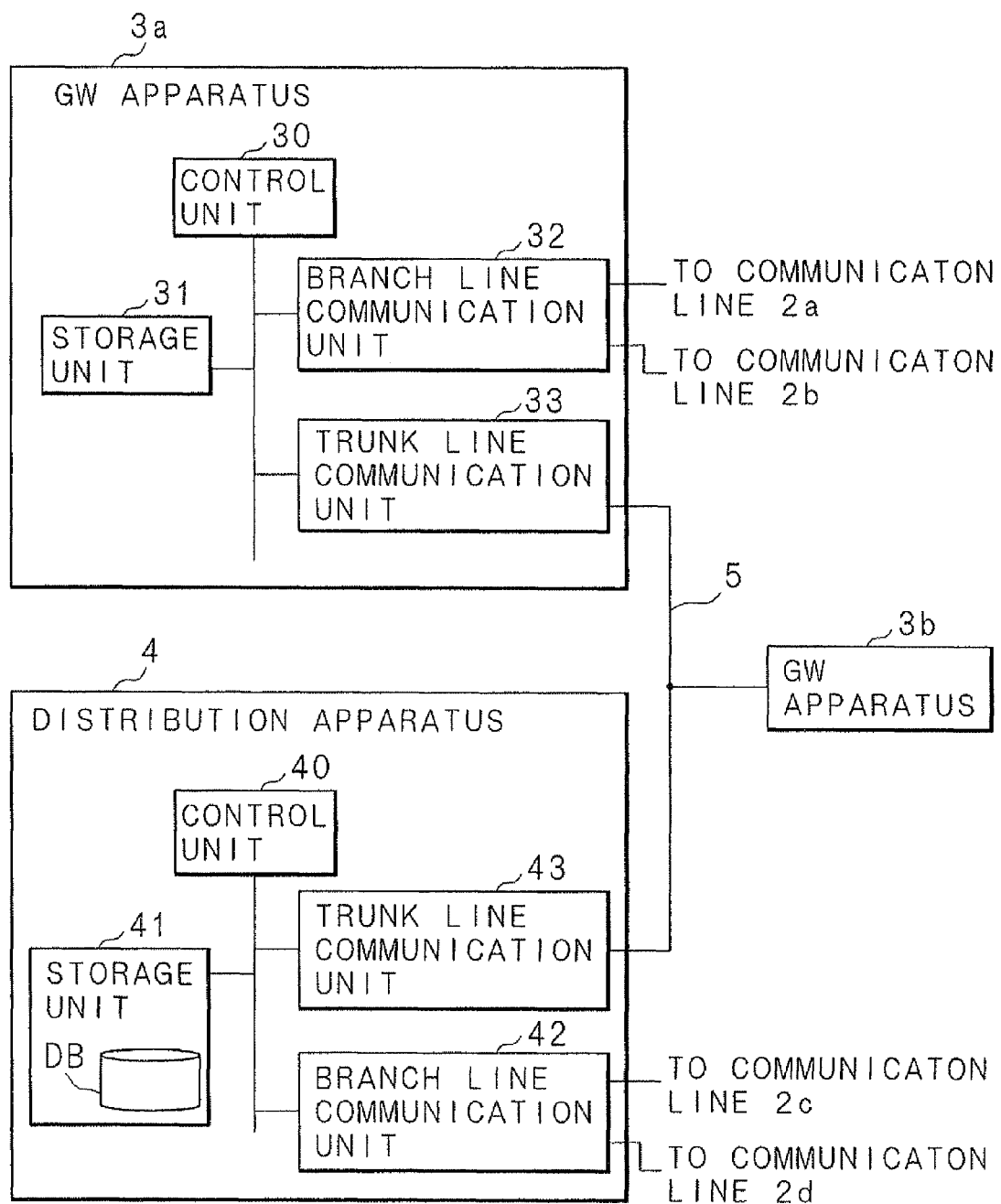
FIG. 2 is a block diagram showing inner components of a GW apparatus and a distribution apparatus included in the communication system mounted on the motor vehicle according to the embodiment 1.

FIG. 2 is a block diagram showing inner components of the GW apparatus 3a and the distribution apparatus 4 included in the communication system mounted on the motor vehicle according to the embodiment 1. It will not be described in detail about inner components of the GW apparatus 3b which are similar to those of the GW apparatus 3a.

The GW apparatus 3a includes: a control unit 30 that controls each component described below; a storage unit 31 that is composed of a volatile memory; a branch line communication unit 32 that is connected to branch lines 2a, 2b; and a trunk line communication unit 33 that connects to the trunk line 5. The storage unit 31 is not limited to be a volatile memory. The storage unit 31 may be composed of a rewritable non-volatile memory.

The control unit 30 is supplied with electric power from an electric power supply (not shown), such as an alternator or battery mounted on the motor vehicle, reads out a control program stored in nonvolatile inner memory (not shown), and executes the control program in order to control each component.

The storage unit 31 stores various information utilized by the control unit 30 for each process. Identification numbers are included in said various information for identifying the GW apparatus 3a from another GW apparatus 3b and the distribution apparatus 4. In the embodiment 1, the storage unit 31 is illustrated to store "1" for the identification number of the distribution apparatus 4, "2" for the identification number of the GW apparatus 3a and "3" for the identification number of the GW apparatus 3b.

The branch line communication unit 32 implements transmitting a message via the branch lines 2a, 2b based on the CAN protocol. The control unit 30 can discriminate a communication port for the branch line 2a and a communication port for the branch line 2b that are included in the branch line communication unit 32. The control unit 30 utilizes a communication port "1" of the branch line communication unit 32, when a message is transmitted among ECUs 1 that are connected to branch line 2a. The control unit 30 utilizes a communication port "2" of the branch line communication unit 32, when a message is transmitted among ECUs 1 that are connected to branch line 2b. The trunk line communication unit 33 implements transmitting a message from the GW apparatus 3a to another GW apparatus 3b and to the distribution apparatus 4 connected to the trunk line 5.

When having received a message through the branch line communication unit 32 from ECU 1 that is connected to the GW apparatus 3a via the branch line 2a, the control unit 30 basically transmits the received message to the distribution apparatus 4 through the trunk line communication unit 33 in order to aggregate data into the distribution apparatus 4. At that time, the control unit 30 discriminates whether the message has been received through the communication port (of the branch line communication unit 32) for the branch line 2a (connected to ECUs 1) or another communication port (of the branch line communication unit 32) for the branch line 2b (connected to ECUs 1). Then, the control unit 30 adds the apparatus identification number of the GW apparatus 3a and information about the discriminated communication port, as address information of a transmission source, to the message. Further, the control unit 30 adds an apparatus identification number of an apparatus for a transmission destination and information about a communication port for the transmission destination, as address information of the transmission destination, to the message. When setting the GW apparatus 3b or the distribution apparatus 4 as the transmission destination and transmitting the message, rather than when setting ECUs 1 as the transmission destinations and transmitting the message to the ECUs 1 through the GW apparatus 3b or the distribution apparatus, the control unit 30 sets the information about the communication port, included in the address information of the transmission destination, to be "0".

Inner components of the distribution apparatus 4 are similar to those of the GW apparatus 3a, because the distribution apparatus 4 is a specific one of the GW apparatuses. The distribution apparatus 4 includes: a control unit 40 that controls each component described below; a storage unit 41 that is composed of a volatile memory; a branch line communication unit 42 that is connected to branch lines 2c, 2d; and a trunk line communication unit 43 that connects to the trunk line 5. The storage unit 31 is not limited to be a volatile memory. The storage unit 31 may be composed of a rewritable non-volatile memory. It will not be described about a function of each component of the distribution apparatus 4 that is similar to one of each component of the GW apparatus 3a. However, the storage unit 41 of the distribution apparatus 4 includes a storage region utilized for a database DB. It should be noted that the control unit 40 of the distribution apparatus 4 aggregates and stores, onto the database DB, data included in the message which is transmitted from each ECU 1 and is relayed by the GW apparatuses 3a, 3b. Furthermore, the control unit 40 of the distribution apparatus 4 transmits data being read out from the database DB, as a message, to each ECU 1.

The storage unit 41 of the distribution apparatus 4 further stores transmission source information that show an ECU 1 corresponding to transmission destinations for each message. The storage unit 41 furthermore stores transmission timing information that show timings of transmitting messages which contain data being read out from the database DB to any ECU 1. The storage unit 41 moreover stores connection information that shows connection configuration of ECUs 1 to the GW apparatuses 3a, 3b and the distribution apparatus 4.

FIG. 3A, FIG. 3B and FIG. 3C are explanation views showing contents about transmission source information, transmission timing information and connection information stored in the storage unit 41 of the distribution apparatus 4 according to the embodiment 1. FIG. 3A shows an example of contents about transmission source information. FIG. 3B shows an example of contents about transmission timing information. FIG. 3C shows an example of contents about connection information.

As shown in FIG. 3A, the transmission source information contain identification numbers of ECUs 1 being transmission sources that are associated with message IDs for identifying messages. In the contents shown by the explanation view of FIG. 3A, it is illustrated that a message with a message ID "0001" is transmitted from an ECU 1 which is provided with a number "2".

As shown in FIG. 3B, the transmission timing information contain identification numbers of ECUs 1 being transmission destinations and transmission timing that both are associated with the message IDs for identifying messages. In the contents shown by the explanation view of FIG. 3B, it is illustrated that the message with the message ID "0001" is transmitted every 10 milliseconds to an ECU 1 which is provided with the number "1".

As shown in FIG. 3C, the connection information contain the identification numbers of the GW apparatuses 3a, 3b and the distribution apparatus 4 connected to respective ECUs 1 and identification numbers of communication ports corresponding to the branch lines 2a, 2b, 2c, 2d, 2e, 2f connected to these apparatuses that both are associated with identification numbers of ECUs identifying each ECU, in order to add address information about transmission source and about transmission destination. In the contents shown by the explanation view of FIG. 3C, it is illustrated that an ECU with a number "1" is connected to a communication port which is provided with an identification number "2", of the GW apparatus 3a which is provided with the apparatus identification number "2", corresponding to the branch line 2b.

The control unit 40 of the distribution apparatus 4 can recognize transmission timing for each message based on the transmission source information, transmission timing information and connection information shown in FIG. 3A, FIG. 3B and FIG. 3C. Furthermore, the control unit 40 of the distribution apparatus 4 can add proper address information to a message when transmitting the message. When having referred the contents shown by the explanation views of FIG. 3A, FIG. 3B and FIG. 3C, the control unit 40 can recognize that the message with the message ID "0001" is transmitted from the ECU 1 with the number "2" and the ECU 1 with the number "2" is connected to GW apparatus 3b via the branch line 2e. Furthermore, the control unit 40 can recognize that the message with the message ID "0001" should be transmitted every 10 milliseconds to the ECU 1 which is provided with the number "1". Moreover, the control unit 40 can recognize that the apparatus identification number "2" and the communication port identification number "2" should be added, as address information of the transmission destination, onto the message with the message ID "0001" when transmitting the message with the message ID "0001".

It will be described below about an example of format of the address information added by the control unit 40 of the distribution apparatus 4. FIG. 4A and FIG. 4B are explanation views showing contents about the address information added by the control unit 40 of the distribution apparatus 4 according to the embodiment 1. FIG. 4A shows a format in only a case of unicast transmission via the trunk line 5. FIG. 4B shows a format in a case of multicast transmission via the trunk line 5.

In the contents shown by the explanation view of FIG. 4A, address information of transmission destination are the first "1" and the second "0". The first "1" is an identification number of the distribution apparatus 4. The second "0" is an identification number about communication port and indicates that the message is processed by the distribution apparatus 4 itself. Address information of transmission source are the third "2" and the fourth "2". The third "2" is an identification number of the GW apparatus 3a connected to the ECU 1 being the transmission source. The fourth "2" is an identification number of communication port corresponding to the branch line 2b of the GW apparatus 3a. More particularly, the address information of transmission destination is described with 1 byte, the address information of transmission source is described with 1 byte, the apparatus identification number is described with 3 bits, and the communication port identification number is described with 5 bits. Thus, it is possible to configure the combination of the GW apparatus and the distribution apparatus with up to 6 apparatuses, even when an apparatus identification number "0" (000b) is set to indicate "reservation" and an apparatus identification number "7" (111b) is set to indicate all apparatuses, and then the apparatus identification numbers "0" and "7" are not utilized. The communication port identification number is similar to the apparatus identification number. Thus, it is possible to utilize up to 30 ports, even when a communication port identification number "0" (00000b) is set to indicate own apparatus and a communication port identification number "31" (11111b) is set to indicate all communication ports, and then the communication port identification numbers "0" and "31" are not utilized. Alternatively, when the apparatus identification number is described with 4 bits and the communication port identification number is described with 4 bits, it is possible to configure the combination of the GW apparatus and the distribution apparatus with up to 14 apparatuses and to utilize up to 14 ports.

In the contents shown by the explanation view of FIG. 4B, a number of transmission destinations is indicated by the first "2". Address information of the first transmission destination are the second "2" and the third "1". Address information of the second transmission destination are the fourth "3" and the fifth "2". Address information of the transmission source are the sixth "1" and the seventh "0". The contents shown by the explanation view of FIG. 4B illustrate that a message is transmitted from the distribution apparatus 4 with the apparatus identification number "1" to a communication port with the communication port identification number "1" of the GW apparatus 3a with the apparatus identification number "2", and that the message is transmitted from the distribution apparatus 4 with the apparatus identification number "1" to the ECU 1 connected to the communication port with the communication port number "2" of the GW apparatus 3b with the apparatus identification number "3". For example, when a message should be transmitted from the distribution apparatus 4 to an ECU 1 connected to the GW apparatus 3a via the branch line 2a in the case of multicast transmission via the trunk line 5, the address information may be set to be "1" "2" "1" "1" "0".

It will be described about relay procedure that messages transmitted from ECUs 1 are relayed by the GW apparatuses 3a, 3b and the distribution apparatus 4, in the communication system mounted on the motor vehicle illustrated above.

Figure 5:
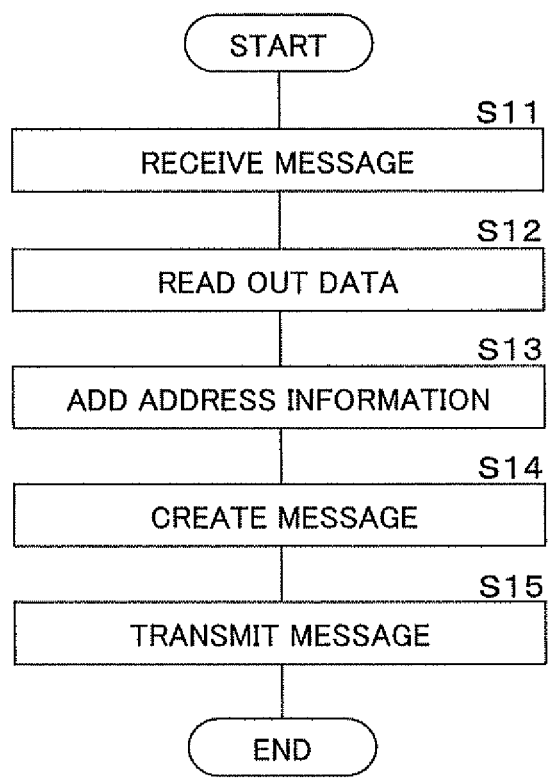
FIG. 5 is a flowchart showing an example of a procedure that a control unit of the GW apparatus, included in the communication system mounted on the motor vehicle according to the embodiment 1, receives message data via a branch line and transmits the message data to the distribution apparatus.

FIG. 5 is a flowchart showing an example of a procedure that the control unit 30 of the GW apparatus 3a, 3b, included in the communication system mounted on the motor vehicle according to the embodiment 1, receives message data via a branch line 2a, 2b, 2e, 2f and transmits the message data to the distribution apparatus 4.

The control unit 30 receives, through the branch line communication unit 32, a message transmitted from any one of ECUs 1 connected to the control unit 30 via the branch line 2a, 2b or branch line 2e, 2f (step S11). The control unit 30 deletes header information about protocol of the branch line, cyclic redundancy check (CRC) and the like, from the received message, and then reads out data contained in the received message (step S12). Then, the control unit 30 adds to the read data: own apparatus identification number; an identification number indicating the communication port having received the data; an apparatus identification number of the distribution apparatus 4 being the transmission destination; and an communication port identification number for processing the data in the distribution apparatus 4 (step S13).

The control unit 30 creates a message through adding, to the address information, header information about a protocol of the trunk line, CRC and the like (step S14). The control unit 30 transmits the created message through the trunk line communication unit 33 to the distribution apparatus 4 (step S15), and then terminates the procedure in the case of having received the message from the ECUs 1. As described above, the control unit 30 automatically adds address information and transmits the message to the distribution apparatus 4 via the trunk line 5. Therefore, the message transmitted to the GW apparatuses 3a, 3b are properly relayed and further transmitted to the distribution apparatus 4.

There are ECUs 1 connected through the branch lines 2c, 2d to the distribution apparatus 4, too. Thus, the control unit 40 of the distribution apparatus 4 also receives the message transmitted from the ECUs 1, and performs a procedure for the message. At that time, the control unit 40 of the distribution apparatus 4 obtains data from the received message and stores the obtained data onto the database DB. Thus, the control unit 40 performs the procedure shown in a flowchart of FIG. 6 described later, when having received the message through the branch line communication unit 42.

Figure 6:
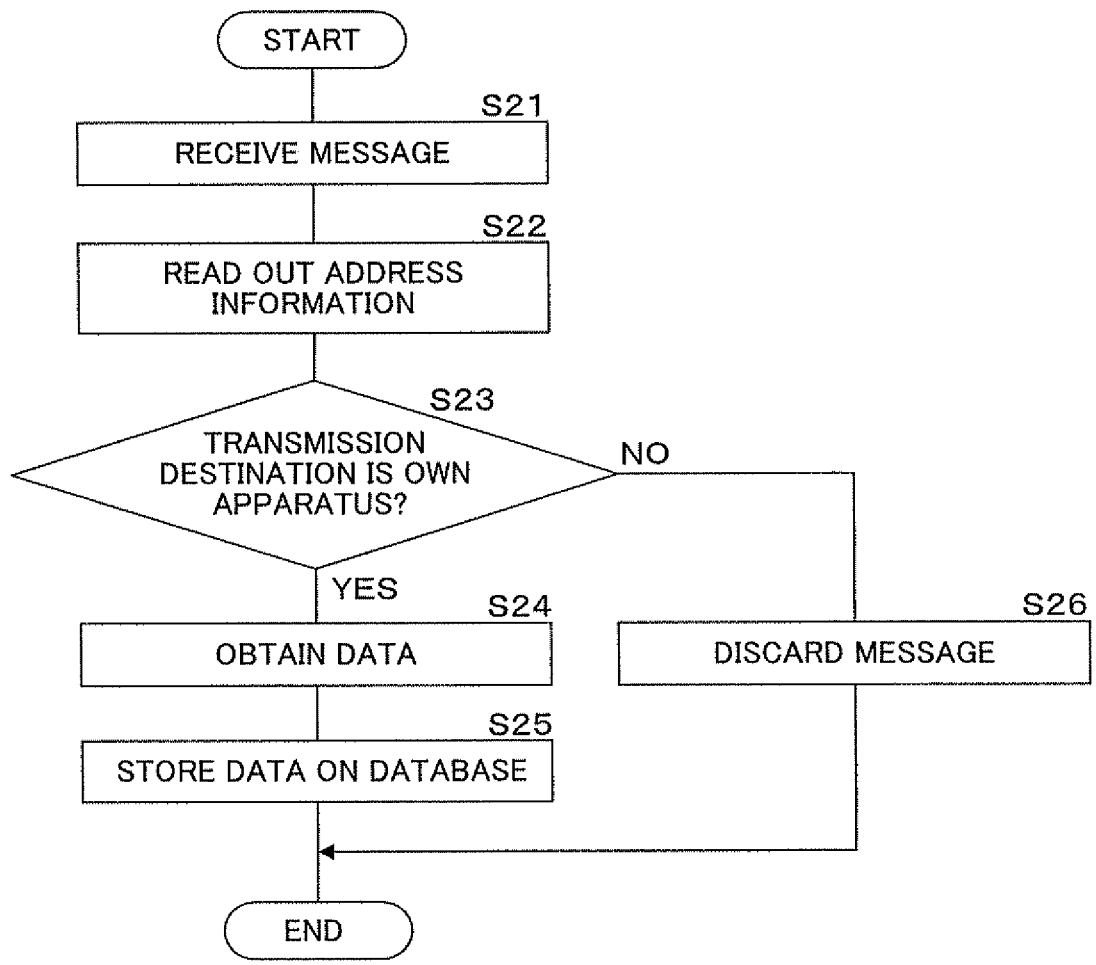
FIG. 6 is a flowchart showing an example of a procedure when the control unit of the distribution apparatus, included in the communication system mounted on the motor vehicle according to the embodiment 1, receives message transmitted from the GW apparatus.

FIG. 6 is a flowchart showing an example of a procedure when the control unit 40 of the distribution apparatus 4, included in the communication system mounted on the motor vehicle according to the embodiment 1, receives message transmitted from the GW apparatus 3a, 3b.

The control unit 40 receives, through the trunk line communication unit 43, the message transmitted from the GW apparatus 3a, 3b (step S21), reads out address information from the message (step S22), and determines whether the read address information has the apparatus identification number of the transmission destination that indicates own apparatus, i.e., the distribution apparatus 4 or not (step S23).

When having determined that the read address information has the apparatus identification number of the transmission destination that indicates own apparatus, i.e., the distribution apparatus 4 (S23: YES), the control unit 40 obtains data from the received message (step S24), stores the obtained data on the database DB (step S25), and terminates the procedure when the distribution apparatus 4 receives the message from the GW apparatus 3a, 3b.

When having determined that the read address information does not have the apparatus identification number of the transmission destination that indicates own apparatus, i.e., the distribution apparatus 4 (S23: NO), the control unit 40 discards the message (step S26), and terminates the procedure when the distribution apparatus 4 receives the message from the GW apparatus 3a, 3b.

As described above, the control unit 40 of the distribution apparatus 4 performs processes at the step S21, the step S24 and the step S25, when the distribution apparatus 4 receives data through the branch line communication unit 42 from ECUs 1 connected to the distribution apparatus 4 via branch lines 2c, 2d.

Figure 7:
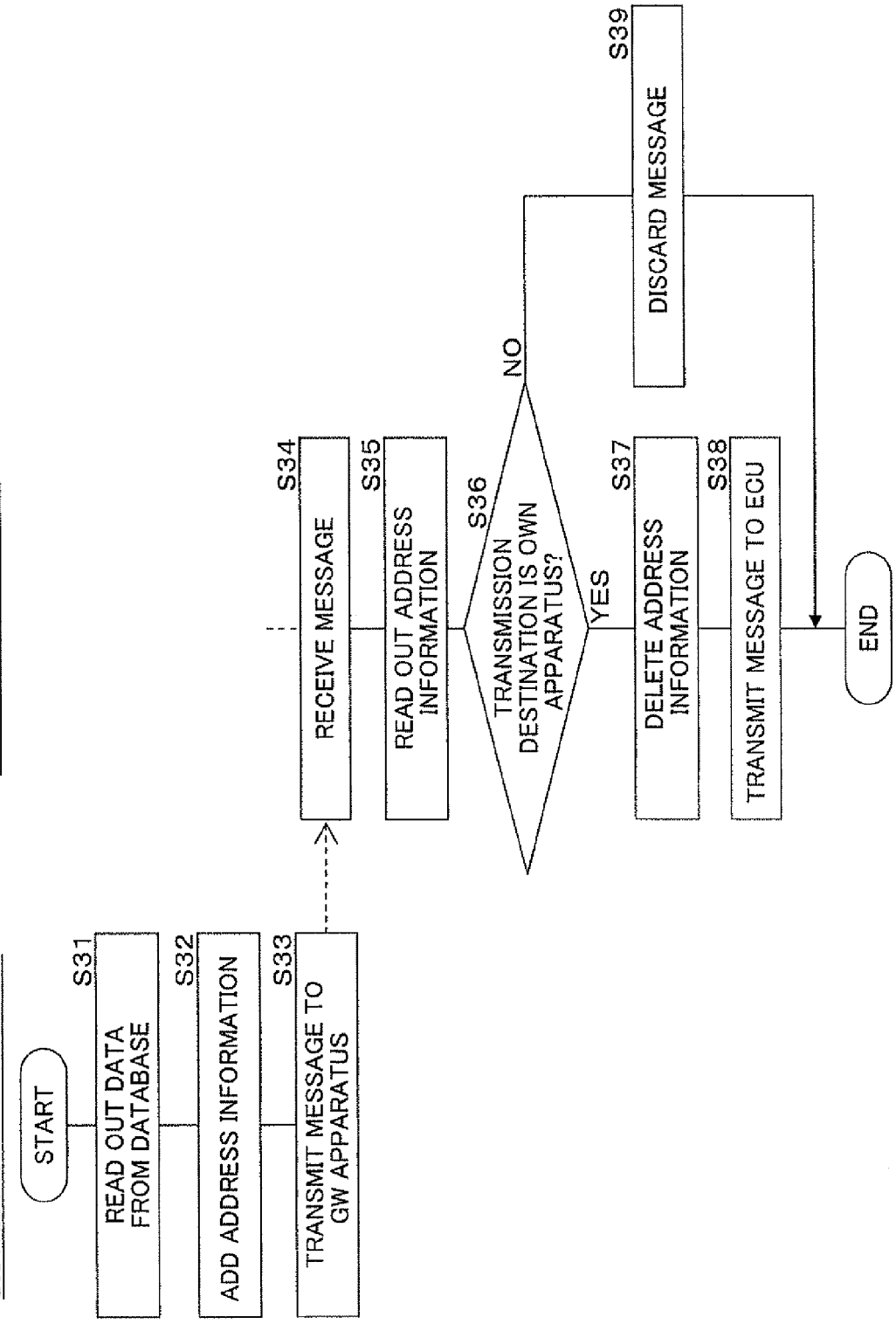
FIG. 7 is a flowchart showing an example of a procedure that message is transmitted to an ECU by the distribution apparatus and the GW apparatus included in the communication system mounted on the motor vehicle according to the embodiment 1.

FIG. 7 is a flowchart showing an example of a procedure that a message is transmitted to ECUs 1 by the distribution apparatus 4 and the GW apparatuses 3a, 3b included in the communication system mounted on the motor vehicle according to the embodiment 1.

The control unit 40 of the distribution apparatus 4 refers the transmission timing information on the storage unit 41 which indicates to which ECU 1 and at what timing a message containing data stored on the database DB should be transmitted. At each timing for transmitting a message, the control unit 40 begins to perform the following processes.

The control unit 40 of the distribution apparatus 4 reads out data from the database DB of the storage unit 41 (step S31), and adds address information including; an identification number of the GW apparatus 3a, 3b connected to ECU 1 being a transmission destination; a communication port identification number corresponding to the branch line 2a, 2b, 2c, 2d, 2e, 2f connected to the ECU 1, being the transmission destination; an identification number of the distribution apparatus 4 being a transmission source; and communication port number indicating that own apparatus, i.e., the distribution apparatus 4 is the transmission source, onto a message containing the read data (step S32). The control unit 40 transmits the message having the address information to the GW apparatus 3a, 3b through the trunk line communication unit 43 (step S33).

The control unit 30 of the GW apparatus 3a, 3b receives, through the trunk line communication unit 33, the message from the distribution apparatus 4 (step S34), and reads out address information added on the message (step S35). The control unit 30 determines whether the read address information has the apparatus identification number of the transmission destination that indicates own apparatus, i.e., the GW apparatus 3a, 3b or not (step S36). When having determined that the read address information has the apparatus identification number of the transmission destination that indicates own apparatus, i.e., the GW apparatus 3a, 3b (836: YES), the control unit 30 deletes the added address information (step S37), transmits the message through the branch line communication unit 32 to the ECU 1 based on the communication port identification number of the transmission destination being read out at the step S35 (step S38) and terminates the procedure for transmitting a message.

When having determined that the read address information does not have the apparatus identification number of the transmission destination that indicates own apparatus, i.e., the GW apparatus 3a, 3b (S36: NO), the control unit 30 of the GW apparatus 3a, 3b discards the received message (step S39) and terminates the procedure for transmitting a message.

The control unit 40 of the distribution apparatus 4 refers the transmission timing information stored on the storage unit 41. When transmitting a message containing data being read out from the database DB toward the ECU 1 connected to the distribution apparatus 4 via the branch line 2c, 2d, the control unit 40 of the distribution apparatus 4 reads out data from the database DB at the step S31 described above, and transmits the message through the branch line communication unit 42 to the ECU 1, as well as the process that the control unit 30 of the GW apparatus 3a, 3b transmits a message, without adding address information, at the step S38.

Figure 9:
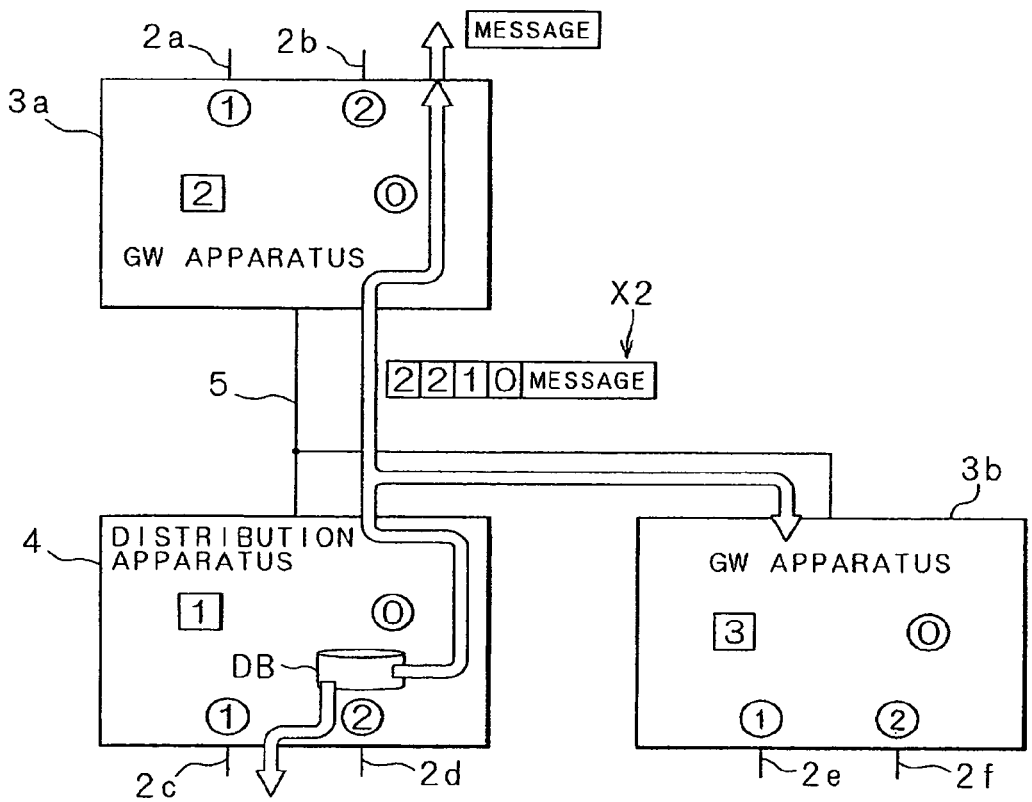
FIG. 9 is a schematic view showing an example of contents and flows of message transmitted in the communication system mounted on the motor vehicle according to the embodiment 1.

Next, it will be described with an example about relay of message performed by the control unit 30 of the GW apparatus 3a, 3b and the control unit 40 of the distribution apparatus 4, through the procedures shown in the flowcharts of FIG. 5, FIG. 6 and FIG. 7. FIG. 8 and FIG. 9 are schematic views showing examples of contents and flows of message transmitted in the communication system mounted on the motor vehicle according to the embodiment 1. Each apparatus is illustrated by a block in the schematic views of FIG. 8 and FIG. 9. In FIG. 8 and FIG. 9, a number is boxed by a square in a block illustrating the GW apparatuses 3a, 3b and the distribution apparatus 4. The boxed number represents an apparatus identification number. A number surrounded by a circle represents a communication port identification number corresponding to each of the branch lines 2a, 2b, 2c, 2d, 2e, 2f.

In reference to the schematic views of FIG. 8 and FIG. 9, it will be described about processes performed by the GW apparatuses 3a, 3b and the distribution apparatus 4, in the case that a message is transmitted from an ECU 1 connected to the GW apparatus 3a via the branch line 2b and that a message is transmitted to the ECU 1 connected to the GW apparatus 3a via the branch line 2b.

The schematic view of FIG. 8 illustrates examples of contents and flows of a message, in the case that a message is transmitted from an ECU 1 connected to the GW apparatus 3a via the branch line 2b, the message is received by the GW apparatus 3a, and that the message is transmitted to the distribution apparatus 4. A hollow arrow in FIG. 8 shows a flow of the message. When having received the message transmitted from the ECU 1 connected to the GW apparatus 3a via the branch line 2b, the control unit 30 of the GW apparatus 3a adds address information onto the received message and transmits the received message having the address information to the distribution apparatus 4. In this case, "1" "0" "2" "2" is added as the address information, as shown by X1 in FIG. 8.

When having received the message as shown by X1 in FIG. 8, the control unit 40 of the distribution apparatus 4 reads out address information from the message and determines that the apparatus identification number indicates own apparatus, i.e., the distribution apparatus 4, because the first number is "1" that is an apparatus identification number. Then, the control unit 40 stores data on the database DB because the message has "0" as the communication port identification number of the transmission destination. At that time, the control unit 40 can recognize the transmission source of the message X1 is the ECU 1 connected to the branch line 2b corresponding to the communication port provided with the communication port identification number "2" of the GW apparatus 3a provided with the apparatus identification number "2".

As the GW apparatus 3b is connected to the trunk line 5 in a bus topology, the control unit 30 of the GW apparatus 3b also receives the message X1 shown in FIG. 8. However, the control unit 30 of the GW apparatus 3b receives the message X1, reads out the first number indicating an apparatus identification number, determines that the address information of the message X1 does not indicates own apparatus, i.e., the GW apparatus 3b, and discards the received message X1, because the first number is "1".

The schematic view of FIG. 8 illustrates another flow of a message that is transmitted from an ECU 1 connected to the distribution apparatus via the branch line 2c, too. When having received a message from the ECU 1 connected to the distribution apparatus 4 via the branch line 2c, the control unit 40 of the distribution apparatus 4 stores obtained data on the database DB.

The schematic view of FIG. 9 illustrates an example of contents and flows of a message that contains data being read out from the database DB of the distribution apparatus 4, is relayed by the GW apparatus 3a and transmitted to the ECU 1. A hollow arrow in FIG. 9 represents a flow of the message. When detecting on the basis of the transmission timing information stored on the storage unit 41 that a timing is coming for transmitting a message to an ECU 1 provided with the identification number "1" (See FIG. 3B), the control unit 40 of the distribution apparatus 4 recognizes on the basis of the connection information that the ECU 1 provided with the number "1" is connected to the branch line 2b corresponding to the communication port "2" provided with the communication port identification number "2" of the GW apparatus 3a provided with the apparatus identification number "2" (See FIG. 3C). When transmitting a message to this ECU 1, the control unit 40 adds address information, based on the connection information, which is "2" "2" "1" "0" as shown by X2 in FIG. 9.

When having received a message as shown by X2 in FIG. 9, the control unit 30 of the GW apparatus 3a reads out address information from the received message and determines that the address information of the message X2 indicates own apparatus, i.e., the GW apparatus 3a because the first number is "2". Furthermore, the control unit 30 transmits a message to an ECU 1 connected to the branch line 2b corresponding to a communication port of the transmission destination, because the communication port identification number is "2". The control unit 30 can recognize that the transmission source of the message X2 is the distribution apparatus 4 because the apparatus identification number indicating the transmission source is "1", and that the transmitted message contains data being read out from the database DB because the communication port identification number is "0".

The control unit 30 of the GW apparatus 3b also receives the message as shown by X2 in FIG. 9, as the GW apparatus 3b is connected to the trunk line 5 in a bus topology. However, the control unit 30 of the GW apparatus 3b receives the message X2, reads out the first number indicating an apparatus identification number, determines that the message X2 has a transmission destination which is not own apparatus, i.e., the GW apparatus 3b, and discards the received message X2, because the first number is "2".

The schematic view of FIG. 9 further illustrates a flow of a message transmitted toward an ECU 1 connected to the distribution apparatus 4 through the branch line 2c. When reading out data from the database DB and transmitting a message in accordance with the transmission timing information toward the ECU 1 connected to the distribution apparatus 4 via the branch line 2c, the control unit 40 of the distribution apparatus 4 transmits the message based on CAN protocol through the branch line communication unit 42 with the branch line 2c.

As described above, each group of ECUs 1 is connected to GW apparatuses 3a, 3b or the distribution apparatus 4 with the trunk line 5. Thus, a trunk line topology network is configured that a message is transmitted between the GW apparatuses 3a, 3b and the distribution apparatus 4. Therefore, it is possible to prevent wasteful transmission of a message to the branch lines 2a, 2b, 2c, 2d, 2e, 2f that do not require the message, and to reduce communication load on the branch lines 2a, 2b, 2c, 2d, 2e, 2f.

The embodiment 1 has been described above about the configuration that address information is added to a message when the message is transmitted between the GW apparatuses 3a, 3b and the distribution apparatus 4. However, the present invention is not limited to the configuration. The control unit 30 of the GW apparatus 3a, 3b may receive a message through the branch line communication unit 32 and transmits the same received message to the distribution apparatus 4. The control unit 30 of the GW apparatus 3a, 3b may perform no process to discriminate a communication port having utilized for the message reception, at that time. The control unit 40 of the distribution apparatus 4 may read out data from the received message through the trunk line communication unit 43 at that time and store the read data on the database DB, without determining whether the received message has a transmission destination indicating own apparatus, i.e., the distribution apparatus 4 or not. When having received a message through the branch line communication unit 42, the control unit 40 of the distribution apparatus 4 may read out data from the received message and store the read data onto the database DB, too. The distribution apparatus 4 may transmit a message containing the data being read out from the database DB, without adding address information, toward each ECU 1. The control unit 30 of the GW apparatus 3a, 3b can determine, for the message received through the trunk line communication unit 33, whether relaying the received message in accordance with the message ID to an ECU 1 connected to the same GW apparatus 3a, 3b via the branch line 2a, 2b, 2e, 2f or discarding the received message. Furthermore, the control unit 30 can determine which communication port the received data should be transmitted in accordance with the message ID, even in the case relaying the received message to the ECU 1 connected to the same GW apparatus 3a, 3b via the branch line 2a, 2b, 2e, 2f. For the configuration described above, the storage unit 31 may store a criterion for the determination corresponding to the message ID. Thus, the control unit 30 can determine on the basis of the criterion for the determination.

It should be noted, as described in the embodiment 1, that the distribution apparatus 4 has a configuration similar to those of the GW apparatuses 3a, 3b connected to the distribution apparatus 4 with the trunk line 5, works as a specific GW apparatus aggregating data, and adds address information to a message to be transmitted. Therefore, it is possible to transmit desired data to each ECU 1 more efficiently. The GW apparatuses 3a, 3b also may works as a distribution apparatus storing data on the storage unit 31, and transmit a message to each ECU 1 as required after storing the data. Therefore, it is possible to reduce communication load on the branch lines 2a, 2b, 2c, 2d, 2e, 2f more than the case that the GW apparatuses 3a, 3b relay all message. Alternatively, it may be configured that the distribution apparatuses synchronize stored data with each other and then transmit a message to each ECU 1. Thus, the transmitted messages can coincide with each other. However, it is not necessary to make all of the GW apparatuses 3a, 3b and distribution apparatus 4 work as a distribution apparatus. It is enough to provide one distribution apparatus 4 having a storage region utilized as a database DB, for obtaining similar advantages described above.

(Embodiment 2)

In an embodiment 2, it will be described about processes that are performed when a new ECU 1 is connected to any one of the branch lines 2a, 2b, 2c, 2d, 2e, 2f in the communication system mounted on the motor vehicle including the ECUs 1 the GW apparatuses 3a, 3b and the distribution apparatus 4 and configuring a trunk line topology network as described in the embodiment 1.

As described in the embodiment 1, the storage unit 41 of the distribution apparatus 4 stores the transmission source information, the transmission timing information and the connection information. When the new ECU 1 is connected, the transmission source information, the transmission timing information and the connection information require: information about message transmitted from the new ECU 1; information about message transmitted to the new ECU 1; information about timing of the message transmitted to the new ECU 1; and information about connection configuration of the new ECU 1, for transmitting a message from the new ECU 1 to another ECU 1 and for transmitting a message to the new ECU 1.

Thus, it will be described in the embodiment 2 about processes that are performed by the GW apparatuses 3a, 3b and the distribution apparatus 4 when the new ECU 1 is connected to the communication system mounted on the motor vehicle described in the embodiment 1. The communication system mounted on the motor vehicle of the embodiment 2 is configured similarly to one of the embodiment 1. Thus, the same numerals are given to the corresponding components, in the following description.

When being connected, the new ECU 1 transmits a message at least on starting activation. The message transmitted on starting activation may contain data including numerical information of several physical quantities, such as measured values, computed values and control values transmitted by the control based on each function. Each message contains a message ID, and the storage unit 41 of the distribution apparatus 4 stores a relationship, as the transmission source information, between each message ID and number identifying ECU being a transmission source. Therefore, the control unit 40 can identify an ECU 1 being a transmission source based on the message ID of the transmitted message. The transmission source information of the storage unit 41 includes information for such a newly connected ECU 1 and information for inactivated ECU 1, too.

Each ECU 1 may be configured to transmit own identification information, such as a provided number, and a specific message containing the message ID, upon starting activation. Thus, it is possible to obtain new transmission source information, even when the existing transmission source information does not have an identification number of an ECU 1 corresponding to the message ID of the message transmitted from the new ECU 1.

The control unit 30 of the GW apparatus 3a, 3b performs the same procedure shown by the flowchart of FIG. 5 in the embodiment 1, and transmits the message from the new ECU 1 to the distribution apparatus 4. The control unit 40 of the distribution apparatus 4 basically performs the procedure shown by the flowchart of FIG. 6 in the embodiment 1. However, the control unit 40 of the distribution apparatus 4 reads out a message ID from the received message and adds new connection information based on address information provided on the received message, when the received message contains a message ID and the existing connection information of the storage unit 41 does not show an ECU 1 having transmitted the message on the basis of the message ID.

It will be described below, with a flowchart, about processes performed by the control unit 40 of the distribution apparatus 4. In the following description, the same step numbers and no detail explanations are provided to a procedure common to the procedure shown by the flowchart of FIG. 6 in the embodiment.

Figure 10:
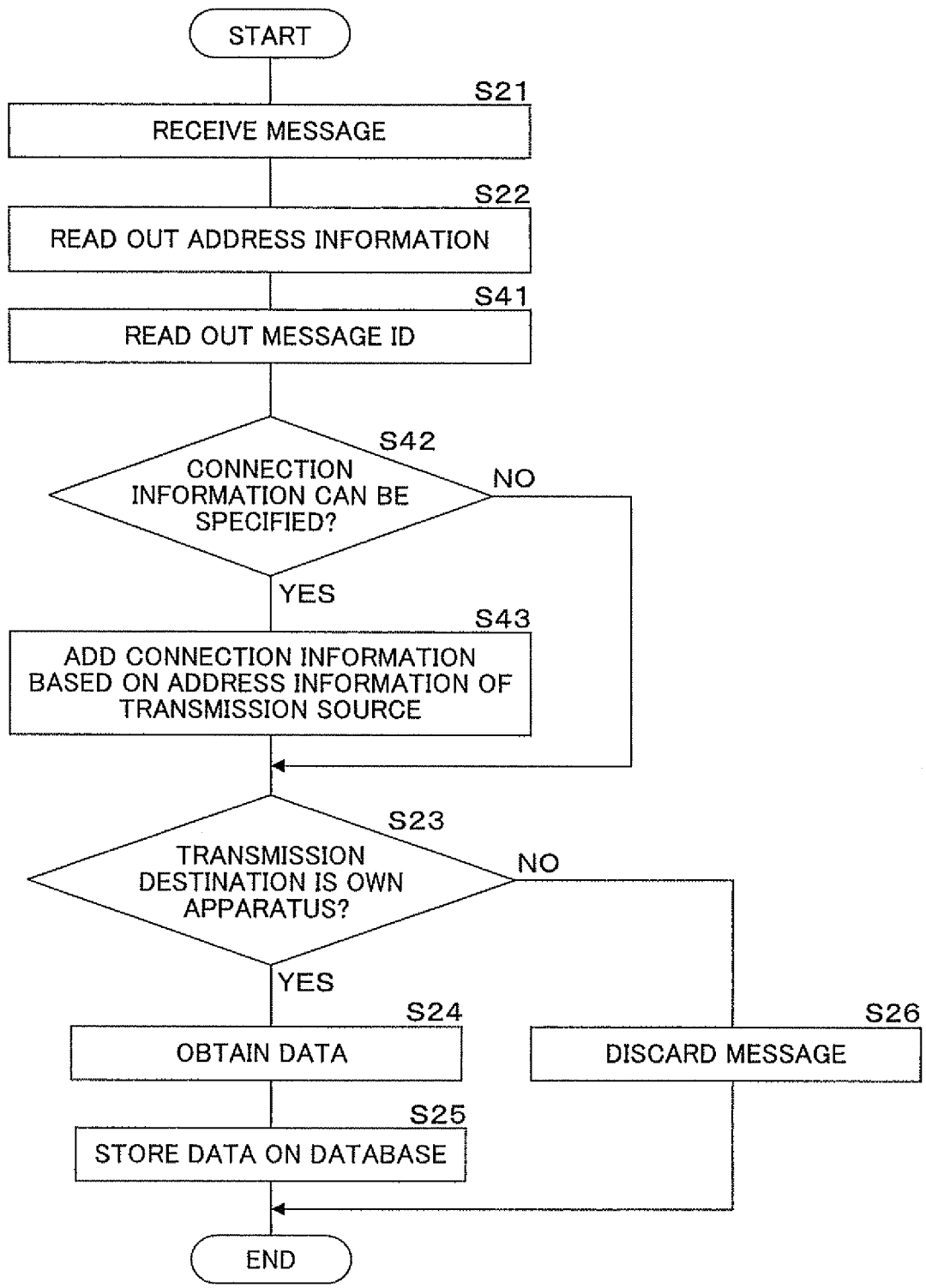
FIG. 10 is a flowchart showing an example of a procedure when a control unit of a distribution apparatus, included in a communication system mounted on a motor vehicle according to an embodiment 2, receives message transmitted from a GW apparatus.

FIG. 10 is a flowchart showing an example of a procedure when the control unit 40 of the distribution apparatus 4, included in the communication system mounted on the motor vehicle according to the embodiment 2, receives message transmitted from the GW apparatus 3a, 3b.

The control unit 40 of the distribution apparatus 4 reads out address information provided on the received message (S22), and further reads out an message ID contained in the received message (step S41). The control unit 40 refers the transmission source information and the connection information stored on the storage unit 41, and then determines whether being able to specify connection information of an ECU 1 being the transmission source of the read message ID or not (step S42). When there is no connection information for the ECU 1 being the transmission source of the read message ID, the control unit 40 determines specification-impossible.

When having determined not specification-impossible (S42: NO), the control unit 40 proceeds the procedure to the step S23. When having determined specification-impossible (S42: YES), the control unit 40 adds new connection information composed of an apparatus identification number of a transmission source and a communication port identification number in the apparatus indicated by the address information being read at the step S22 (step S43), and proceeds the procedure to the step S23.

When the new ECU 1 is connected to the branch line 2c, 2d, the control unit 40 of the distribution apparatus 4 receives a message transmitted from the new ECU 1 through the branch line communication unit 42. The control unit 40 reads out a message ID from the received message, and determines whether being able to specify connection information of an ECU 1 being the transmission source of the read message ID or not. When having determined specification-impossible, the control unit 40 adds new connection information composed of own apparatus identification number identifying the distribution apparatus 4 and a communication port identification number through which the message is received.

The control unit 40 of the distribution apparatus 4 may performs the procedure shown by the flowchart of FIG. 10, not only when the control unit 40 receives a message transmitted by the new ECU 1 at least during the activation, but also every time the new ECU 1 transmits a message at a constant interval and the message is transmitted by the GW apparatus 3a, 3b. In that case, the connection information may be added by control unit 40 when having been not stored yet, or may be updated by control unit 40 when having been stored already, while the control unit 40 does not determine at the step S42 whether being able to specify the connection information or not. The control unit 40 may be configured to perform the procedure once a predetermined time or every predetermined number of times receiving such a message, rather than every time receiving a message from the new ECU 1. Alternatively, the control unit 40 may perform the procedure shown by the flowchart of FIG. 10 only when the new ECU 1 has transmitted a specific message during the activation, while the control unit 40 may perform the procedure shown by the flowchart of FIG. 6 when the new ECU 1 has transmitted a message after the transmission of the specific message.

Next, it will be described about an example that connection information of the new ECU 1 are added through the procedure shown in the flowchart of FIG. 10 and performed by the control unit 40 of the distribution apparatus 4. FIG. 11 is a schematic view showing an example of contents and flows of message transmitted from the new ECU1 in the communication system mounted on the motor vehicle according to the embodiment 2. A configuration of the schematic view of FIG. 11 is similar to those of FIG. 8 and FIG. 9.

It will be described, in reference to the schematic view of FIG. 11, about performance of the distribution apparatus 4 when the new ECU 1 is connected to the branch line 2f to which the GW apparatus 3b is connected and the new ECU 1 activates. A hollow arrow in FIG. 11 represents a flow of the message. In the following description, it is assumed that "0020" is provided as the message ID of the message transmitted from the newly connected ECU 1. When having received the message transmitted from the new ECU 1, the control unit 30 of the GW apparatus 3b adds address information to the message and transmits to the distribution apparatus 4 the message containing the address information that is "1" "0" "3" "2" as shown by X3 in FIG. 11.

When having received the message as shown by X3 in FIG. 11, the control unit 40 of the distribution apparatus 4 reads out address information from the received message, and further reads out the message ID "0020". The control unit 40 refers the transmission source information stored on the storage unit 41 and specifies an identification number "20" of the ECU 1 being the transmission source of the message ID "0020" (see FIG. 3 A). The control unit 40 refers the transmission source information stored on the storage unit 41 and determines that the connection information of the ECU 1 provided with the number "20" is not specified, because the connection information has not been stored in the storage unit 41. Then, the control unit 40 adds an apparatus identification number "3" and a communication port identification number "2" that are included in the address information, as the connection information of the ECU provided with the number "20".

FIG. 12 is an explanation view showing contents about connection information added by a process of the control unit 40 of the distribution apparatus 4 according to the embodiment 2. The explanation view of FIG. 3C corresponds to the connection information before the addition performed by the process of the control unit 40.

As shown in the explanation view of FIG. 12, the connection information is added for the ECU 1 provided with the number "20". The newly added connection information illustrates that the ECU 1 provided with the number "20" is connected to the branch line 2f corresponding to the communication port provided with "2" of the GW apparatus 3b provided with the apparatus identification number "3".

Therefore, the control unit 40 of the distribution apparatus 4 can properly transmit and receive a message in a flexible response to various systems including the case that the ECUs 1 are newly connected.

In the embodiment 2, each of ECUs 1 may be configured to surely transmit a message during the activation, not only the newly connected ECU 1 but also the already connected ECUs 1. Furthermore, the control unit 40 of the distribution apparatus 4 may be configured, then, to perform the procedure shown in the flowchart of FIG. 10, in order to dynamically create the connection information as shown in the explanation view of FIG. 3C or FIG. 12. Alternatively, the control unit 40 of the distribution apparatus 4 may be configured to update the connection information based on the message transmitted from the ECU 1 at every constant time, in the case that connection configuration change is anticipated during operating time of the communication system mounted on the motor vehicle. For example, it is possible to create proper connection information based on the connection configuration to the GW apparatuses 3a, 3b and the distribution apparatus 4 of the ECUs 1 and on the connection configuration between the GW apparatuses 3a, 3b and the distribution apparatus 4, while these connection configuration are changed in accordance with the type or the option of the motor vehicle.

(Alternate Embodiment 2)

Next, it will be described as an alternate embodiment 2 about the case that an ECU 1 is connected to a plurality of branch lines among the branch lines 2a, 2b, 2c, 2d, 2e, 2f, i.e., about multiple connections. The following description is illustrated about a procedure that the control unit 40 of the distribution apparatus 4 updates the connection information when an ECU 1 provided with a number "1" is connected to both the branch line 2b and the branch line 2f as the multiple connections.

The configurations of the communication system mounted on the motor vehicle of the alternate embodiment 2 is similar to those of the embodiment 2, except for configurations that one ECU 1 is connected to both the branch line 2b and the branch line 2f and that the control unit 40 of the distribution apparatus 4 stores connection information based on such the multiple connections. The same numerals are utilized for configurations of the alternate embodiment 2 similar to those of the embodiment 2, and thus, it will not be described in detail about configurations of the alternate embodiment 2 similar to those of the embodiment 2.

Figure 13:
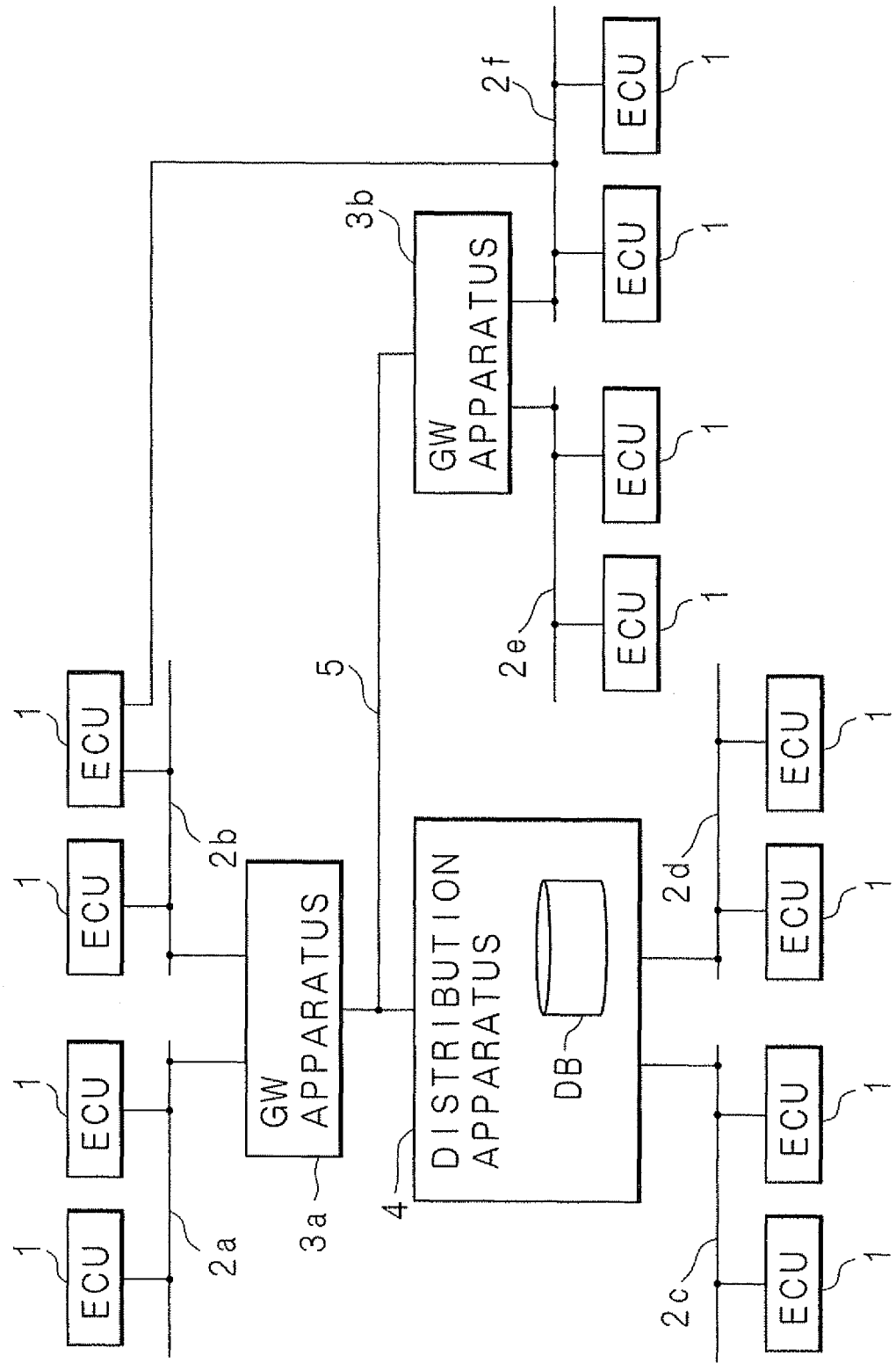
FIG. 13 is a block diagram showing components of a communication system mounted on a motor vehicle according to an alternate embodiment 2.

FIG. 13 is a block diagram showing components of the communication system mounted on the motor vehicle according to the alternate embodiment 2. In the communication system mounted on the motor vehicle according to the alternate embodiment 2, one ECU 1 is connected to both the branch line 2b and the branch line 2f. In this case, a process of the ECU 1 determines which of the branch line 2a or the branch line 2b is utilized for the message transmission of the ECU 1. For receiving a message from the ECU 1 and transmitting a message to the ECU 1, the control unit 40 of the distribution apparatus 4 should recognize which branch line among the branch lines 2b, 2f or both the branch lines 2b, 2f the ECU 1 utilizes for a message transmission. Thus, the control unit 40 of the distribution apparatus 4 updates the connection information for the ECU 1 based on the message transmitted from the ECU 1. In the alternate embodiment 2, it is possible to delete older connection information, because the control unit 40 stores each connection information together with update time of the corresponding connection information obtained from a built-in timer (not shown).

In the alternate embodiment 2, the control unit 40 of the distribution apparatus 4 is provided a setting condition that defines the data transmission between the distribution apparatus 4 and the ECU 1 to be performed via either the branch line 2b or the branch line 2f, or both the branch lines 2b, 2f.

Firstly, it will be described about the case that the setting condition defines the data transmission between the distribution apparatus 4 and the ECU 1 to be performed via either the branch line 2b or the branch line 2f, or both the branch lines 2b, 2f. The control unit 40 of the distribution apparatus 4 updates connection information based on address information added by the control unit 30 of the GW apparatus 3a, 3b, every time having received a message transmitted from the ECU 1 provided with the number "1".

When the ECU 1 has transmitted the message via the branch line 2b, a communication port is specified that is provided with the identification number "2" of the branch line communication unit 32 of the GW apparatus 3a. Thus, the address message "1" "0" "2" "2" is added when the message is transmitted from the GW apparatus 3a to the distribution apparatus 4. Hence, the control unit 40 of the distribution apparatus 4 stores, as the connection information, the apparatus identification number of the transmission source "2" and the communication port number "2" in association with the ECU 1 provided with the number "1". Before the connection information is updated, the control unit 40 of the distribution apparatus 4 adds the "2" "2" "1" "0" as the address information, upon transmitting a message to the ECU 1 provided with the number "1".

When the ECU 1 has transmitted a message via the branch line 2f at different timing, "1" "0" "3" "2" is added as the address information to the message transmitted from the GW apparatus 3b to the distribution apparatus 4 because a communication port is specified whose identification number is "2" in the branch line communication unit 32 of the GW apparatus 3b. Thus, the control unit 40 of the distribution apparatus 4 associates the ECU 1 provided with the number "1" to the apparatus identification number "3" of the transmission source and the communication port identification number "2", to update the connection information. Before the following update is coming for the connection information, the control unit 40 of the distribution apparatus 4 adds the "3" "2" "1" "0" as the address information, upon transmitting a message to the ECU 1 provided with the number "1".

Next, it will be described about the case that the setting condition defines the data transmission between the distribution apparatus 4 and the ECU 1 to be performed via both the branch line 2b and the branch line 2f. In this case, the control unit 40 of the distribution apparatus 4 adds connection information based on the address information added by the control unit 30 of the GW apparatus 3a, 3b when the connection information is different from connection information having already stored. Thus, the control unit 40 of the distribution apparatus 4 adds connection information about the apparatus identification number "3" and the communication port identification number "2" into the connection information composed of the apparatus identification number "2" and the communication port identification number "2", and stores those connection information in association with the ECU 1 provided with the number "1". Furthermore, a message is transmitted via the trunk line 5 with multicast transmission, in this case. When transmitting a message to the ECU provided with the number "1", the control unit 40 of the distribution apparatus 4 adds address information based on two connection information (see FIG. 4B).

It may be desirable about the message transmitted from the ECU 1 provided with the number "1" that newer message contains a serial number having larger or smaller value, in order to discriminate whether two messages transmitted in different paths have the same contents or different contents due to update. Thus, the control unit 40 of the distribution apparatus 4 can discriminate whether the received message is new or old on the basis of the serial number of the received message. When having received twice the same message transmitted from the same ECU 1, hence, the control unit 40 can discard one of the same two messages or one older message.

Figure 14:
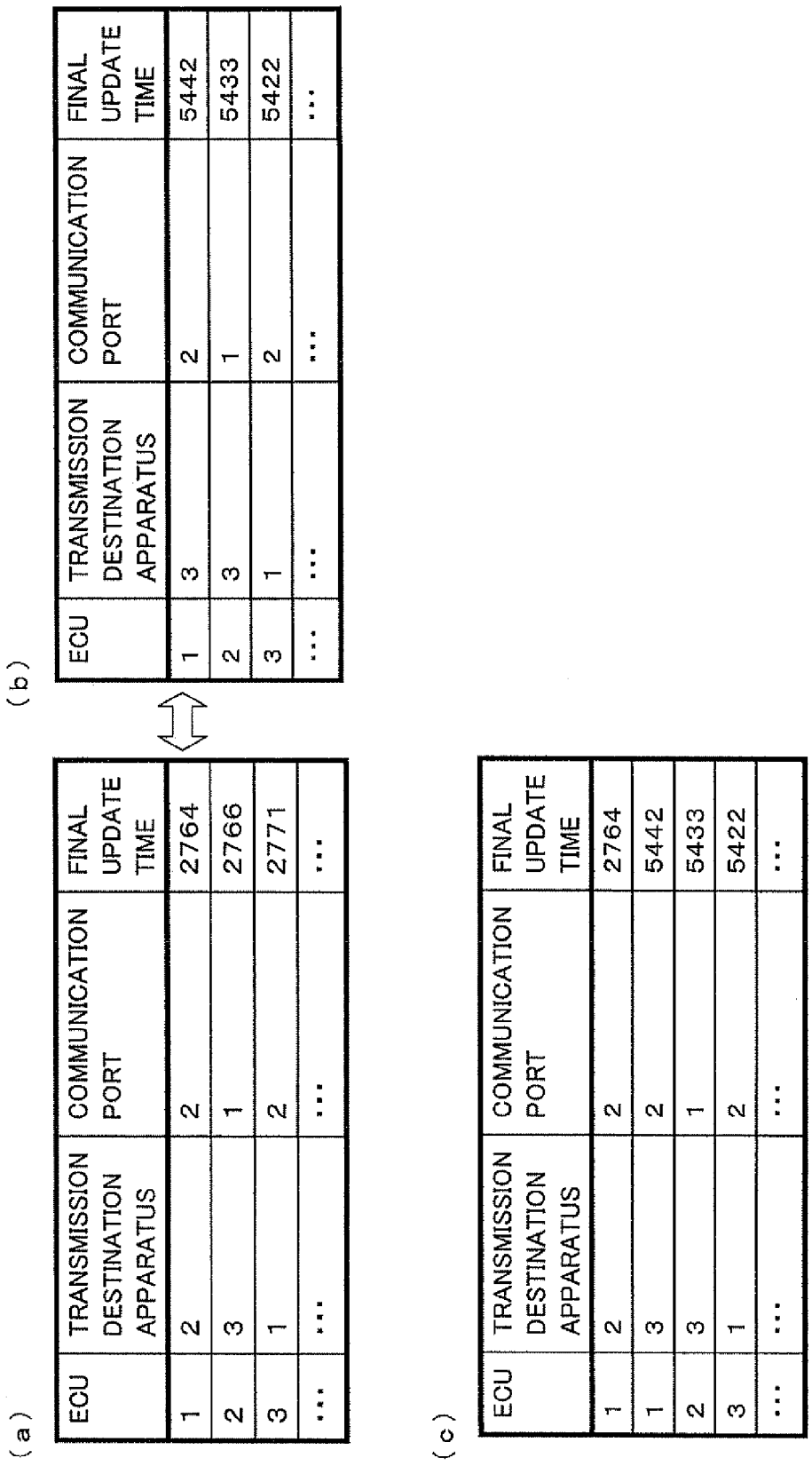
FIG. 14A, FIG. 14B and FIG. 14C are explanation views showing contents about connection information stored in a storage unit of a distribution apparatus according to the alternate embodiment 2.

FIG. 14A, FIG. 14B and FIG. 14C are explanation views showing contents about connection information stored in a storage unit 41 of the distribution apparatus 4 according to the alternate embodiment 2. As shown in the explanation views of FIG. 14A, FIG. 14B and FIG. 14C, connection information in the alternate embodiment 2 contains time information when the control unit 40 has received a message. FIG. 14A and FIG. 14B illustrate connection information in the case that the setting condition defines the data transmission between the distribution apparatus 4 and the ECU 1 to be performed via either the branch line 2b or the branch line 2f. The storage unit 41 stores connection information as shown in FIG. 14A or FIG. 14B that is changed in response to the path of the message transmitted from the ECU 1. FIG. 14C illustrates connection information in the case that the setting condition defines the data transmission between the distribution apparatus 4 and the ECU 1 to be performed via both the branch line 2b and the branch line 2f.

As shown in the explanation views of FIG. 14A, FIG. 14B and FIG. 14C, final update time is associated and stored in the connection information. Therefore, it is possible to delete old connection information at a status, such as quiescent time of the ECUs 1 or disconnection with the branch line 2a, 2b, 2c, 2d, 2e, 2f.

Figure 15:
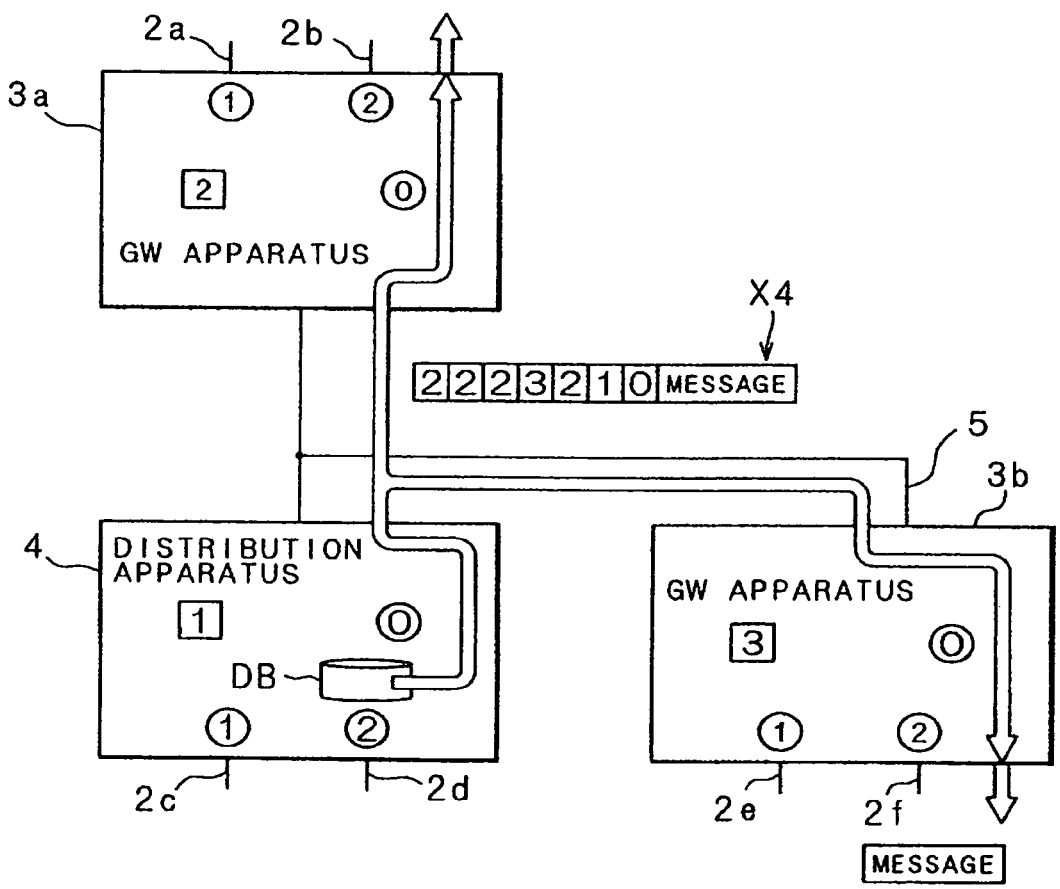
FIG. 15 is a schematic view showing an example of contents and flows of message transmitted from the distribution apparatus in the communication system mounted on the motor vehicle according to the alternate embodiment 2.

FIG. 15 is a schematic view showing an example of contents and flows of message transmitted from the distribution apparatus 4 in the communication system mounted on the motor vehicle according to the alternate embodiment 2. The schematic view of FIG. 15 is similar to those of FIG. 8 and FIG. 9. It will be described in reference to the schematic view of FIG. 15 about an example of contents and flows of message transmitted from the distribution apparatus 4 in the case that the setting condition defines the data transmission between the distribution apparatus 4 and the ECU 1 to be performed via both the branch line 2b and the branch line 2f. A hollow arrow in FIG. 15 represents a flow of the message. When detecting on the basis of the transmission timing information stored on the storage unit 41 that a timing is coming for transmitting a message to an ECU 1 provided with the identification number "1" (See FIG. 3B), the control unit 40 of the distribution apparatus 4 adds address information based on the connection information shown in FIG. 14C and transmits the message. In this case, "2" "2" "2" "3" "2" "1" "0" is added as the address information as shown by X4 in FIG. 15. In short, multicast transmission is performed with an apparatus identification number of the GW apparatus 3a and a communication port number of the communication port corresponding to the branch line 2b in the GW apparatus 3a as the first transmission destination, and with an apparatus identification number of the GW apparatus 3b and a communication port number of the communication port corresponding to the branch line 2f in the GW apparatus 3a as the second transmission destination.

It is possible to concomitantly perform the multicast transmission and the unicast transmission via the trunk line 5, by adding "1" that represents a transmission destination as the first number of each address information shown by X1, X2 and X3 in the schematic views of FIG. 8, FIG. 9 and FIG. 11. It is also possible to perform the broadcast transmission, by adding a maximum number of the transmission destinations as the first number and making the control unit 30 of the GW apparatus 3a, 3b and the control unit 40 of the distribution apparatus 4 detect the first number.

As described above, address information is added onto the transmitted message. Thus, it is possible to update connection information, even when the ECU 1 is connected to a plurality of branch lines among the branch lines 2a, 2b, 2c, 2d, 2e, 2f, i.e., with the multiple connection. Therefore, it is possible to transmit a message with proper address information from the distribution apparatus 4.

(Embodiment 3)

In the Embodiments 1 and 2, it is Configured that the distribution apparatus 4 is the specific GW apparatus including the storage region utilized for the database DB, which is different from the other GW apparatuses 3a, 3b. However, it is considered about the case that, for example, the GW apparatus 3a should work as "the distribution apparatus (a specific relay apparatus)" in accordance with the connection configuration on the trunk line 5 and the message transmission path, rather than the distribution apparatus 4 works as "the distribution apparatus". In view of such a case, it is configured in an embodiment 3 that any GW apparatuses connected to the trunk line 5 include such storage regions utilized for the database and can work as the distribution apparatus. Furthermore, it is configured in the embodiment 3 that one GW apparatus is automatically selected from the GW apparatuses and works as the distribution apparatus that is the specific GW (relay) apparatus.

Figure 16:
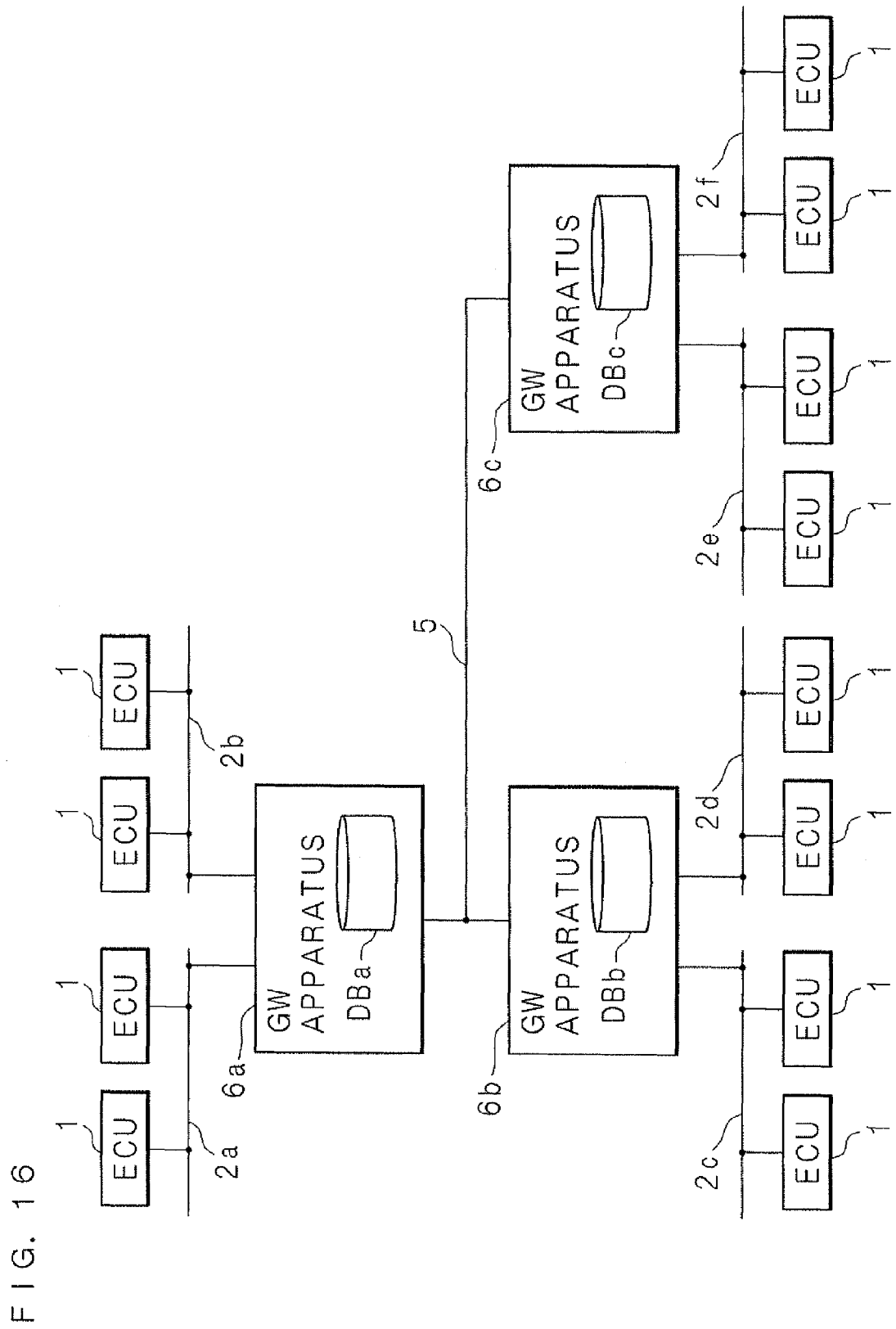
FIG. 16 is a block diagram showing components of a communication system mounted on a motor vehicle according to an embodiment 3.

FIG. 16 is a block diagram showing components of a communication system mounted on a motor vehicle according to the embodiment 3. The communication system mounted on the motor vehicle according to the embodiment 3 includes, ECUs 1, communication lines 2a, 2b, 2c, 2d, 2e, 2f being branch lines, GW apparatuses 6a, 6b, 6c relaying data transmission among the ECUs 1, and a communication line 5 being a trunk line.

The communication system mounted on the motor vehicle of the embodiment 3 has similar configurations to those of the embodiments 1 and 2, except for a configuration that the GW apparatuses 3a, 3b and the distribution apparatus 4 in the embodiments 1 and 2 are replaced to the GW apparatuses 6a, 6b, 6c. Thus, it will not described in detail about the ECUs 1, the communication lines 2a, 2b, 2c, 2d, 2e, 2f and the communication line 5, which are given the same numeral as those of the embodiments 1 and 2. Hence, it will be described below about configurations to select one distribution apparatus (a specific relay apparatus) from the GW apparatuses 6a, 6b, 6c.

Configuring the communication system mounted on the motor vehicle according to the embodiment 3, the GW apparatuses 6a, 6b, 6c respectively include regions. The regions can be utilized as the databases DBa, DBb, DBc when the GW apparatuses 6a, 6b, 6c work as the distribution apparatus.

FIG. 17 is a block diagram showing inner components of the GW apparatus 6a included in the communication system mounted on the motor vehicle according to the embodiment 3. The inner components of the GW apparatus 6a are similar to those of the GW apparatuses 6b, 6c. Thus, it will not be described in detail about the inner components of the GW apparatuses 6b. 6c.

The GW apparatus 6a includes: a control unit 60 that controls each component described below; a storage unit 61 that is composed of a volatile memory; a branch line communication unit 62 that is connected to branch lines 2a, 2b and a trunk line communication unit 63 that connects to the trunk line 5. The storage unit 61 is not limited to be a volatile memory. The storage unit 61 may be composed of a rewritable non-volatile memory.

The control unit 60 is supplied with electric power from an electric power supply (not shown), such as an alternator or battery mounted on the motor vehicle, reads out a control program stored in nonvolatile inner memory (not shown), and controls each component.

The storage unit 61 stores various information utilized by the control unit 30 for each process. The information includes identification numbers for identifying the GW apparatus 6a itself from the other GW apparatuses 6b, 6e. In the embodiment 3, the storage unit 61 stores "2" as the identification number of the GW apparatus 6a, "1" as the identification number of the GW apparatus 6b and "3" as the identification number of the GW apparatus 6c.

The branch line communication unit 62 implements transmitting a message via the branch lines 2a, 2b based on the CAN protocol. The control unit 60 can discriminate a communication port for the branch line 2a in the branch line communication unit 62 and a communication port for the branch line 2b in the branch line communication unit 62. When performing message transmission with the ECUs 1 connected to the branch line 2a, the control unit 60 utilizes a communication port provided with "1" in the branch line communication unit 62. On the other hand, when performing message transmission with the ECUs 1 connected to the branch line 2b, the control unit 60 utilizes a communication port provided with "2" in the branch line communication unit 62.

The trunk line communication unit 63 implements transmission of messages via the trunk line 5 with the other GW apparatuses 6a, 6b and transmission of notification frames described later.

The control unit 60 basically transmits a message from the ECU 1 connected to the branch line 2a, 2b, similarly to the control unit 30 of the GW apparatus 3a, 3b in the embodiments 1 and 2, in order to aggregate data into any of the GW apparatuses 6a, 6b, 6c. When transmitting the message, the control unit 60 adds address information about the transmission source composed of own apparatus identification number and a communication port identification number of a communication port in own branch line communication unit 62, to the message. When transmitting the message, the control unit 60 furthermore adds address information about the transmission destination composed of an apparatus identification number and a communication port identification number of any of the GW apparatuses 6a, 6b, 6c working as the distribution apparatus.

The control unit 60 of the GW apparatus 6a, 6b, 6c according to the embodiment 3 can work as if the distribution apparatus 4 in the embodiments 1 and 2. It should be noted that any one of the GW apparatus 6a, 6b, 6c is selected to work as the distribution apparatus. It will be described below about the procedure to select one of the GW apparatuses 6a, 6b, 6c as the distribution apparatus.

When the GW apparatuses 6a, 6b, 6c start activation, the distribution apparatus has not been selected yet. Thus, any GW apparatuses 6a, 6b, 6c show candidacies to be the distribution apparatus. At that time, the control unit 60 of the GW apparatus 6a, 6b, 6c transmits a candidacy notification frame through the trunk line communication unit 63 via the trunk line 5 to the GW apparatus 6a, 6b, 6c. The candidacy notification frame is configured to contain address information to specify the apparatus showing the candidacy. For example, "7" "0" "2" "0" is provided as the address information to the candidacy notification frame transmitted from the GW apparatus 6a. The first and the second numbers on the address information are for the transmission destination, and the first number "7" indicates broadcast transmission to all apparatuses being the transmission destinations. The third number "2" and the fourth number "0" on the address information are for the transmission source, and these indicate the transmission source is the GW apparatus 6a provided with the apparatus identification number "2".

Each GW apparatus 6a, 6b, 6c determines on the basis of the candidacy notification frame received from the other GW apparatuses 6a, 6b, 6c whether withdrawing own candidacy or not. When having determined to withdraw own candidacy, any two of the GW apparatus 6a, 6b, 6c change into a rejected status. The GW apparatus 6a, 6b, 6c in the rejected status performs processes similar to those of the GW apparatuses 3a, 3b in the embodiments 1 and 2. When finally having shown own candidacy without having withdrawn, any one of GW apparatuses 6a, 6b, 6c changes into a selected status. The one of GW apparatuses 6a, 6b, 6c in the selected status works as the distribution apparatus. The selected GW apparatus among the GW apparatuses 6a, 6b, 6c transmits a notification frame showing success in selection towards each GW apparatus 6a, 6b, 6c. The notification frame showing success in selection also contains address information for specifying the selected GW apparatus. For example, "7" "0" "1" "0" is provided as the address information to the notification frame showing success in selection transmitted from the GW apparatus 6b. The one of GW apparatuses 6a, 6b, 6c in the selected status performs processes similar to those of the distribution apparatus 4 in the embodiment 1 and 2.

Assume that the GW apparatus 6b is in the selected status among the GW apparatuses 6a, 6b, 6c. The GW apparatus 6b continuously transmits the notification frame showing success in selection, during performing the processes similar to those of the distribution apparatus 4. On the other hand, the other GW apparatuses 6a, 6c in the rejected status continuously receive the transmitted notification frame showing success in selection. If a failure has occurred in the GW apparatus 6b being in the selected status and then the GW apparatus 6b has stopped transmitting the notification frame showing success in selection, the other GW apparatuses 6a, 6c are waiting to receive the notification frame showing success in selection and detect that the notification frame cannot be transmitted. After the detection, the other GW apparatuses 6a, 6c changes again into an unselected status that a distribution apparatus is not selected yet. Then, one of the GW apparatuses 6a, 6c is selected to work as the distribution apparatus.

Next, it will be described in reference to a flowchart about a procedure that the control unit 60 of each GW apparatus 6a, 6b, 6c transmits and receives the candidacy notification frame and the notification frame showing success in selection, changes into the unselected status, the rejected status, and the selected status, to select one GW apparatus among the GW apparatuses 6a, 6b, 6c as the distribution apparatus. In the following description, each process is illustrated in accordance with the unselected status, the rejected status and the selected status.

Figure 18:
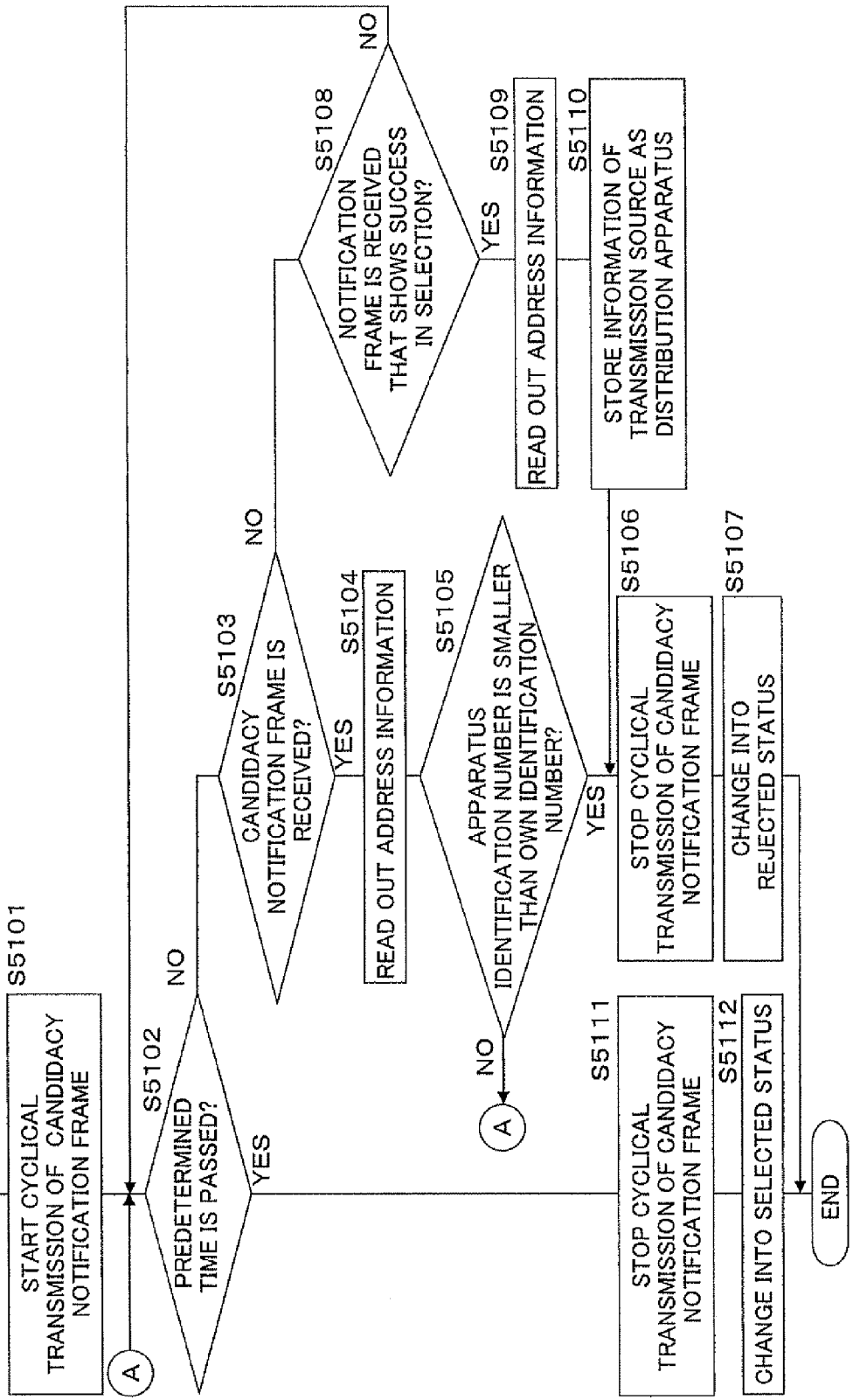
FIG. 18 is a flowchart showing an example of a procedure performed by a control unit of the GW apparatus, included in the communication system mounted on the motor vehicle according to the embodiment 3, in an unselected status that a distribution apparatus is not selected yet.

FIG. 18 is a flowchart showing an example of a procedure performed by the control unit 60 of the GW apparatus 6a, included in the communication system mounted on the motor vehicle according to the embodiment 3, in the unselected status that the distribution apparatus is not selected yet. The procedure of the control unit 60 of the GW apparatus 6a is similar to one of the control unit 60 of the GW apparatus 6b, 6c. Thus, it will not be described in detail about the procedure of control unit 60 of the GW apparatus 6b, 6c.

When being in the unselected status for the distribution apparatus, the control unit 60 starts cyclically transmitting the candidacy notification frame (step S5101). The control unit 60 determines whether a predetermined time has passed or not since the unselected status (activation) is started (step S5102). When having determined that the predetermined time has not passed (S5102: NO), the control unit 60 determines whether the trunk line communication unit 63 receives a candidacy notification frame or not (step S5103).

When having determined that the trunk line communication unit 63 received the candidacy notification frame (S5103: YES), the control unit 60 reads out address information from the candidacy notification frame (step S5104), and determines whether own apparatus identification number, i.e., the apparatus identification number of the GW apparatus 6a is larger than an apparatus identification number of the transmission source indicated by the read address information or not (step S5105). When having determined larger (S5105: YES), the control unit 60 withdraws the candidacy and stops the cyclical transmission of the candidacy notification frame (step A5106). Then, the control unit 60 changes into the rejected status (step S5107) and terminates the procedure performed at the unselected status.

When having determined that the trunk line communication unit 63 does not receive the candidacy notification farm (S5103: NO), the control unit 60 determines whether the trunk line communication unit 63 receives a notification frame showing success in selection or not (step S5108). When having determined that the trunk line communication unit 63 receives neither the candidacy notification frame nor the notification frame showing success in selection (S5108: NO), the control unit 60 returns the procedure to the step S5102.

When having determined at the step S5108 that the trunk line communication unit 63 receives the notification frame showing success in selection (S5108: YES), the control unit 60 detects that another GW apparatus has been selected and that the GW apparatus 6a has not been selected. Then, the control unit 60 reads out address information from the received notification frame (step S5109), and stores an apparatus identification number of the transmission source in the read address information as an identification number of the distribution apparatus (step S5110). Furthermore, the control unit 60 stops the cyclical transmission of the candidacy notification frame (S5106), changes into the rejected status (S5107), and terminates the procedure performed at the unselected status of the distribution apparatus.

When having determined smaller at the step S5105 (S5105: NO), the control unit 60 returns the procedure to the step S5102.

When having determined at the step S5102 that the predetermined time has passed with the unselected status (S5102: YES), the control unit 60 detects that own apparatus, i.e., the GW apparatus 6a has been selected as the control unit 60 does not change into the rejected status. Then, the control unit 60 stops the cyclical transmission of the candidacy notification frame (step S5111), changes into the selected status (step S5112) and terminates the procedure performed at the unselected status of the distribution apparatus.

In the procedure shown by the flowchart of FIG. 18, it is illustrated to determine at the step S5105 whether the control unit 60 withdraws the candidacy or not, on the basis of the determination whether own apparatus identification number is larger or not. However, the present invention is not limited to the illustration. It may be configured that the control unit 60 determine whether own apparatus identification number is smaller or not, and in this configuration, the GW apparatus with the largest or the smallest identification number should be selected as the distribution apparatus.

Figure 19:
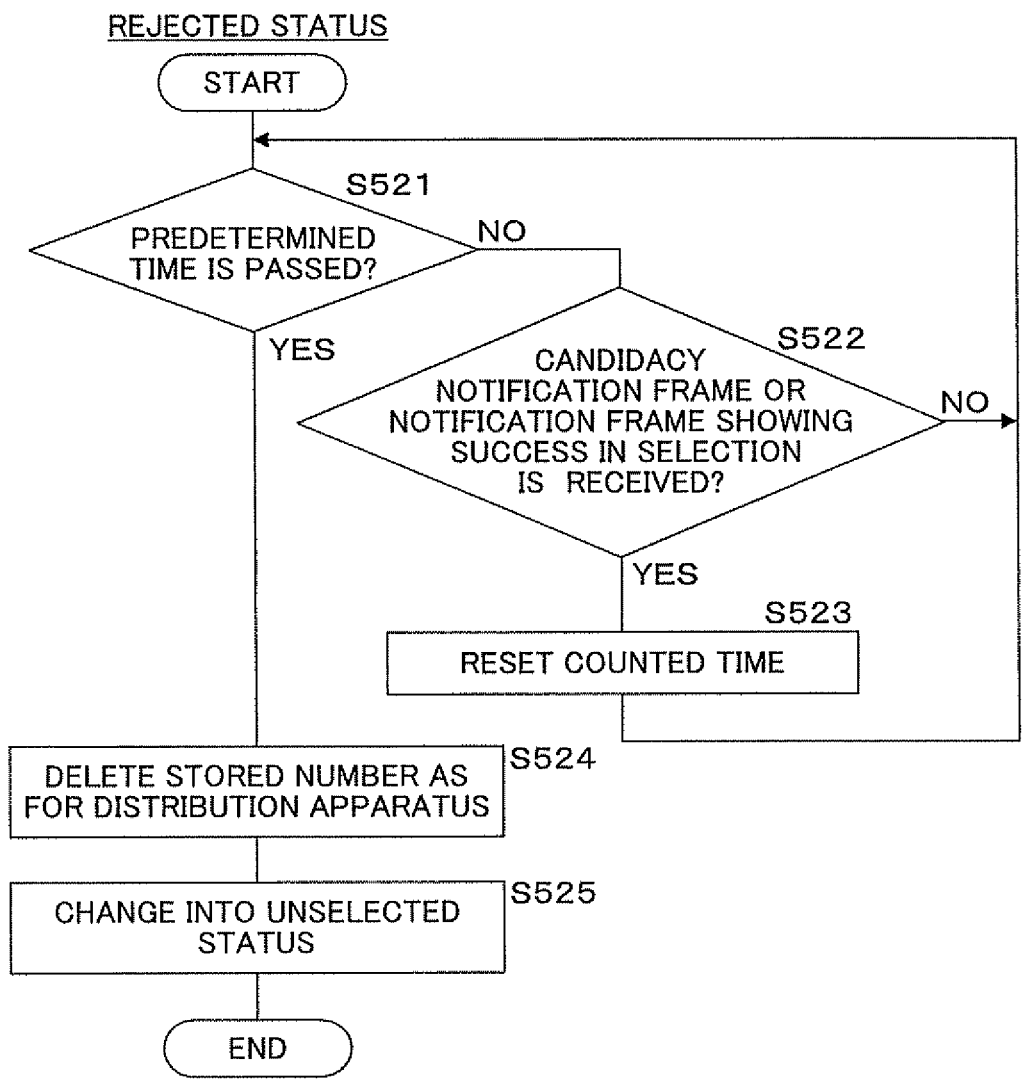
FIG. 19 is a flowchart showing an example of a procedure performed by the control unit of the GW apparatus, included in the communication system mounted on the motor vehicle according to the embodiment 3, which is not selected as the distribution apparatus.

FIG. 19 is a flowchart showing an example of a procedure performed by the control unit 60 of the GW apparatus 6a, included in the communication system mounted on the motor vehicle according to the embodiment 3, which is not selected as the distribution apparatus, i.e., in the rejected status.

When having changed into the rejected status, the control unit 60 determines whether a predetermined time has passed or not since the control unit 60 changed into the rejected status (step S521). When having determined that the predetermined time has not passed yet (S521: NO), the control unit 60 determines whether the trunk line communication unit 63 has received a candidacy notification frame or a notification frame showing success in selection from another GW apparatus 6b, 6c or not (step S522). When having determined that the trunk line communication unit 63 has not received neither the candidacy notification frame nor the notification frame showing success in selection before the predetermined time has passed (S522: NO), the control unit 60 returns the procedure to the step S521.

When having determined that the trunk line communication unit 63 has received the candidacy notification frame or the notification frame showing success in selection before the predetermined time has passed (S522: YES), the control unit 60 resets counted time for the predetermined time (step S523), returns the procedure to the step S521, and determines again whether the predetermined time has passed or not.

When the control unit 60 has determined that the predetermined time has passed with receiving neither the candidacy notification frame nor the notification frame showing success in selection (S521: YES), it can be considered that all the GW apparatuses 6a, 6b, 6c change into the rejected status. Thus, when having stored an apparatus identification number as the distribution apparatus, the control unit 60 deletes the stored number (step S524), changes into the unselected status again (step S525), and terminates the procedure performed at the rejected status.

Figure 20:
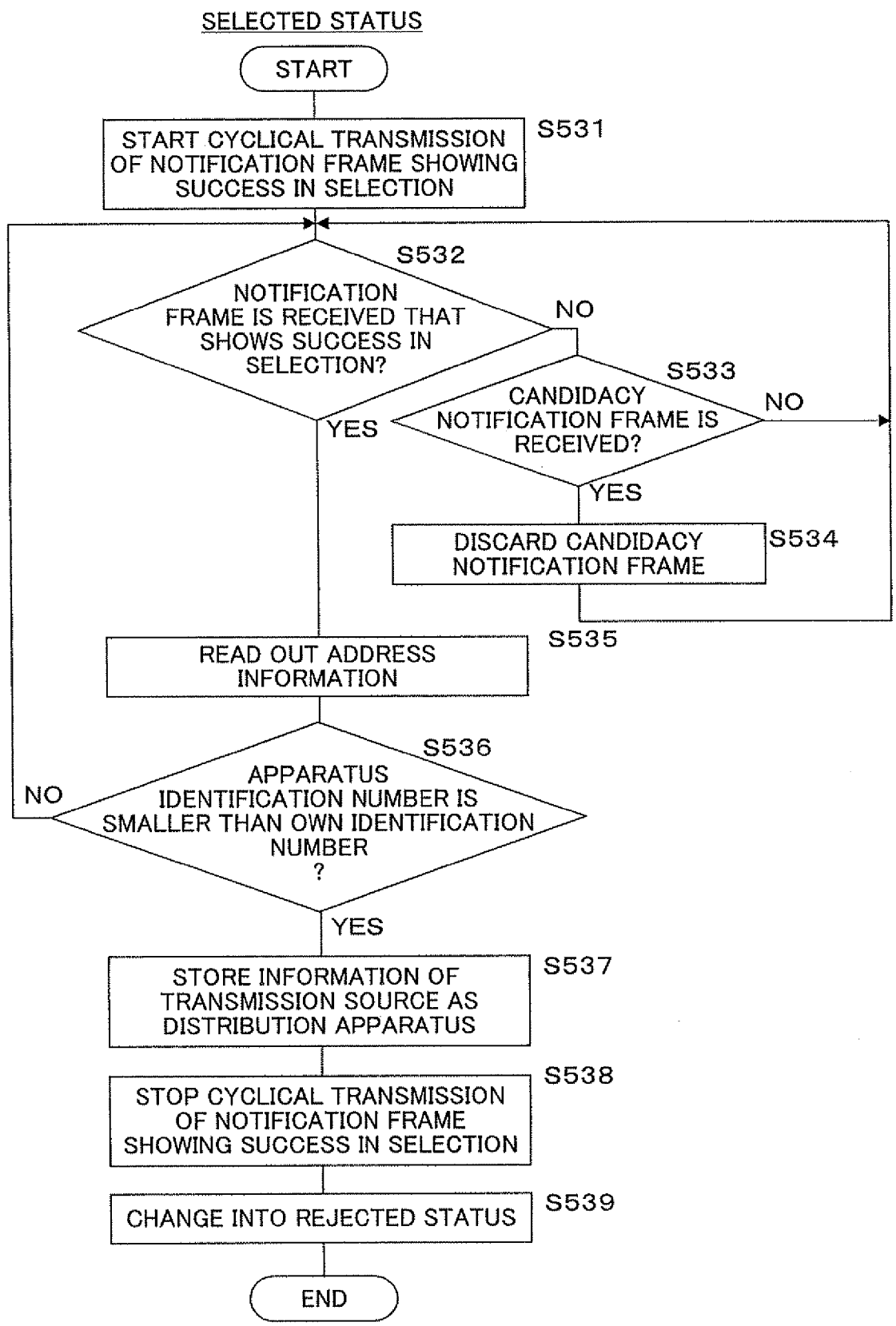
FIG. 20 is a flowchart showing an example of a procedure performed by the control unit of the GW apparatus, included in the communication system mounted on the motor vehicle according to the embodiment 3, which is selected as the distribution apparatus.

FIG. 20 is a flowchart showing an example of a procedure performed by the control unit 60 of the GW apparatus 6a, included in the communication system mounted on the motor vehicle according to the embodiment 3, which is selected as the distribution apparatus, i.e., in the selected status.

When having changed into the selected status, the control unit 60 starts working as the distribution apparatus and cyclically transmitting the notification frame showing success in selection toward the other apparatuses (step S531). However, it can be considered that two of the GW apparatuses 6a, 6b, 6c change into the selected status at the same time. Thus, the control unit 60 determines whether the trunk line communication unit 63 has received the notification frame showing success in selection or not (step S532).

When having determined that the trunk line communication unit 63 has not received the notification frame showing success in selection (S532: NO), the control unit 60 determines whether the trunk line communication unit 63 has received the candidacy notification frame or not (step S533). When having determined that the trunk line communication unit 63 has not received the candidacy notification frame (S533: NO), the control unit 60 returns the procedure to the step S532. When having determined that the trunk line communication unit 63 has received the candidacy notification frame (S533: YES), the control unit 60 discards the received candidacy notification frame (step S534) and returns the procedure to the step S532.

When having determined that the trunk line communication unit 63 has received the notification frame showing success in selection (S532: YES), the control unit 60 reads out address information from the received notification frame showing success in selection (step S535), and determines whether own apparatus identification number, i.e., the apparatus identification number of the GW apparatus 6a is larger or not than an apparatus identification number of the transmission source indicated by the read address information (step S536). When having determined smaller (S536: NO), the control unit 60 returns the procedure to the step S532.

When having determined larger (S536: YES), the control unit 60 stores the apparatus identification number of the transmission source indicated by the address information being read out at the step S535 as the identification number of the distribution apparatus (step S537). Then, the control unit 60 stops cyclical transmission of the notification frame showing success in selection (step S538), and changes into the rejected status (step S539). At that time, the control unit 60 stops working as the distribution apparatus and terminates the procedure performed at the selected status.

In the configurations of the communication system mounted on the motor vehicle according to the embodiment 3, for example, one millisecond is utilized as the cyclical interval for transmitting the candidacy notification frame started at the step S5101 shown in the flowchart of FIG. 18 and as the cyclical interval for transmitting the notification frame showing success in selection started at the step S531 shown in the flowchart of FIG. 20. Furthermore, five milliseconds are utilized, for example, as the predetermined time at the step S5102 shown in the flowchart of FIG. 18 and as the predetermined time at the step S521 shown in the flowchart of FIG. 19. Thus, it is possible to select one GW apparatus among the GW apparatuses 6a, 6b, 6c as the distribution apparatus, five milliseconds after each apparatus starts activating at the same time.

In the procedures shown by the flowcharts of FIG. 18 to FIG. 20, the GW apparatuses 6a, 6b, 6c are illustrated to discriminate the candidacy notification frame from the notification frame showing success in selection. Thus, the GW apparatuses 6a, 6b, 6c are illustrated to determine that other apparatus has been selected and change into the rejected status, when having received the notification frame showing success in selection at the unselected status of the distribution apparatus. Furthermore, the GW apparatuses 6a, 6b, 6c are illustrated to discard the candidacy notification frame received at the selected status. However, it may be configured that any one of GW apparatus, for example, the GW apparatus 6b is preferably selected as the distribution apparatus. In such the configuration, when the GW apparatus 6a changes into the selected status and then receives the candidacy notification frame from the GW apparatus 6b that should be selected preferably than the GW apparatus 6a, the GW apparatus 6a does not discards the received candidacy notification frame. Then, the GW apparatus 6a is configured to change into the rejected status. Hence, in this configuration, the control unit 60 of the GW apparatus 6a, 6b, 6c changes into the rejected status without discriminating the candidacy notification frame from the notification frame showing success in selection when own apparatus identification number is larger than the apparatus identification number of the transmission source of the received candidacy notification frame or the received notification frame showing success in selection. Thus, the control unit 60 in this configuration determines at the step S5103 of the procedure shown in the flowchart of FIG. 18 whether having received the candidacy notification frame or the notification frame showing success in selection, and skips the step S5108. Furthermore, the control unit 60 in this configuration determines at the step S532 of the procedure shown in the flowchart of FIG. 20 whether having received the candidacy notification frame or the notification frame showing success in selection, and skips the step S533 and the step S534.

As described above, it is possible to set the position of the distribution apparatus based on various connection configurations of the ECU 1 and the GW apparatuses 6a, 6b, 6c, with the configuration dynamically determining a specific GW apparatus among the GW apparatuses 6a, 6b, 6c. For a communication system mounted on a motor vehicle, it can be thought that the same systems are mounted on various motor vehicles whose types are different from one another and which have different options from one another, rather than systems having different configurations one another based on the various motor vehicles are mounted. Thus, the same systems may be configured to work even on the various motor vehicles, in order to implements ex-post modification of the configuration of the same systems such as during manufacturing stage and on sale. Hence, it is possible to set the distribution apparatus at the proper position in response to the ex-post diverse change of the connection configuration, as shown in the embodiment 3. Therefore, a system can work properly even when being mounted on various types of motor vehicles having different options from one another.
(Embodiment 4)

In the Embodiments 1, 2 and 3, it is Described about the connection configuration that the trunk line 5 is connected in the bus topology. In embodiments 4, 5 and 6, it will be described about the connection configuration that the trunk line 5 is connected with a switch topology network which includes a ring topology network and a mesh topology network.

In the embodiments 1 and 2, the trunk line 5 is configured in the bus topology to connect the GW apparatuses 3a, 3b and the distribution apparatus 4. On the other hand, in the embodiment 4, the trunk line 5 is configured with the switch topology network to connect the GW apparatuses 3a, 3b and the distribution apparatus 4. The communication system mounted on the motor vehicle according to the embodiment 4 further includes the GW apparatus 3c, and the switch topology network is configured to connect the GW apparatuses 3a, 3b, 3c and the distribution apparatus 4.

In the switch topology network, the ring topology and the mesh topology may be utilized for the connection configuration. Thus, there is a possibility to cause transmitting a message endlessly between the GW apparatuses 3a, 3b, 3c and the distribution apparatus 4, like a loop. Therefore, when a message is transmitted from the GW apparatus 3a, 3b, 3c to the distribution apparatus 4 for storing data on the database DB and the distribution apparatus 4 transmits a message containing data being read out from the database DB toward each ECU 1 through the GW apparatus 3a, 3b, 3c, the communication system mounted on the motor vehicle according to the embodiment 4 automatically select a transmission path that prevent endless transmission of the message.

The communication system mounted on the motor vehicle according to the embodiment 4 is similar in the hardware configurations to the communication system mounted on the motor vehicle according to the embodiments 1 and 2, except for: the GW apparatus 3e; communication lines 2g, 2h connected to the GW apparatus 3c; additional ECUs 1; and the switch topology utilized for connection configuration of the trunk line 5. Thus, it will be described below about functions and processes of each apparatus in the ease that the trunk line 5 is connected in the switch topology, with using the same numerals for the configurations common to those described above.

Figure 21:
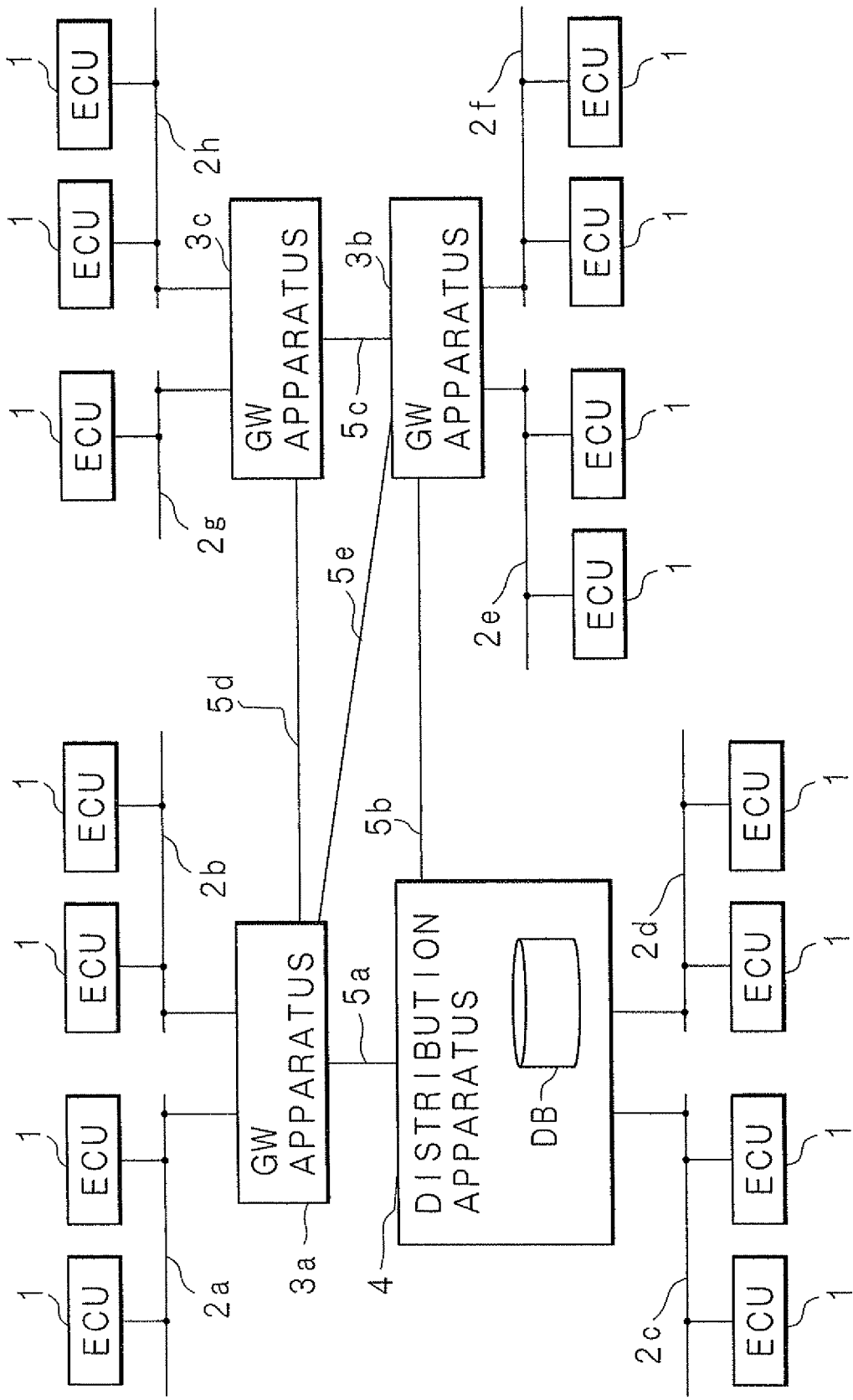
FIG. 21 is a block diagram showing components of a communication system mounted on a motor vehicle according to an embodiment 4.

FIG. 21 is a block diagram showing components of the communication system mounted on the motor vehicle according to the embodiment 4. The communication system mounted on the motor vehicle according to the embodiment 4 includes: the ECUs 1; the communication lines 2a, 2b, 2c, 2d, 2e, 2f, 2g, 2h being branch lines; the GW apparatuses 3a, 3b, 3c; the distribution apparatus 4; and the communication lines 5a, 5b, 5c, 5d, 5e being trunk lines.

The ECUs 1 are connected to the branch lines 2a, 2b, 2c, 2d, 2e, 2f, 2g, 2h in the bus topology based on the CAN protocol, similarly to the embodiments 1 and 2. The GW apparatuses 3a, 3b, 3c and the distribution apparatus are basically connected to one another in one-to-one correspondence with the switch topology connection configuration. The trunk line 5a connects the GW apparatus 3a and the distribution apparatus 4, and the trunk line 5b connects the distribution apparatus 4 and the GW apparatus 3b. The trunk line 5c connects the GW apparatus 3b and the GW apparatus 3c, and the trunk line 5d connects the GW apparatus 3a and the GW apparatus 3c. The trunk line 5e connects the GW apparatus 3a and the GW apparatus 3b.

A message transmitted from the ECU 1 is basically relayed by the GW apparatus 3a, 3b, 3c or directly received by the distribution apparatus 4, and then is aggregated into the database DB of the distribution apparatus 4, in the embodiment 4, too.

Figure 22:
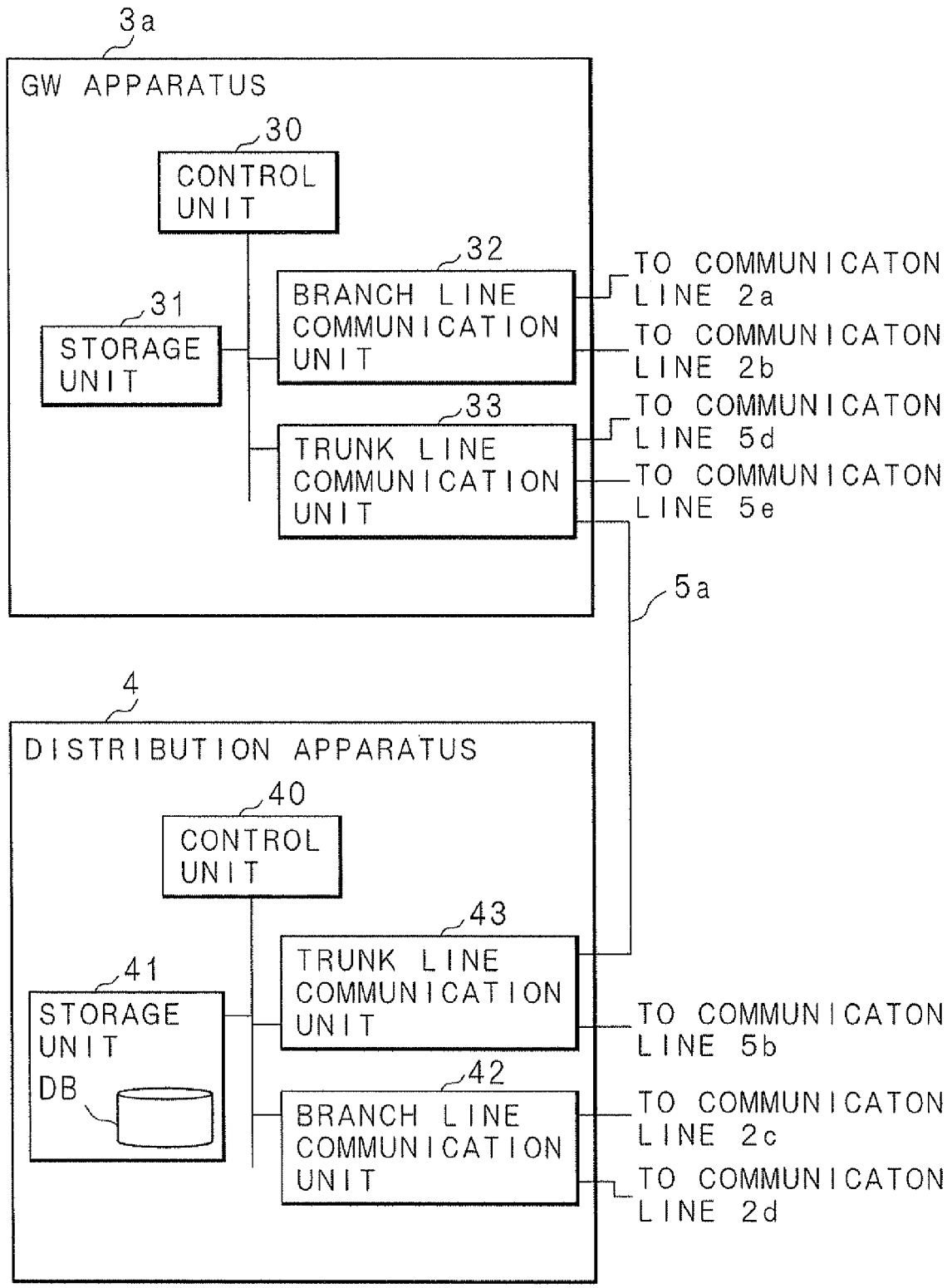
FIG. 22 is a block diagram showing inner components of a GW apparatus and a distribution apparatus included in the communication system mounted on the motor vehicle according to the embodiment 4.

FIG. 22 is a block diagram showing inner components of the GW apparatus 3a and the distribution apparatus 4 included in the communication system mounted on the motor vehicle according to the embodiment 4. The inner components of the GW apparatus 3a are similar to those of the GW apparatuses 3b, 3c. Thus, it will not be described in detail about the inner components of the GW apparatuses 3b, 3c.

Inner components of the GW apparatus 3a and the distribution apparatus 4 in the embodiment 4 are similar to those of the GW apparatus 3a and the distribution apparatus 4 in the embodiments 1 and 2. Thus, the same numerals are given to common parts of the inner components in the embodiments 1, 2 and 4, and it will not be described in detail about the common parts.

However, the GW apparatuses 3a, 3b, 3c and the distribution apparatus 4 are connected to one another in one-to-one correspondence, in the embodiment 4. As shown in the block diagram of FIG. 22, the trunk line communication unit 33 of the GW apparatus 3a is connected to the trunk lines 5a, 5d, 5e, and the trunk line communication unit 43 of the distribution apparatus 4 is connected to the trunk lines 5a, 5b.

The control unit 30 of the GW apparatus 3a can discriminate a communication port for the trunk line 5a, a communication port for the trunk line 5d, and a communication port for the trunk line 5e in the trunk line communication unit 33. The control unit 30 of the GW apparatus 3a utilizes a communication port provided with "1" for message transmission via the trunk line 5a through the trunk line communication unit 33. Similarly, the control unit 30 utilizes a communication port provided with "2" for message transmission via the trunk line 5d, and a communication port provided with "3" for message transmission via the trunk line 5e. Similarly, the control 40 of the distribution apparatus 4 can discriminate a communication port for the trunk line 5a, and a communication port for the trunk line 5b in the trunk line communication unit 43. The control unit 40 of the distribution apparatus 4 utilizes a communication port provided with "1" for message transmission via the trunk line 5a through the trunk line communication unit 43, and a communication port provided with "2" for message transmission via the trunk line 5b through the trunk line communication unit 43.

The GW apparatuses 3a, 3b, 3c and the distribution apparatus 4 in the embodiment 4 create a logical tree that sets the distribution apparatus 4 aggregating messages as a root and select a corresponding transmission path, in order to prevent transmitting a message, like a loop, between the GW apparatuses 3a, 3b, 3c and the distribution apparatus 4, while the message is transmitted through the trunk line 5a, 5b, 5c, 5d, 5e. Thus, the GW apparatuses 3a, 3b, 3c respectively can recognize a communication port for connecting to own root side apparatus in the trunk line communication unit 33, as a root side link. The GW apparatuses 3a, 3b, 3c and the distribution apparatus 4 recognize zero or a plurality of communication ports for connecting own leaf side apparatus based on the logical tree among the other communication ports in the trunk line communication unit 33, 42, as leaf side links. Furthermore, the GW apparatuses 3a, 3b, 3c and the distribution apparatus 4 recognize unused communication ports for preventing loop like transmission, i.e., zero or a plurality of all the other communication ports, as unused links.

Thus, the control unit 30 of the GW apparatus 3a, 3b, 3c, except for the distribution apparatus 4 being the root, transmits and receives a message through a communication port corresponding to the root side link and through a communication port corresponding to the leaf side link. Moreover, a message is not transmitted and received through the communication port corresponding to the unused link, in order to prevent loop like transmission of the message. Therefore, it is possible to select a transmission path for setting proper transmission directions at the trunk lines 5a, 5b, 5c, 5d, 5e.

The control unit 30 of the GW apparatus 3a, 3b, 3c and the control unit 40 of the distribution apparatus 4 respectively transmit and receive a notification frame for selecting a transmission path, recognize a root side apparatus and a leaf side apparatus based on a logical tree, and then store on the storage unit 32 and the storage unit 41 identification numbers of communication ports of the trunk line communication unit 33 and the trunk line communication unit 43 which are recognized as the root side link, leaf side link and the unused link.

It will be described below about a procedure that a logical tree corresponding to a transmission path is created by the control unit 30 of the GW apparatus 3a, 3b, 3c and by the control unit 40 of the distribution apparatus 4 and then the transmission path is selected. To create the logical tree, the control unit 30 of the GW apparatus 3a, 3b, 3c firstly makes all the communication port of the trunk line communication unit 33 be in a listening status, and receives a tree creation notification frame transmitted from the distribution apparatus 4 being as the transmission source. It should be noted that frame useful life information is provided in the tree creation notification frame transmitted by the control unit 40, in order to prevent endless loop like transmission of the tree creation notification frame and to select an efficient transmission path. The control unit 40 performs processes to recognize any communication ports as the root side link, the leaf side link or the unused link, based on the received tree creation notification frame, in accordance with the provided frame useful life information. In the following description, an unused link notification frame is illustrated to be transmitted from a communication port recognized as the unused link.

Figure 23:
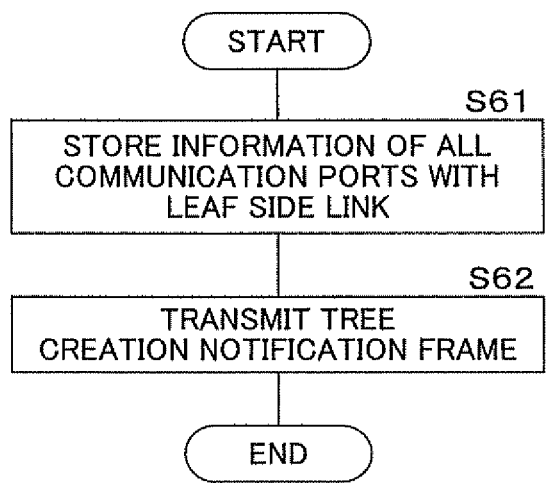
FIG. 23 is a flowchart showing an example of a procedure that a control unit of the distribution apparatus, included in the communication system mounted on the motor vehicle according to the embodiment 4, creates a logical tree corresponding to a transmission path.

FIG. 23 is a flowchart showing an example of a procedure that the control unit 40 of the distribution apparatus 4, included in the communication system mounted on the motor vehicle according to the embodiment 4, creates a logical tree corresponding to a transmission path.

The control unit 40 of the distribution apparatus 4 stores information of all the communication port in association with the leaf side links (step S61), transmits tree creation notification frames through all the communication ports of the trunk line communication unit 43 toward the GW apparatuses 3a, 3b (step S62), and terminates the procedure. For transmitting the tree creation notification frames, the control unit 40 reads out and sets a given value stored on the storage unit 41 as the frame useful life information corresponding to the tree creation notification frames.

Figure 24:
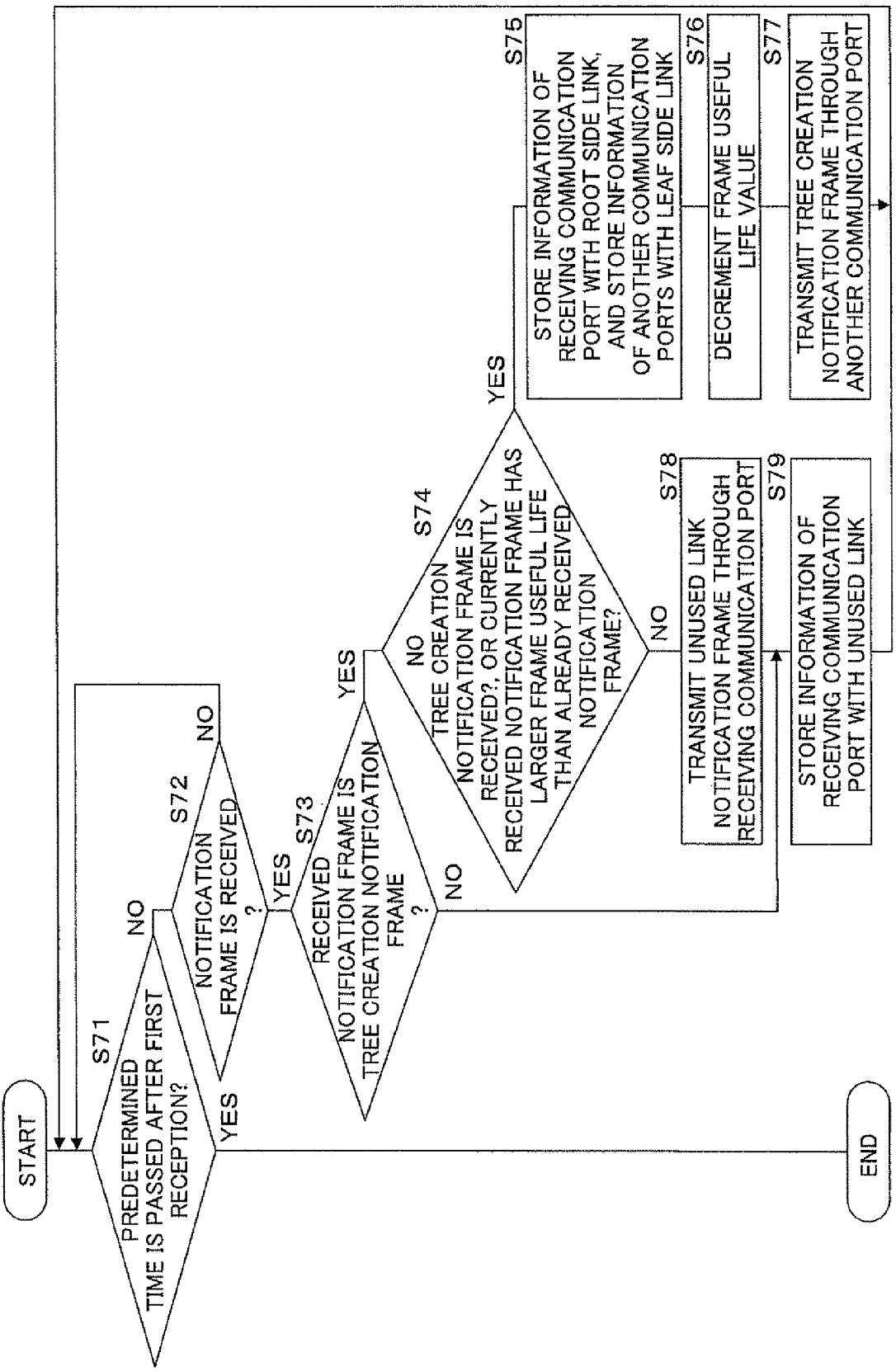
FIG. 24 is a flowchart showing an example of a procedure that a control unit of the GW apparatus, included in the communication system mounted on the motor vehicle according to the embodiment 4, creates a logical tree corresponding to the transmission path.

FIG. 24 is a flowchart showing an example of a procedure that the control unit 30 of the GW apparatus 3a, 3b, 3c, included in the communication system mounted on the motor vehicle according to the embodiment 4, creates a logical tree corresponding to the transmission path. The procedure shown in the flowchart of FIG. 24 is performed on the basis of the tree creation notification frame transmitted by the control unit 40 performing the procedure shown in flowchart of FIG. 23. The control unit 30 firstly makes all the communication port of the trunk line communication unit 33 be in a listening status.

The control unit 30 determines whether a predetermined time has passed or not since the control unit 30 received the first tree creation notification frame (step S71). The predetermined time is, for example, 500 microseconds.

When having determined that the predetermined time has not passed since the control unit 30 received the first tree creation notification frame (S71: NO), the control unit 30 determines whether any communication port in the listening status have received a notification frame or not (step S72). When having determined that no communication port has received the notification frame (572: NO), the control unit 30 returns the procedure to the step S71. When having determined that any communication port have received the notification frame (S72: YES), the control unit 30 determines whether the received notification frame is a tree creation notification frame or not (step S73).

When having determined that the currently received notification frame is the tree creation notification frame (S73: YES), the control unit 30 determines whether the control unit 30 itself has already received a tree creation notification frame or not, or whether a frame useful life value of the currently received notification frame is larger than a frame useful life value of the already received notification frame (step S74). When having determined that the control unit 30 itself has not received a tree creation notification frame yet or that the frame useful life value of the currently received notification frame is larger than the frame useful life value of the already received notification frame (S74: YES), the control unit 30 stores, in association with the root side link on the storage unit 31, information of the communication port having received the notification frame at the step S72 and stores, in association with the leaf side links on the storage unit 31, information of all the other communication ports including already associated communication ports (step S75). The control unit 30 decrements the frame useful life value contained in the tree creation notification frame (step S76), and transmits the tree creation notification frame containing the decremented frame useful life value through another communication port (step S77). Then, the control unit 30 returns the procedure to the step S71.

When having determined at the step S72 that the currently received notification frame is the tree creation notification frame (S73: YES) and having determined at the step S74 that the control unit 30 itself has already received a tree creation notification frame and that the frame useful life value of the currently received notification frame is not larger than the frame useful life information value of the already received notification frame (S74: NO), the control unit 30 transmits an unused link notification frame through the communication port having received the notification frame at the step S72 (step S78). Then, the control unit 30 stores information of the communication port having received the notification frame at the step S72 in association with the unused link (step S79) and returns the procedure to the step S71.

When having determined that the notification frame received at the step S72 is not the tree creation notification frame (step S73: NO), the control unit 30 proceeds the procedure to the step S79 because the received notification frame is the unused link notification frame.

When having determined at the step S71 that the predetermined time has passed since the control unit 30 received the first tree creation notification (S71: YES), the control unit 30 terminates the procedure for creating the logical tree.

It should be noted that the transmission is not essential of the unused link notification frame at the step S78 in the procedure described above. In this case, as connecting to the GW apparatuses 3a, 3b, 3c and the distribution apparatus 4 through the communication port stored in association with the unused link at the step S79, the GW apparatuses 3a, 3b, 3c and the distribution apparatus 4 stores information of a corresponding communication port in association with the leaf side link. Thus, the control unit 30, 40 of the GW apparatus 3a, 3b, 3c and the distribution apparatus 4 cannot restore the information of the communication port in association with the unused link because receiving no unused link notification frame, although other apparatus stores the information of the communication port in association with the unused link. However, even when said other apparatus, i.e., the GW apparatus 3a, 3b, 3c and the distribution apparatus 4 have transmitted messages through a communication port associated with the leaf side link, the former GW apparatus 3a, 3b, 3c and the distribution apparatus 4 store information of the communication port receiving the transmitted messages in association with the unused link and thus discard the transmitted messages. Therefore, it is possible to prevent the endless loop like transmission of the messages. Hence, the step S73 is also not essential which determines whether the received notification frame is the tree creation notification frame or not. Therefore, it may be configured to proceed the procedure to the step S74 every time the control unit 30 having determined that the notification frame has been received (572: YES).

Alternatively, it may be configured that the control unit 40 of the distribution apparatus 4 also performs the following processes to surely associate a communication port with the unused link, when the unused link notification frame is transmitted. After having transmitted the tree creation notification frame (S62), the control unit 40 of the distribution apparatus 4 determines whether the control unit 40 has received the notification frame or not, and then waits. When having received the unused link notification frame, the control unit 40 stores, in association with the unused link on the storage unit 41, the information of the communication port having received the unused link notification frame. For example, 500 microseconds is utilized for the waiting time in determining whether the control unit 40 has received the notification frame or not, similar to the predetermined time at the step S71 shown in the flowchart of FIG. 24.

Next, it will be described in reference with the schematic views of FIG. 25 and FIG. 26 about processes that the control unit 30 of the GW apparatus 3a, 3b, 3c and the control unit 40 of the distribution apparatus 4 perform the procedures shown in the flowcharts of FIG. 23 and FIG. 24, a logical tree is created in accordance with the transmission paths between the GW apparatuses 3a, 3b, 3c and the distribution apparatus 4, and then a proper transmission path is selected. FIG. 25 and FIG. 26 are schematic views showing examples of the transmission paths selected by the communication system mounted on the motor vehicle according to the embodiment 4. The schematic view of FIG. 26 illustrates a later status than the schematic view of FIG. 25. In the schematic views of FIG. 25 and FIG. 26, each apparatus is represented by a block. The ECUs 1 and the branch lines 2a, 2b, 2c, 2d, 2e, 2f, 2g, 2h are not shown. In FIG. 25 and FIG. 26, a number is boxed by a square in a block illustrating the GW apparatuses 3a, 3b 3c and the distribution apparatus 4. The boxed number represents an apparatus identification number. A number surrounded by a triangle represents a communication port identification number corresponding to each of the trunk lines 5a, 5b, 5c, 5d, 5e in the trunk line communication unit 33, 43.

The schematic view of FIG. 25 illustrates frame flows when the tree creation notification frame is transmitted by the control unit 40 of the distribution apparatus 4, and associations of the root side link, the leaf side link and the unused link with the communication ports which are stored by each apparatus. An Y1 in FIG. 25 is an example of contents of the tree creation notification frame transmitted from the distribution apparatus 4, and a hollow arrow in FIG. 25 is a flow of the frame. A table A illustrates associations of the root side link, the leaf side link and the unused link with the communication ports which are stored by the storage unit 31 of the GW apparatus 3a. A table B illustrates such associations stored by the distribution apparatus 4. A table C illustrates such associations stored by the GW apparatus 3b. A table D illustrates such associations stored by the GW apparatus 3c.

The control unit 40 of the distribution apparatus 4 stores information of all the communication port of own trunk line communication unit 43 in association with the leaf side link (table B), and transmits the tree creation notification frame Y1 through communication ports provided with the identification number "1" and "2". The transmitted tree creation notification frame Y1 is composed of "7" "0" "1" "0" "1" "5", as shown in the schematic view of FIG. 25. The numbers from first to fourth, "7" "0" "1" "0", are similar to those of address information in the unicast transmission. In other words, the transmitted tree creation notification frame Y1 shows that the distribution apparatus 4 is the transmission source of Y1, all the apparatuses are transmission destinations of Y1, i.e., the broadcast transmission is performed for Y1 (in the case of 3 bits apparatus identification number, total bits is 1 (111b), i.e., "7"), Y1 is not transmitted from each receiving apparatus to the branch lines 2a, 2b, 2c, 2d, 2e, 2f, 2g, 2h. The fifth number "1" is a serial number for discriminating old and new frames, and the sixth "5" shows frame useful life information value.

The control unit 30 of GW apparatus 3a, 3b receives the tree creation notification frame Y1 through a communication port in the listening status. The control unit 30 has not received the tree creation notification frame yet, then stores on the storage unit 31 the information of the communication port "1" having received the tree creation notification frame Y1 in association with the root side link and information of the other communication ports "2" and "3" in association with the leaf side link (see table A and table C). A bold line represents a trunk line 5a, 5b selected as the transmission path. The control unit 30 of the GW apparatus 3a, 3b decrements the frame useful life value of the tree creation notification frame Y1 and transmits to the GW apparatus 3c, as shown in FIG. 26 described later.

The schematic view of FIG. 26 illustrates frame flows when the GW apparatus 3a, 3b has received the tree creation notification frame from the distribution apparatus 4 and further has transmitted the tree creation notification frame, and associations of the root side link, the leaf side link and the unused link with the communication ports which are stored by each apparatus. An Y2 in FIG. 26 is an example of contents of the tree creation notification frame transmitted from the GW apparatus 3a, 3b, and a hollow arrow in FIG. 26 is a flow of the frame. A table A illustrates associations of the root side link, the leaf side link and the unused link with the communication ports which are stored by the storage unit 31 of the GW apparatus 3a. A table B illustrates such associations stored by the distribution apparatus 4. A table C illustrates such associations stored by the GW apparatus 3b. A table D illustrates such associations stored by the GW apparatus 3c.

The control unit 30 of the GW apparatus 3a, 3b decrements the frame useful life value at the time transmitting the tree creation notification frame Y2. As shown in the schematic view of FIG. 26, the frame useful life value of Y1 in FIG. 26 is "4", and this number is decremented form "5" of the frame useful life information value of Y1 in the schematic view of FIG. 25. The control unit 30 of the GW apparatus 3c receives the tree creation notification frame Y2 through the communication port in the listening status. In this case, the tree creation notification frame Y2 is transmitted from not only the GW apparatus 3a but also the GW apparatus 3b. Thus, the control unit 30 of the GW apparatus 3c receives the tree creation notification frame Y2 through not only the communication port "1" but also the communication port "2" in the trunk line communication unit 33. Assume that the control unit 30 of the GW apparatus 3c firstly receives the tree creation notification frame Y2 transmitted from the GW apparatus 3a. In this assumption, the control unit 30 of the GW apparatus 3c stores on the storage unit 31 information of the communication port "1" having received the tree creation notification frame Y2 transmitted from the GW apparatus 3a in association with the root side link, and information of the other communication port "2" once in association with the leaf side link. Then, the control unit 30 of the GW apparatus 3c stores the information of the communication port "2" having received the tree creation notification frame Y2 transmitted from the GW apparatus 3b in association with the unused link, because the frame useful life value are the same in the currently received tree creation notification frame Y2 and the already received tree creation notification frame Y2 (see table D). When having received frames having the same frame useful life value through different communication ports as described above, the control unit 30 of the GW apparatus 3c may make one communication port available which has smaller identification number. Alternatively, it may be configured that the GW apparatuses 3a, 3b further add own apparatus identification number to a part of such address information of the tree creation notification frame transmitted from own apparatus. In this configuration, a communication port may become available that has received the tree creation notification frame provided with a smaller apparatus identification number than the identification number of the GW apparatus 3c.

As shown by the hollow arrow in FIG. 26, the tree creation notification frame Y2 is furthermore transmitted via the trunk line 5e not only from the GW apparatus 3a to the GW apparatus 3b but also from the GW apparatus 3b to the GW apparatus 3a. Thus, the GW apparatus 3a receives the tree creation notification frame Y2 through the communication port "3" in the trunk line communication unit 33. The control unit 30 of the GW apparatus 3a has already received the tree creation notification frame Y1 from the distribution apparatus 4, and the frame useful life value of the currently received frame is smaller than the frame useful life value of the already received frame ("5">"4"). Hence, the control unit 30 of the GW apparatus 3a stores on the storage unit 31 information of the communication port "3" in association with the unused link (see table A). The control unit 30 of the GW apparatus 3b also stores on the storage unit 31 the information of the communication port "3" in association with the unused link, similarly (see table C).

The control unit 30 of the GW apparatus 3 transmits the unused link notification frame through the communication port "2" associated with the unused link in the trunk line communication unit 33. The control unit 30 of the GW apparatus 3b receives the unused link notification frame through the communication port "2" in the trunk line communication unit 33. Thus, the control unit 30 of the GW apparatus 3b stores on the storage unit 31 information of the communication port "2" in association with the unused link (see table C).

Through the processes described above, a logical tree can be created in accordance with the transmission paths between the GW apparatuses 3a, 3b, 3c and the distribution apparatus 4, and a proper transmission path can be selected. Therefore, it is possible to prevent like loop transmission of messages. When the control unit 30 of the GW apparatus 3a, 3b, 3c and the control unit 40 of the distribution apparatus 4 are configured to automatically perform the processes described above at the activation time, it is possible to select a transmission path for efficiently transmitting a message even in the case that physical connection configurations are diversely changed between the GW apparatuses 3a, 3b, 3c and the distribution apparatus 4.

It may be configured to repeat processes transmitting the tree creation notification frame and creating the logical tree, at a predetermined interval, in order to re-check the transmission path at the predetermined interval for a purpose, such as setting an alternative transmission path in view of link fault. In this configuration, the procedures are performed at the predetermine interval that are shown in the flowcharts of FIG. 23 and FIG. 24. For example, one millisecond is the predetermined interval.

The control unit 40 of the distribution apparatus 4 transmits a message containing data being read out from the database DB toward the ECUs 1 connected through the branch lines 2a, 2b, 2e, 2f, 2g, 2h with the GW apparatuses 3a, 3b, 3c. At that time, the control unit 40 of the distribution apparatus 4 transmits the message through the communication port associated with the leaf side link in the trunk line communication unit 43.

The control unit 30 of the GW apparatus 3a, 3b, 3c receives a message through a communication port associated with the root side link in the trunk line communication unit 33. The received message is further transmitted through a communication port associated with the leaf side link, except for the case that the transmission destination of the received message is set to be own apparatus. When having received a message through a communication port associated with the leaf side link, the control unit 30 of the GW apparatus 3a, 3b, 3c basically further transmits the received message through a communication port associated with the root side link, except for the case that the transmission destination of the received message is set to be own apparatus. Further, the control unit 30 of the GW apparatus 3a, 3b, 3c does not perform the message transmission through a communication port associated with the unused link.

Thus, the GW apparatuses 3a, 3b, 3c and the distribution apparatus 4 performs efficient transmission based on the selected transmission path. Therefore, it is possible to prevent loop like transmission of messages and additionally reduce communication load.

It should be noted that all the messages transmitted from the ECUs 1 are not always aggregated by the distribution apparatus 4 and stored once on the database DB. There is a case that a message should be transmitted among the GW apparatuses 3a, 3b, 3c without being relayed by the distribution apparatus 4. Thus, the control unit 30 of the GW apparatus 3a, 3b, 3c is not configured to unconditionally transmit a message through the communication port associated with the root side link, even when having received the message through the communication port associated with the leaf side link. The control unit 30 of the GW apparatus 3a, 3b, 3c may be configured to transmit a message through another communication port associated with the leaf side link, when having received the message through the communication port associated with the leaf side link. In this configuration, a relationship between each communication port and each apparatus identification number may be stored or learned as shown in an embodiment 6 described later, to transmit a message through a communication port corresponding to the address information of the transmission destination.

(Embodiment 5)

In an Embodiment 5, it Will be Described about Configurations that any GW apparatuses connected to the trunk line 5 include the storage regions utilized as the database, one GW apparatus is automatically selected, the selected one GW apparatus works as the specific GW apparatus (specific relay apparatus), as described in the embodiment 3 and that the connection configurations on the trunk line 5 are the switch topology network as shown in the embodiment 4.

In other words, the embodiment 5 is configured to connect the GW apparatuses 6a, 6b, 6c with the trunk line 5 in the bus topology as shown in the embodiment 3, and further to include GW apparatuses 6d, 6e with the connection among the GW apparatuses 6a, 6b, 6c, 6d, 6e, being the switch topology network.

The communication system mounted on the motor vehicle according to the embodiment 5 automatically and dynamically selects a GW apparatus working as "the distribution apparatus". Thus, it should be configured to select a message transmission path setting the GW apparatus working as the distribution apparatus among the GW apparatuses 6a, 6b, 6c, 6d,6e on the passing route, because the GW apparatuses 6a, 6b, 6c, 6d,6e are connected with the switch topology network. Hence, the GW apparatuses 6a, 6b, 6c, 6d,6e of the communication system mounted on the motor vehicle according to the embodiment 5 perform processes to select an apparatus working as the distribution apparatus as described below, and perform the processes to create the logical tree as described in the embodiment 4. Therefore, it is possible to select a proper transmission path.

The communication system mounted on the motor vehicle according to the embodiment 5 has hardware configurations that are similar to those of the communication system mounted on the motor vehicle according to the embodiment 3, except for: GW apparatuses 6d, 6e; communication lines 2g, 2h, 2i, 2j connected to the GW apparatuses 6d, 6e; additional ECU 1 connected to the GW apparatuses 6d, 6e; and connection topology of the trunk line 5 being the switch topology. It will be described below about a procedure to select a GW apparatus working as the distribution apparatus among the GW apparatuses 6a, 6b, 6c, 6d, 6e with trunk line 5 connected in the switch topology, while the same numerals are given to the common configurations between the embodiment 5 and 3, in the following description.

Figure 27:
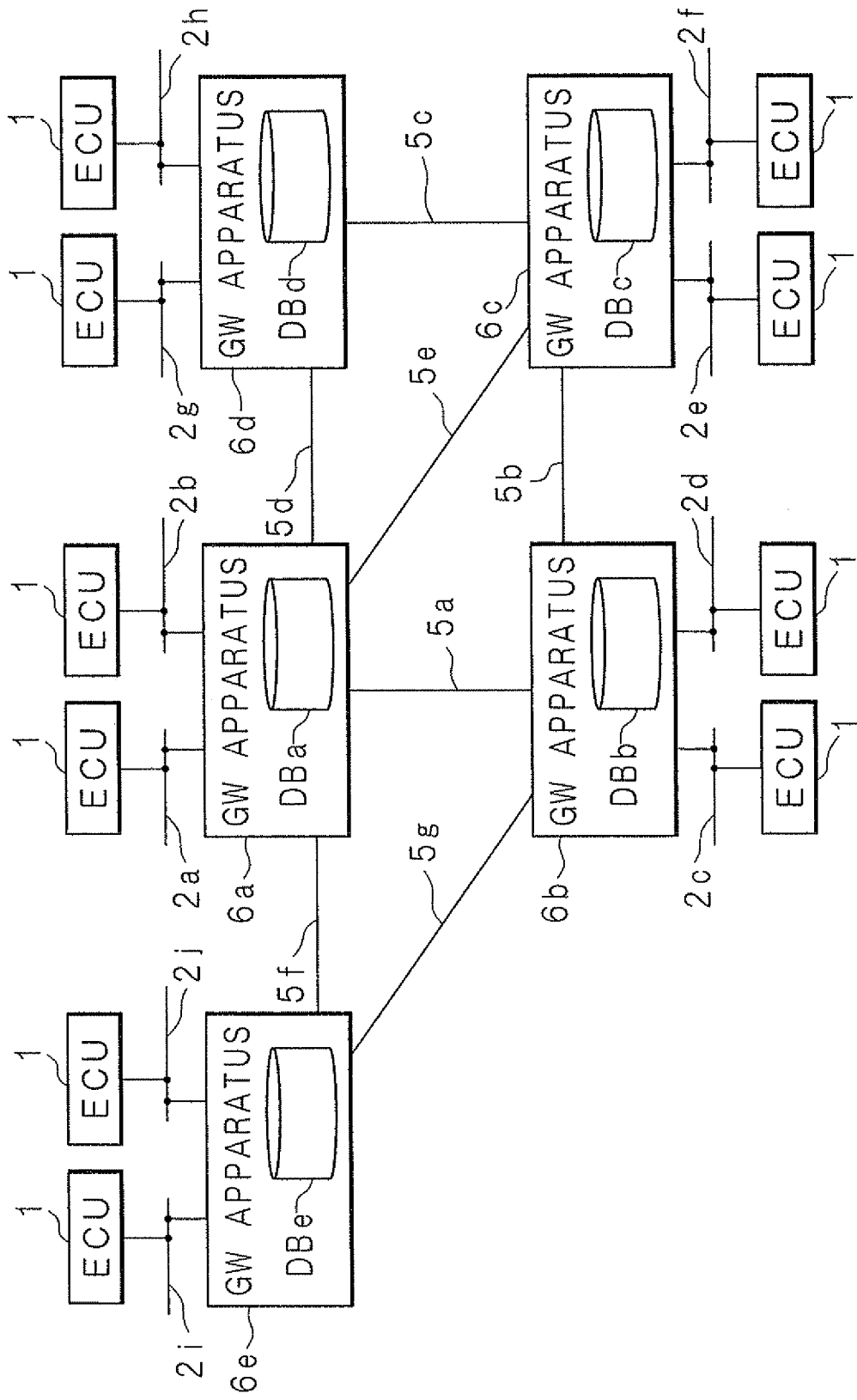
FIG. 27 is a block diagram showing components of a communication system mounted on a motor vehicle according to an embodiment 5.

FIG. 27 is a block diagram showing components of the communication system mounted on a motor vehicle according to an embodiment 5. The communication system mounted on a motor vehicle according to an embodiment 5 includes: ECUs 1; communication lines 2a, 2b, 2c, 2d, 2e; 2f, 2g, 2h, 2i being branch lines; GW apparatuses 6a, 6b, 6c, 6d, 6e relaying data transmitted among the ECUs 1; and communication lines 5a, 5b, 5c, 5d, 5e, 5f, 5g being trunk lines.

In the communication system mounted on a motor vehicle according to an embodiment 5, the GW apparatuses 6a, 6b, 6c, 6d, 6e are connected through the trunk lines 5a, 5b, 5c, 5d, 5e, 5f, 5g with the switch topology including the mesh topology and the ring topology as shown in FIG. 27. The GW apparatus 6a is connected to the GW apparatus 6b through the trunk line 5a. The GW apparatus 6b is connected to the GW apparatus 6c through the trunk line 5b. The GW apparatus 6c is connected to the GW apparatus 6d through the trunk line 5c. The GW apparatus 6d is connected to the GW apparatus 6a through the trunk line 5d. Furthermore, the GW apparatus 6a is connected to the GW apparatus 6c through the trunk line 5e, and is connected to the GW apparatus 6e through the trunk line 5f. Moreover, the GW apparatus 6b is connected to the GW apparatus 6e through the trunk line 5g.

The GW apparatuses 6a, 6b, 6c, 6d, 6e respectively includes storage regions, and utilize the storage regions as databases DBa, DBb, DBc, DBd, DBe when working as the distribution apparatus.

FIG. 28 is a block diagram showing inner components of the GW apparatus 6a included in the communication system mounted on the motor vehicle according to the embodiment 5. The inner components of the GW apparatus 6a are similar to those of the GW apparatuses 6b, 6c, 6d, 6e. Thus, it will not described in detail about the inner components of the GW apparatuses 6b, 6c, 6d, 6e.

The inner components of the GW apparatus 6a according to the embodiment 5 are similar to those of the GW apparatus 6a according to the embodiment 3. Thus, it will not be described in detail about the common configurations between the embodiment 5 and 3, while the same numerals are given to the common configurations in the following description.

The GW apparatuses 6a, 6b, 6c, 6d, 6e are connected to one another in one-to-one correspondence in the embodiment 5. Thus, the trunk line communication unit 63 of the GW apparatus 6a is connected to the trunk lines 5a, 5d, 5e, 5f as shown in the block diagram of FIG. 28.

The trunk line communication unit 63 implements transmitting a message and a notification frame through the trunk line 5a, 5d, 5e, 5f. The control unit 60 of the GW apparatus 6a can discriminate a communication port for the trunk line 5a, a communication port for the trunk line 5d, a communication port for the trunk line 5e, and a communication port for the trunk line 5f in the trunk line communication unit 63. The control unit 60 utilizes a communication port "1" in the trunk line communication unit 63 for the transmission through the trunk line 5a, and utilizes a communication port "2" in the trunk line communication unit 63 for the transmission through the trunk line 5d. Furthermore, the control unit 60 utilizes a communication port "3" in the trunk line communication unit 63 for the transmission through the trunk line 5e, and utilizes a communication port "4" in the trunk line communication unit 63 for the transmission through the trunk line 5f.

The storage unit 61 stores various information including identification numbers for discriminating own apparatus, i.e., GW apparatus 6a from the other GW apparatuses 6b, 6c, 6d, 6e. In the embodiment 5, the storage unit 61 stores an identification number "2" for the GW apparatus 6a, an identification number "1" for the GW apparatus 6b, an identification number "3" for the GW apparatus 6c, an identification number "4" for the GW apparatus 6d, and an identification number "5" for the GW apparatus 6e.

The control unit 60 basically transmits a message from the ECU 1 connected to the branch line 2a, 2b toward a GW apparatus working as the distribution apparatus among the GW apparatuses 6a, 6b, 6c, 6d, 6e in order to aggregate data, which is similar to the control unit in the embodiments 1 to 4. When transmitting the message, the control unit 60 adds address information of the transmission source composed of an identification number for own apparatus and an identification number for a communication port of the branch line communication unit 62. Furthermore, the control unit 60 adds address information of the transmission destination composed of an identification number for an apparatus working as the distribution apparatus among the GW apparatuses 6a, 6b, 6c, 6d, 6e and an identification number for a communication port. Moreover, the control unit 60 creates a logical tree similarly to the GW apparatuses 3a, 3b, 3c in the embodiment 4, selects a transmission path, and transmits the message based on the selected transmission path.

The control unit 60 of the GW apparatus 6a, 6b, 6c, 6d, 6e according to the embodiment 5 transmits a candidacy notification frame and a notification frame showing success in selection as shown in the embodiment 3, and thus automatically selects a GW apparatus working as the distribution apparatus among the GW apparatuses 6a, 6b, 6e, 6d, 6e. It should be noted that the embodiment 5 requires preventing the endless transmission, like loop, of the candidacy notification frame and the notification frame showing success in selection, because the GW apparatuses 6a, 6b, 6e, 6d, 6e are connected to one another with the switch topology network.

Thus, the control unit 60 of the GW apparatus 6a, 6b, 6c, 6d, 6e provides with frame useful life information even to the candidacy notification frame and the notification frame showing success in selection, similarly to the tree creation notification shown in the embodiment 4. Furthermore, the control unit 60 of the GW apparatus 6a, 6b, 6c, 6d, 6e provides with a serial number even to the candidacy notification frame and the notification frame showing success in selection, similarly to the tree creation notification shown in the embodiment 4, in order to discriminate old and new frames having the same frame useful life information.

Next, it will be described in reference to a flowchart about a procedure that a control unit 60 of the GW apparatus 6a, 6b, 6c, 6d, 6e described above transmits a candidacy notification frame to select a GW apparatus as the distribution apparatus and transmits a notification frame showing success in selection when being selected as the distribution apparatus. In the following description, each process is illustrated for the unselected status, the rejected status and the selected status about the distribution apparatus, similarly to those of embodiment 3.

Figure 29:
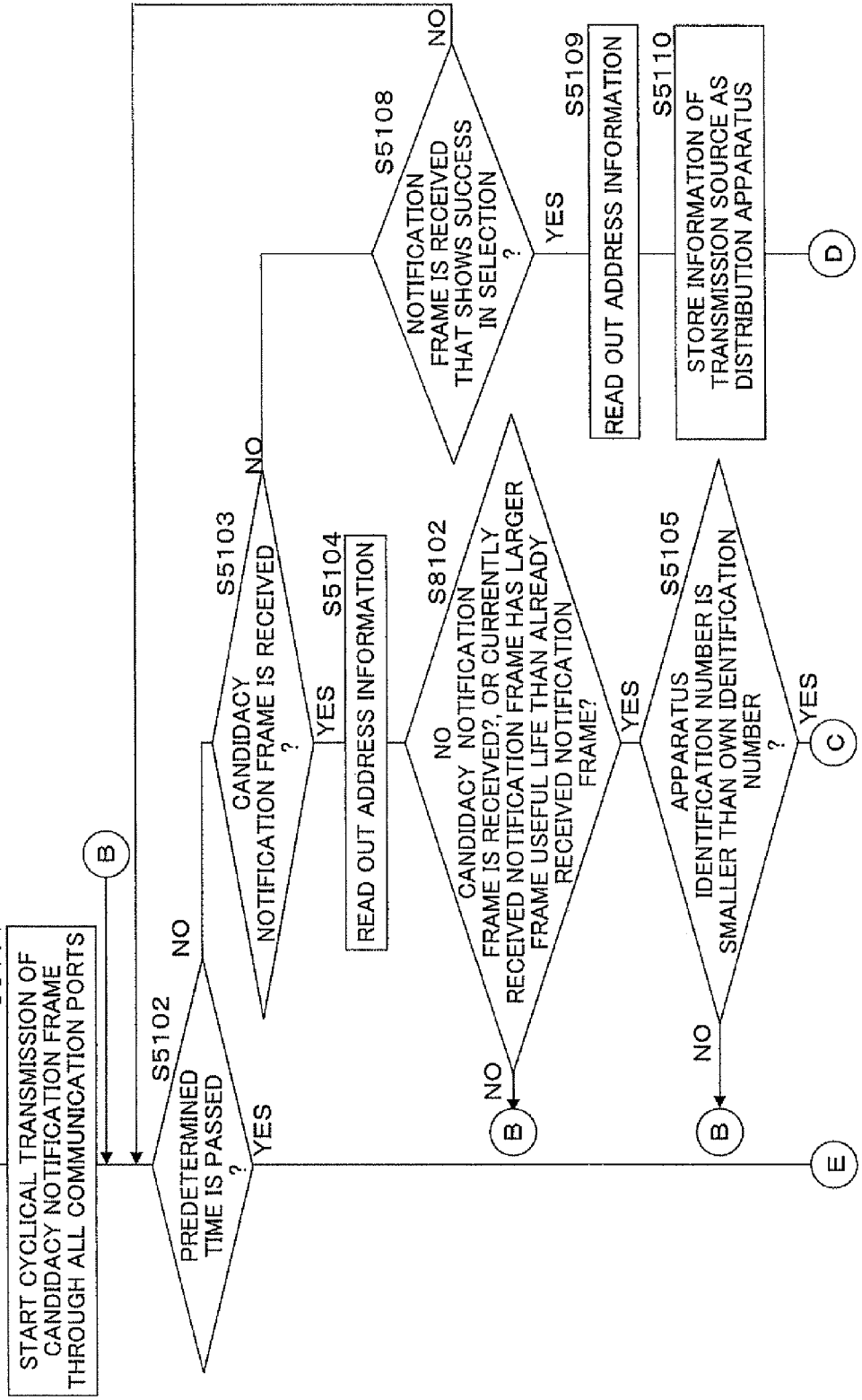
FIG. 29 is a flowchart showing an example of a procedure performed by a control unit of the GW apparatus, included in the communication system mounted on the motor vehicle according to the embodiment 5, in an unselected status that a distribution apparatus is not selected yet.
Figure 30:
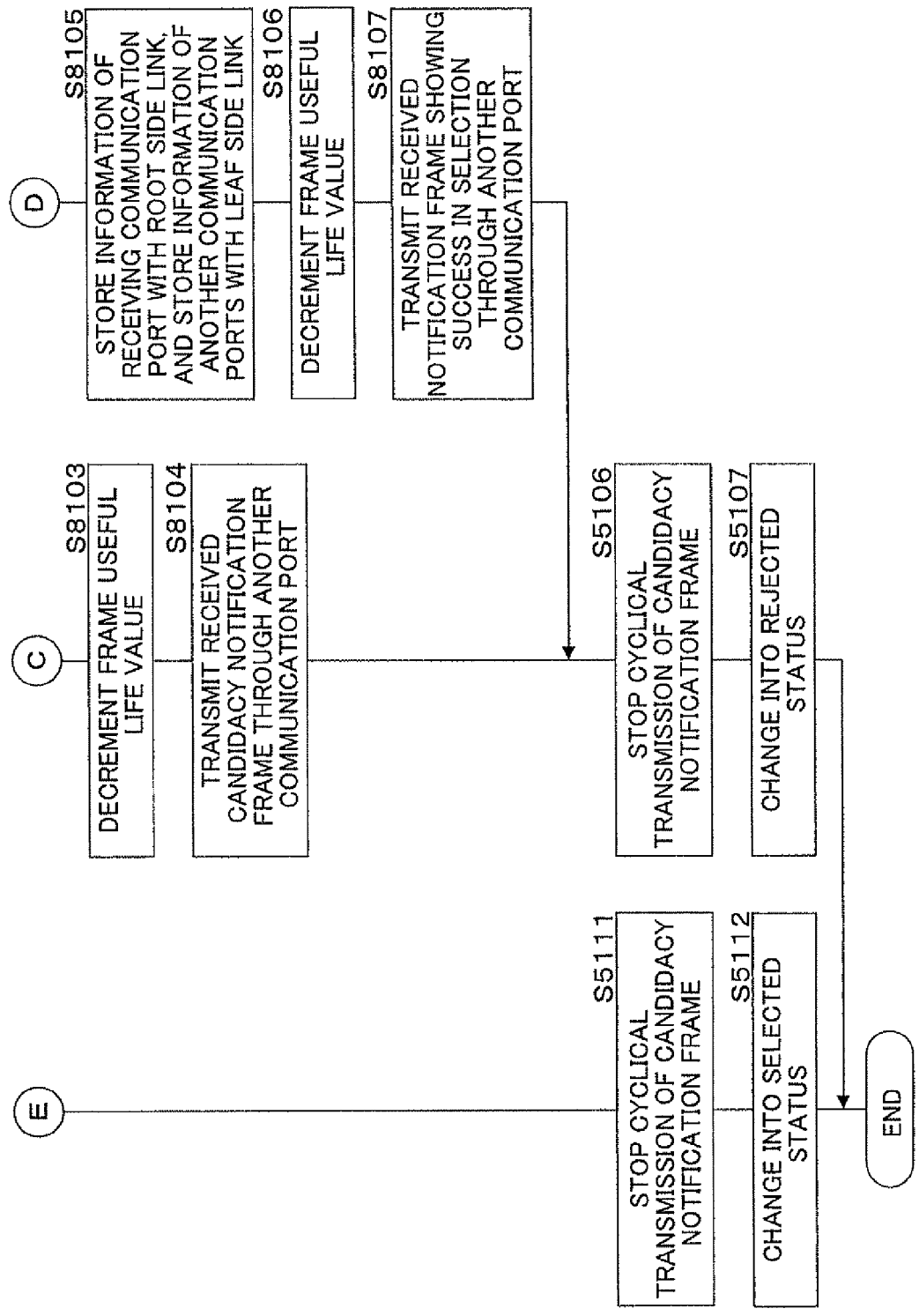
FIG. 30 is a flowchart showing an example of a procedure performed by the control unit of the GW apparatus, included in the communication system mounted on the motor vehicle according to the embodiment 5, in the unselected status that a distribution apparatus is not selected yet.

FIG. 29 and FIG. 30 are flowcharts showing examples of procedures performed by the control unit 60 of the GW apparatus 6a, included in the communication system mounted on the motor vehicle according to the embodiment 5, in the unselected status that the distribution apparatus is not selected yet. The procedure performed by the control unit 60 of the GW apparatus 6a is similar to those performed by the control 60 of the GW apparatuses 6b, 6c, 6d, 6e. Thus, it will not be described in detail about the procedures performed by the control 60 of the GW apparatus 6b, 6c, 6d, 6e. Furthermore, it will not be described in detail about the common processes between the flowcharts of the embodiment 5 and the flowchart of FIG. 18 for the embodiment 3, while the same step numerals are given to the common processes in the following description.

The control unit 60 is in the unselected status about the distribution apparatus, at the activation time. Even in the case that a GW apparatus has been selected as the distribution apparatus, the control unit 60 changes into the unselected status when the selected GW apparatus stop transmitting the notification frame showing success in selection. At that time, the control unit 60 re-creates a logical tree, even when having stored communication ports of the trunk line communication unit 63 respectively in association with the root side link, the leaf side link and the unused link on the basis of the previously created logical tree. Thus, the control unit 60 starts cyclical transmission of the candidacy notification frame through all communication ports of the trunk line communication unit 63, irrelevantly to the associations with the root side link, the leaf side link, and the unused link (step S8101).

When having determined that the trunk line communication unit 63 received the candidacy notification frame at the step S5103 (S5103: YES), the control unit 60 reads out address information from the candidacy notification frame (S 5104). The control unit 60 determines whether the control unit 60 has already received a candidacy notification frame from a transmission source apparatus indicated by the address information read out at the step S5104 or not, or determines whether frame useful value of currently received candidacy notification frame is larger than the frame useful value of the already received candidacy notification frame or not (step S8102).

When having determined that the control unit 60 has not received a candidacy notification frame yet or having determined that the frame useful value of currently received candidacy notification frame is larger than the frame useful value of the already received candidacy notification frame (S8102: YES), the control unit 60 determines whether the read address information contains an apparatus identification number of the transmission source that is smaller than the own apparatus identification number or not (S5105). When having determined that the apparatus identification number of the transmission source is no less than own apparatus identification number (S5105: NO), the control unit 60 returns the procedure to the step S5102.

When having determined that the apparatus identification number of the transmission source is smaller than own apparatus identification number (S5105: YES), the control unit 60 decrements the frame useful life value of the candidacy notification frame (S8103), in order to transmit the candidacy notification frame to another GW apparatus without endless loop like transmission. Then, the control unit 60 transmits the candidacy notification frame provided with the decremented frame useful life value towards another GW apparatus 6b, 6c, 6d, 6e through another communication port that has not received this candidacy notification frame at the step S5103 (step S8104).

When having determined at the step S8102 that the control unit 60 has already received the candidacy notification frame and further determined that the frame useful information of currently received candidacy notification frame is not larger than the frame useful information of the already received candidacy notification frame (S8102: NO), the control unit 60 returns the procedure to the step S5102. Therefore, it is possible to prevent endless loop like transmission of the same candidacy notification frame.

When having determined at the step S5108 that the control unit 60 received the notification frame shown in success in selection (S5108: YES), the control unit 60 stores the apparatus identification number of the transmission source, as the identification number of the distribution apparatus, which is indicated by the address information of the received notification frame showing success in selection (S5109, S5110). At that time, the control unit 60 stores on the storage unit 61 the information of the communication port having received this notification frame showing success in selection in association with the root side link, and the information of all the other communication ports, even when including a communication port having already associated, in association with the leaf side link (step S8105).

Next, the control unit 60 decrements the frame useful life value of the notification frame showing success in selection received at the step S5108 (step S8106), and transmits the notification frame showing success in selection provided with the decremented frame useful life value through another communication port (step S8107).

The step S8105 may not be required, because the same process is performed in the rejected status described later.

Figure 31:
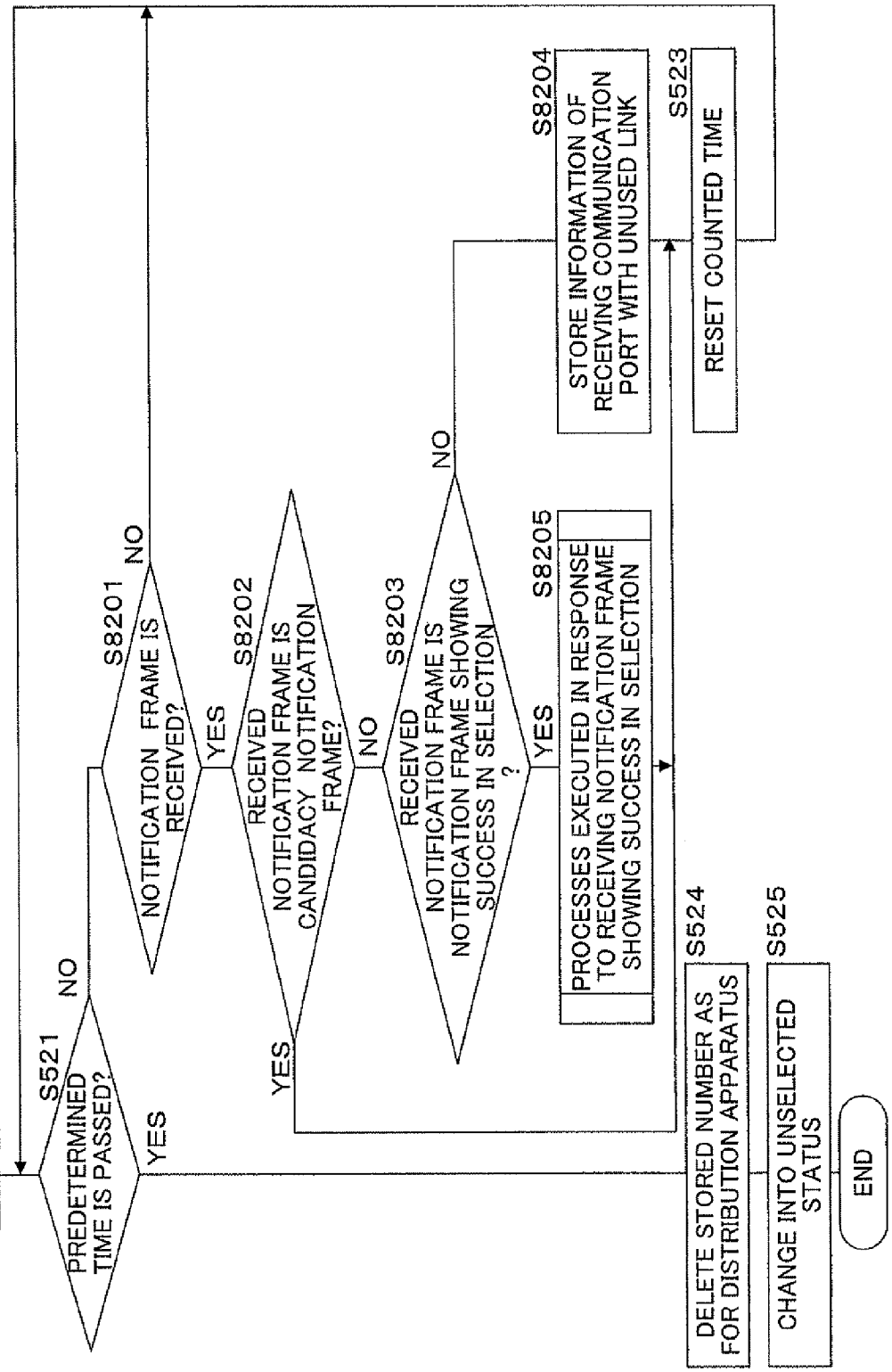
FIG. 31 is a flowchart showing an example of a procedure performed by the control unit of the GW apparatus, included in the communication system mounted on the motor vehicle according to the embodiment 5, which is not selected as the distribution apparatus.

FIG. 31 is a flowchart showing an example of a procedure performed by the control unit 60 of the GW apparatus 6a in the rejected status, included in the communication system mounted on the motor vehicle according to the embodiment 5, which is not selected as the distribution apparatus. It will not be described in detail about the processes of the embodiment 5 common to those of the embodiment 3 shown by the flowchart of FIG. 19, while the same step numerals are given to the common processes in the following description.

When having changed into the rejected status from another status, the control unit 60 makes all the communication port of the trunk line communication unit 63 be in the listening status and determines whether a predetermined time has passed or not since the control unit 60 changed into the rejected status (S521). When having determined that the predetermined time has not passed yet (S521: NO), the control unit 60 determines whether the trunk line communication unit 63 has received a notification frame from another GW apparatus 6b, 6c, 6d, 6e or not (step S8201). When having determined that the trunk line communication unit 63 has not received any notification frames (S8201: NO), the control unit 60 returns the procedure to the step S521.

When having determined the trunk line communication unit 63 has received a notification frame (S8201: YES), the control unit 60 determines whether the received notification frame is a candidacy notification frame or not (step S8202). When having determined that the received notification frame is the candidacy notification frame (S8202: YES), the control unit 60 resets counted time for the predetermined time (step S523) and returns the procedure to the step S521, because the control unit 60 is already in the rejected status.

When having determined that the received notification frame is not the candidacy notification frame (S8202: NO), the control unit 60 determines whether the received notification frame is a notification frame showing success in selection or not (step S8203). When the control unit 60 has determined that the received notification frame is not the notification frame showing success in selection (S8203: NO), the received notification frame is an unused link notification frame. Thus, the control unit 60 stores, in association with the unused link on the storage unit 61, the information of the communication port having received this unused link notification frame (step S8204), resets counted time for the predetermined time (step S523) and returns the procedure to the step S521.

When having determined that the notification frame received at the step S8203 is the notification frame showing success in selection (S8203: YES), the control unit 60 performs processes executed in the case that a notification frame showing success in selection is received (step S8205), resets counted time for the predetermined time (step S523) and returns the procedure to the step S521.

Figure 32:
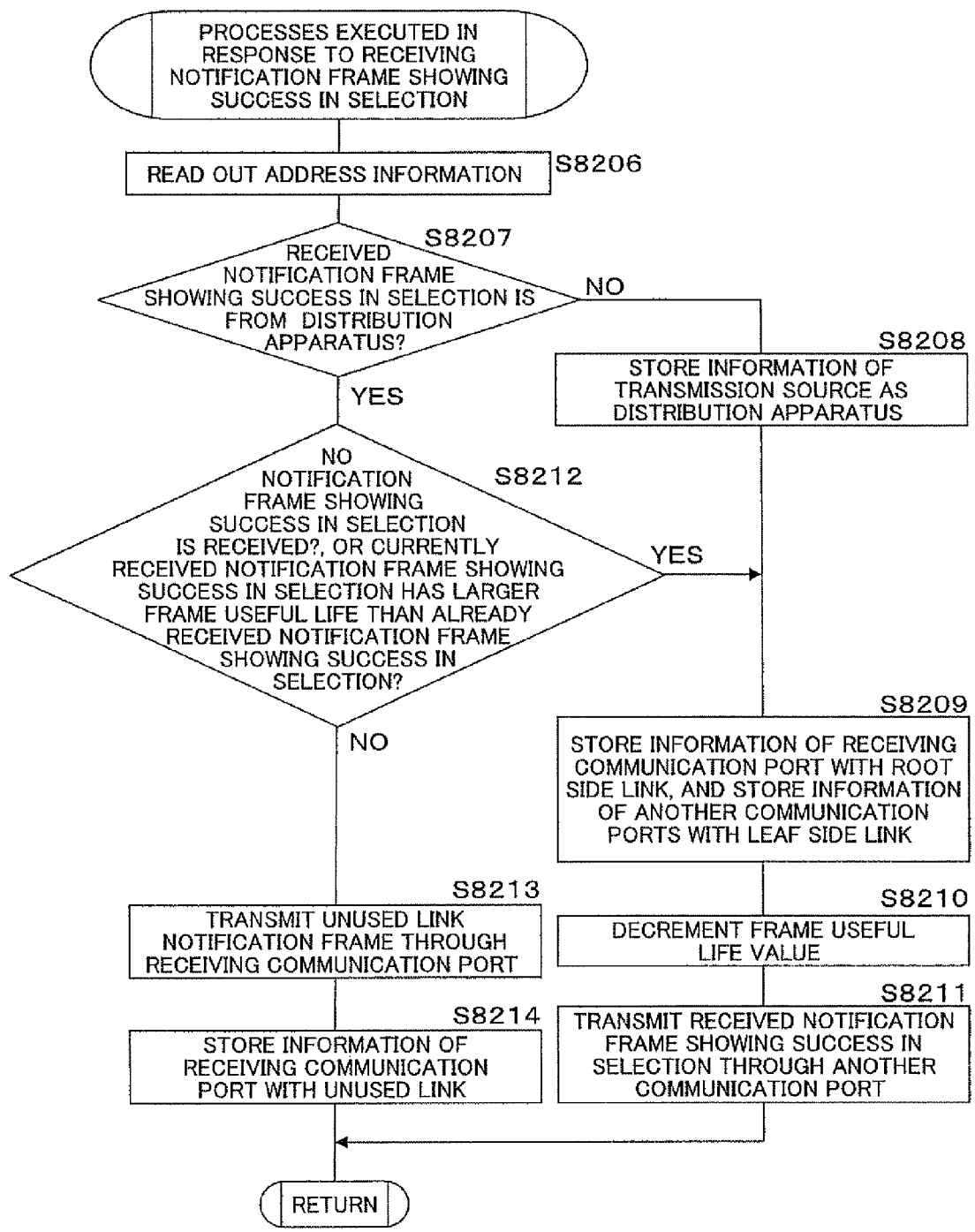
FIG. 32 is a flowchart showing an example of a procedure performed by the control unit of the GW apparatus, included in the communication system mounted on the motor vehicle according to the embodiment 5, which receives notification frame showing success in selection while being not selected as the distribution apparatus.

FIG. 32 is a flowchart showing an example of a procedure performed by the control unit 60 of the GW apparatus 6a, included in the communication system mounted on the motor vehicle according to the embodiment 5, which has received notification frame showing success in selection while being not selected as the distribution apparatus. The procedure shown by the flowchart of FIG. 32 illustrates detailed processes of the step S8205 in the procedure shown by the flowchart of FIG. 31.

The control unit 60 reads out address information provided in the received notification frame showing success in selection (step S8206), and determines whether the received notification frame showing success in selection has been transmitted from an apparatus stored as the distribution apparatus (step S8207). When having not received a notification frame showing success in selection yet and thus having not stored the identification number of the distribution apparatus yet, the control unit 60 determines at that time that the received notification frame showing success in selection has been transmitted from an apparatus stored not as the distribution apparatus.

When having determined that the received notification frame showing success in selection was transmitted from an apparatus stored not as the distribution apparatus (S8207: NO), the control unit 60 stores the apparatus identification number of the transmission source as the identification number of the distribution apparatus (step S8208). Because having changed the apparatus working as the distribution apparatus, the control unit 60 has to create a new logical tree again. Thus, the control unit 60 stores on the storage unit 61 the information of the communication port having received this notification frame showing success in selection in association with the root side link, and the information of all the other communication ports, even when including a communication port having already associated, in association with the leaf side link (step S8209). The control unit 60 decrements the frame useful life value of the received notification frame showing success in selection (step S8210), transmits the received notification frame showing success in selection provided with the decremented frame useful life value through another communication port that has not received this received notification frame showing success in selection at the step S5103 (step S8211).

When having determined that the received notification frame showing success in selection was transmitted from an apparatus stored as the distribution apparatus (S8207: YES), the control unit 60 determines whether the currently received notification frame showing success in selection has been received previously or not, or whether the frame useful life value of the currently received notification frame showing success in selection is larger than the frame useful life value of the previously received same notification frame showing success in selection or not (step S8212). When having determined that the currently received notification frame showing success in selection was not received previously or that the frame useful life value of the currently received notification frame showing success in selection is larger than the frame useful life value of the previously received same notification frame showing success in selection (S8212: YES), the control unit 60 proceeds the procedure to the step S8209 and performs further processes.

When having determined that the currently received notification frame showing success in selection was received previously and that the frame useful life value of the currently received notification frame showing success in selection is not larger than the frame useful life value of the previously received same notification frame showing success in selection (S8212: NO), the control unit 60 transmits the unused link notification frame through the communication port having currently received this notification frame showing success in selection (step S8213). Then, the control unit 60 stores the information of the communication port having currently received this notification frame showing success in selection, in association with the unused link (step S8214), and returns the procedure to the step S523 shown by the flowchart of FIG. 31. Therefore, it is possible to prevent endless loop like transmission of the same notification frame showing success in selection.

Through the procedures shown by the flowcharts of FIG. 31 and FIG. 32, a logical tree is created on the basis of the communication port having received the notification frame showing success in selection and the frame useful life information (hop count), and a proper transmission path is selected.

Figure 33:
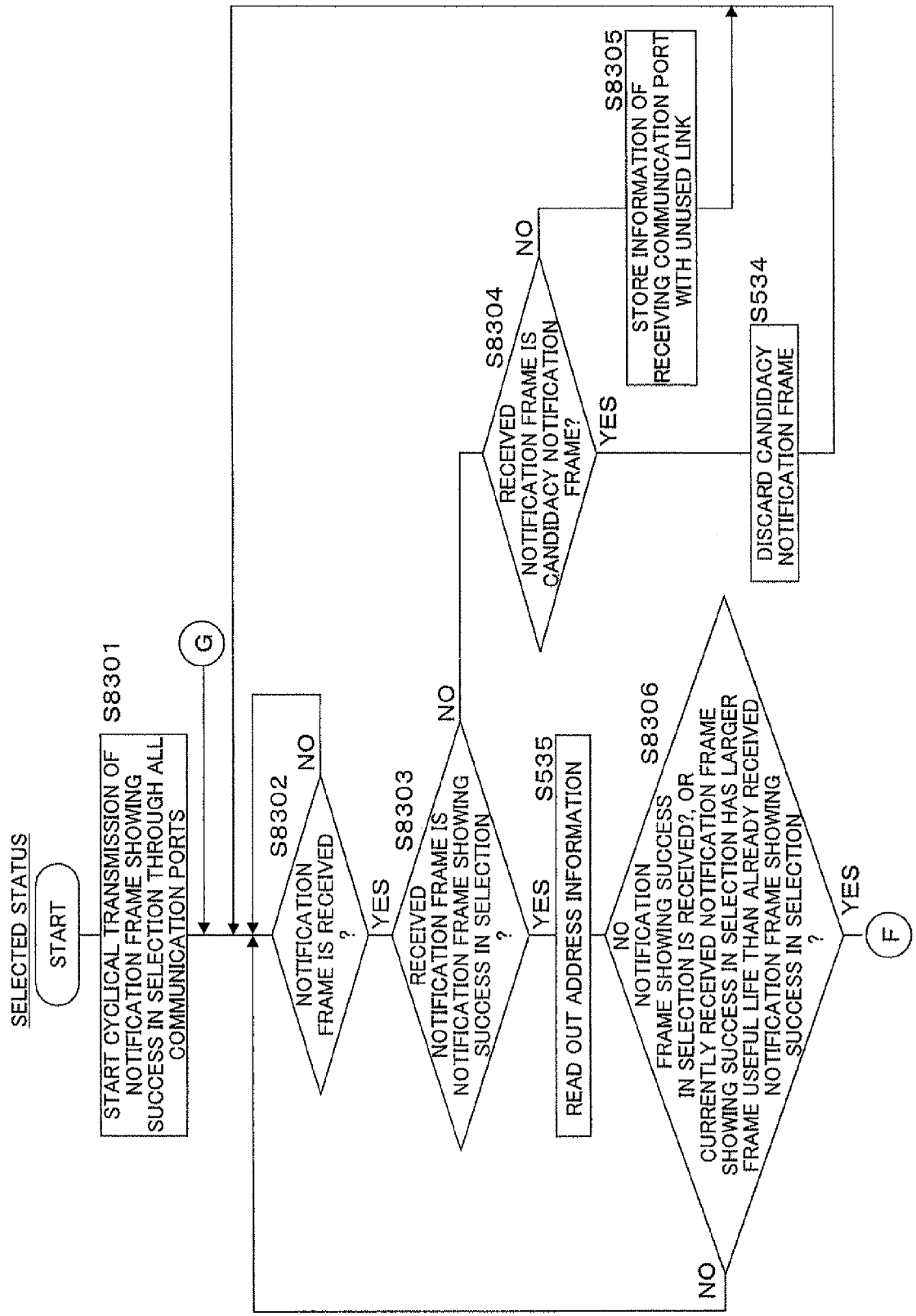
FIG. 33 is a flowchart showing an example of a procedure performed by the control unit of the GW apparatus, included in the communication system mounted on the motor vehicle according to the embodiment 5, which is selected as the distribution apparatus.
Figure 34:
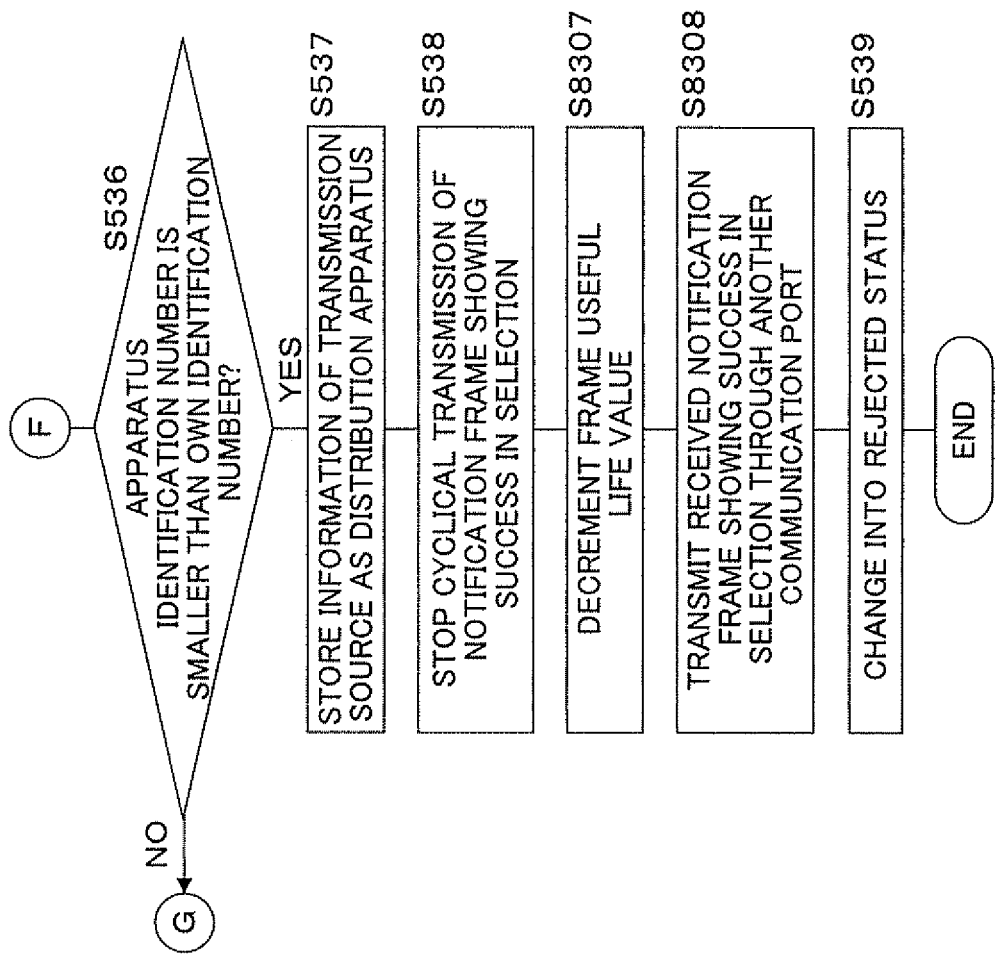
FIG. 34 is a flowchart showing an example of a procedure performed by the control unit of the GW apparatus, included in the communication system mounted on the motor vehicle according to the embodiment 5, which is selected as the distribution apparatus.

FIG. 33 and FIG. 34 are flowcharts showing examples of procedures performed by the control unit 60 of the GW apparatus 6a in the selected status, included in the communication system mounted on the motor vehicle according to the embodiment 5, which is selected as the distribution apparatus. It will not be described in detail about the processes of the embodiment 5 common to those of the embodiment 3 shown by the flowchart of FIG. 20, while the same step numerals are given to the common processes in the following description.

When having changed into the selected status, the control unit 60 starts cyclical transmission of the notification frame showing success in selection through all the communication ports of the trunk line communication unit 63 (S 8301). The control unit 60 determines whether the control unit 60 has received a notification frame, such as the notification frame showing success in selection and the candidacy notification frame, or not (step S8302). When having determined that the control unit 60 has not received any notification frame yet (S8302: NO), the control unit 60 returns the procedure to the step S8302.

When having determined that the control unit 60 has received a notification frame (S8302: YES), the control unit 60 determines whether the received notification frame is a notification frame showing success in selection or not (S8303). When having determined that the received notification frame is not the notification frame showing success in selection (S8303: NO), the control unit 60 determines whether the received notification frame is a candidacy notification frame or not (step S8304). When having determined that the received notification frame is the candidacy notification frame (S8304: YES), the control unit 60 discards the received candidacy notification frame (S534), returns the procedure to the step S8302, and waits until having determined that the control unit 60 received another notification frame.

When having determined that the received notification frame is not the candidacy notification frame (S8304: NO), the received notification frame is the unused link notification frame. Thus, the control unit 60 stores, in association with the unused link on the storage unit 61, the information of the communication port having received this unused link notification frame (step S8305), and returns the procedure to the step S8302.

When having determined that the received notification frame is the notification frame showing success in selection (S8303: YES), the control unit 60 reads out address information contained in the notification frame showing success in selection (S535), and determines whether the control unit 60 has already received a notification frame showing success in selection from a transmission source apparatus indicated by the read address information or not, or whether the frame useful life value of the currently received notification frame showing success in selection is larger than the frame useful life information of the already received notification frame showing success in selection (step S8306).

When having determined that the control unit 60 has already received the notification frame showing success in selection from a transmission source apparatus indicated by the read address information and that the frame useful life value of the currently received notification frame showing success in selection is not larger than the frame useful life information of the already received notification frame showing success in selection (S8306: NO), the control unit 60 returns the procedure to the step S8302. Therefore, it is possible to prevent endless loop like transmission of the same notification frame showing success in selection.

When having determined that the control unit 60 has not received a notification frame showing success in selection from a transmission source apparatus indicated by the read address information or that the frame useful life value of the currently received notification frame showing success in selection is larger than the frame useful life value of the already received notification frame showing success in selection (S8306: YES), the control unit 60 proceeds the procedure to the step S536. When having determined that own apparatus identification number, i.e., the apparatus identification number of the GW apparatus 6a is larger than the apparatus identification number of the transmission source of the notification frame showing success in selection (S536: YES), the control unit 60 stops the cyclical transmission of the notification frame showing success in selection (S538) and then decrements the frame useful life value of the notification frame showing success in selection having received from another apparatus at the step S8302 in order to further transmit to another apparatus (step S8307). Next, the control unit 60 transmits the notification frame showing success in selection provided with the decremented frame useful life value, through another communication port that has not received this notification frame showing success in selection at the step S8302, toward another apparatus 6b, 6c, 6d, 6e (step S8308), changes into the rejected status (S539) and terminates the procedure performed at the selected state.

In the communication system mounted on the motor vehicle according to the embodiment 5, for example, one millisecond is utilized for the transmission cycle of the candidacy notification frame started at the step S8102 shown by the flowchart of FIG. 29 and for the transmission cycle of the notification frame showing success in selection at the step S8301 shown by the flowchart of FIG. 33. Five milliseconds are utilized for the predetermined time at the step S5102 shown by the flowchart of FIG. 29 and for the predetermined time at the step S521 shown by the flowchart of FIG. 31. Thus, a GW apparatus can be selected as the distribution apparatus among the GW apparatuses 6a, 6b, 6c, 6d, 6e, five milliseconds after all apparatuses starts activation at the same time.

As described in the embodiment 3, it may be configured in the embodiment 5 that the notification frame showing success in selection is not discriminated from the candidacy notification frame with utilizing one GW apparatus, for example, the GW apparatus 6b preferably selected as the distribution apparatus among the GW apparatuses. In such configurations, the control unit 60 in the unselected status changes into the rejected status, when having not received a notification frame yet or having received a candidacy notification frame or a notification frame showing success in selection whose frame useful life value is larger than old one but whose transmission source apparatus identification number is smaller than own apparatus identification number. In addition, the control unit 60 in the selected status changes into the rejected status without discarding received candidacy notification frame, when having not received a notification frame yet or having received a candidacy notification frame or a notification frame showing success in selection whose frame useful life value is larger than old one but whose transmission source apparatus identification number is smaller than own apparatus identification number.

Figure 35:
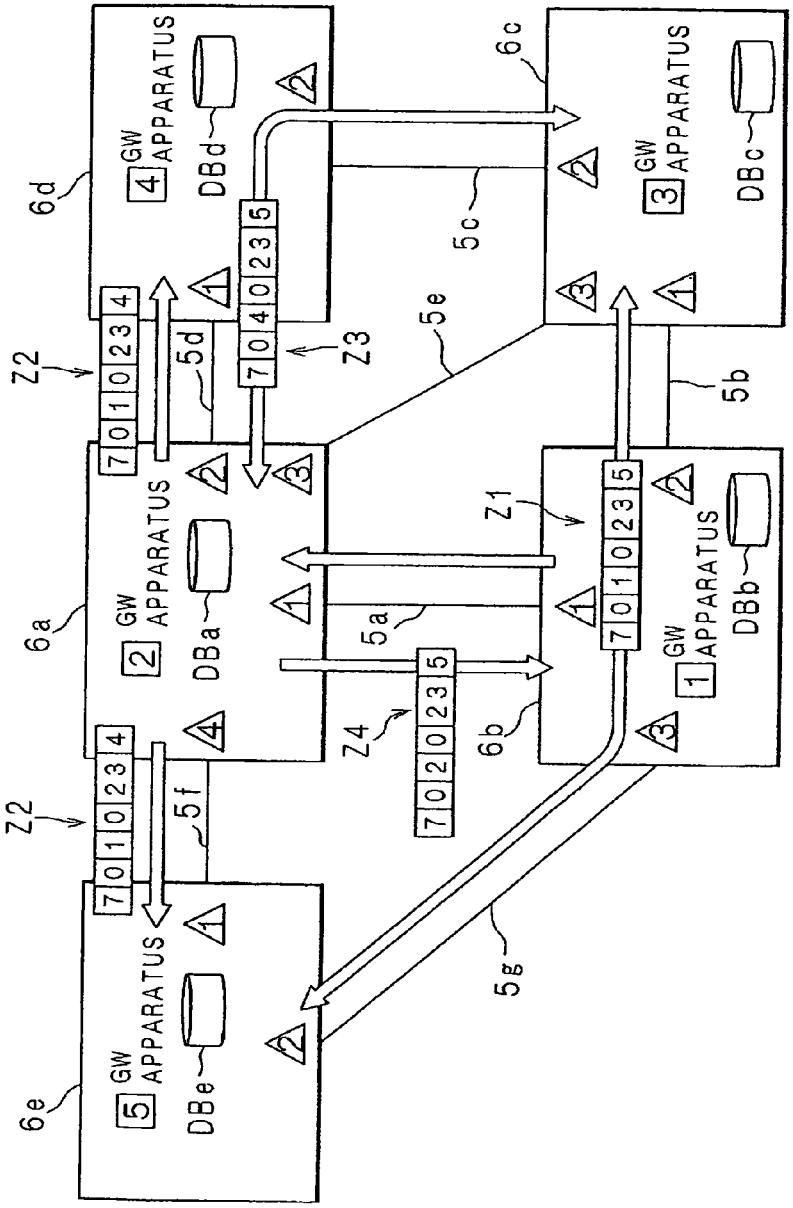
FIG. 35 is a schematic view showing an example of a selection that any one of GW apparatuses, included in the communication system mounted on the motor vehicle according to the embodiment 5, is selected as the distribution apparatus.
Figure 36:
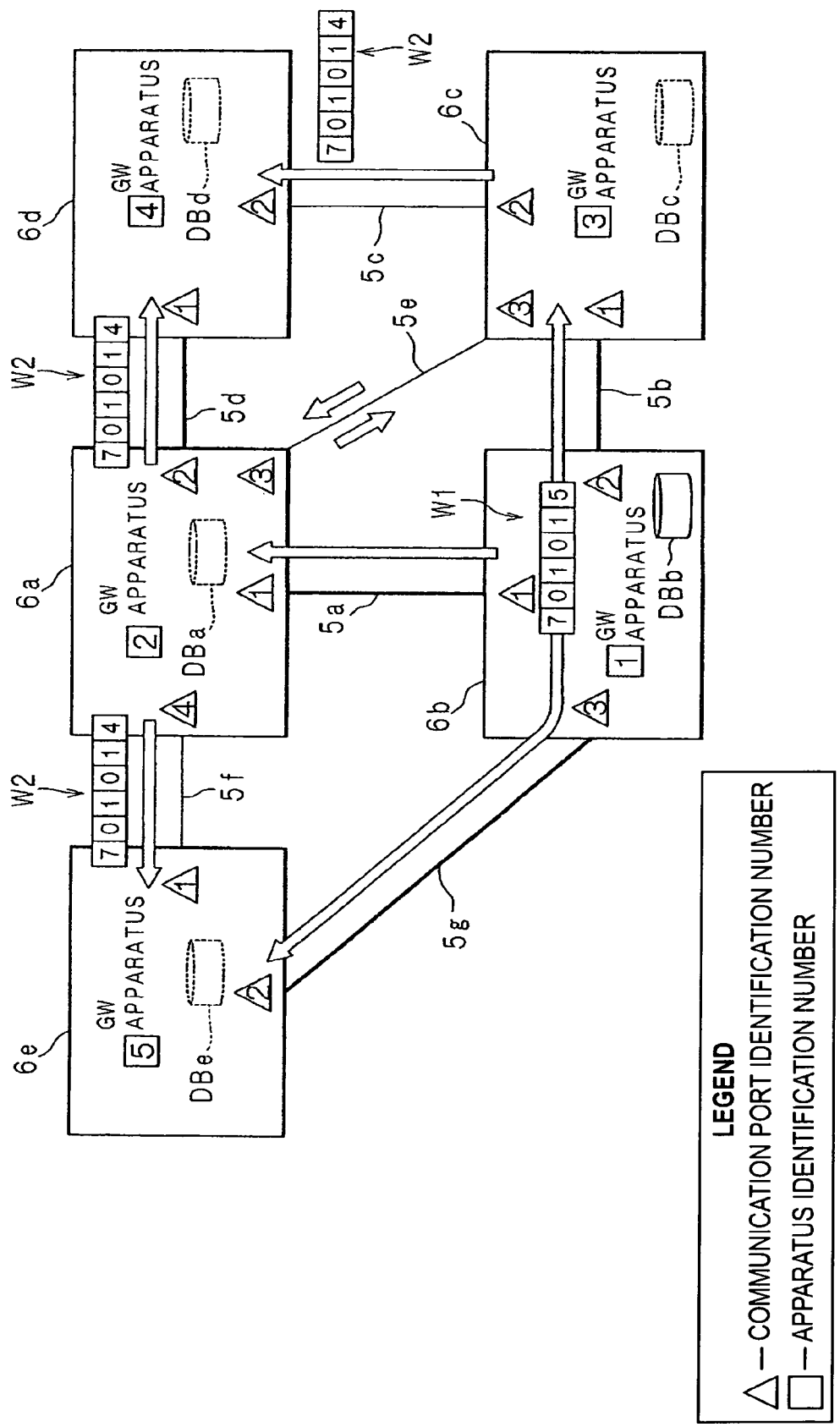
FIG. 36 is a schematic view showing an example of a selection that any one of GW apparatuses, included in the communication system mounted on the motor vehicle according to the embodiment 5, is selected as the distribution apparatus.

Next, it will be described in reference to schematic views of FIG. 35 and FIG. 36 about the procedure to select a specific GW apparatus as the distribution apparatus through the processes shown in the flowcharts of FIG. 29 to FIG. 34 performed by the control unit 60 of the GW apparatus 6a, 6b, 6c, 6d, 6e. FIG. 35 and FIG. 36 are schematic views showing examples of selections that any one of GW apparatuses 6a, 6b, 6c, 6d, 6e, included in the communication system mounted on the motor vehicle according to the embodiment 5, is selected as the distribution apparatus. Each apparatus is illustrated by a block in the schematic views of FIG. 35 and FIG. 36. ECUs 1 and the branch lines 2a, 2b, 2c, 2d, 2e, 2f, 2g, 2h, 2i, 2j are not shown in FIG. 35 and FIG. 36. In FIG. 35 and FIG. 36, a number is boxed by a square in a block illustrating the GW apparatus 6a, 6b, 6c, 6d, 6e. The boxed number represents an apparatus identification number. A number surrounded by a triangle represents a communication port identification number corresponding to each of the branch lines 2a, 2b, 2c, 2d, 2e, 2f in the trunk line communication unit 63.

The schematic view of FIG. 35 illustrates examples of contents and flows of a candidacy notification frame transmitted from each apparatus. In FIG. 35, a Z1 represents examples of the candidacy notification frame that is cyclically transmitted from the GW apparatus 6b, and a hollow arrow represents flows of the candidacy notification frame. The candidacy notification frame Z1 is composed of, for example, "7" "0" "1" "0" "23" "5" as shown by the examples of contents in FIG. 35, which is transmitted from the GW apparatus 6b. The frame Z1 has numbers "7" "0" "1" "0" from the first to forth, similarly to address information in the unicast transmission (see FIG. 4A). Thus, broad cast transmission is performed for the candidacy notification frame Z1 with the GW apparatus 6b being set as the transmission source and with all the apparatuses being set as the transmission destination. The frame Z1 may be configured to have numbers "1" "7" "0" "1" "0", although the first number of the address information represents the transmission destination in the case of multicast transmission. The fifth number "23" is a serial number for discriminating old and new frames, and the sixth number "5" is the frame useful life value.

The control unit 60 of the GW apparatus 6a, 6c, 6e, adjacent to the GW apparatus 6b, receives the candidacy notification frame Z1. When having received, the control unit 60 of the GW apparatus 6a, 6c, 6e reads out address information and detects "1" as the transmission source identification number. When having determined that the control unit 60 of the GW apparatus 6a, 6c, 6e did not receive a candidacy notification frame from the GW apparatus 6b whose identification number is "1", the control unit 60 of the GW apparatus 6a, 6c, 6e decrements the frame useful life value of the received candidacy notification frame and transmits the received candidacy notification frame provided with the decremented frame useful life value toward another apparatus. At that time, the control unit 60 of the GW apparatus 6a, 6e, 6e determines that the received candidacy notification frame has the apparatus identification number smaller than own apparatus identification number, because own apparatus identification number of the GW apparatus 6a is "2", own apparatus identification number of the GW apparatus 6c is "3", and own apparatus identification number of the GW apparatus 6e is "5", but the apparatus identification number "1" is indicated by the address information being read out from the candidacy notification frame Z1. The control unit 60 of the GW apparatus 6a, 6c, 6e changes into the rejected status, and stops transmitting the candidacy notification frame.

When having received the candidacy notification frame Z1 through the communication port "1", the control unit of the GW apparatus 6a transmits the candidacy notification frame Z2 provided with the decremented frame useful life value, through the communication ports "2", "3" and "4" but not through the communication port "1" having received the candidacy notification frame Z1. The control unit 60 of the GW apparatus 6c, 6e has already changed into the rejected status, because having received the candidacy notification frame Z1. Thus, the control unit 60 of the GW apparatus 6c, 6e does not perform processes in response to the reception of the candidacy notification frame Z2. When having received the candidacy notification frame Z2 from the GW apparatus 6a, the control unit 60 of the GW apparatus 6d determines that the apparatus identification "1" of the frame Z2 is smaller than own identification number "4". Thus, the control unit 60 of the GW apparatus 6d changes into the rejected status and stops transmitting the candidacy notification frame. However, it is considered that the control unit 60 of the GW apparatus 6d should have already received candidacy notification frame from the adjacent GW apparatus 6a, 6c, and should have determined that the apparatus identification numbers "2" and "3" of the frame from the GW apparatuses 6a, 6c are smaller than own apparatus identification number "4". Thus, the control unit 60 of the GW apparatus 6d may have changed into the rejected status and have stopped transmitting the candidacy notification frame, already. It should be noted that FIG. 35 does not show the candidacy notification frame Z2 transmitted through the communication port "3" of the GW apparatus 6a.

The control unit 60 of the GW apparatus 6d transmits the candidacy notification frame Z3 through the communication port "1" and through the communication port "2", before changing into the rejected status. The frame Z3 transmitted from the GW apparatus 6d is configured with "7" "0" "4" "0" "23" "5", as shown by the examples of contents in FIG. 35. The transmitted frame Z3 is received by the control unit 60 of the adjacent GW apparatus 6a, 6c. In the case that the control unit 60 of the GW apparatus 6a, 6c is in the unselected status about the distribution apparatus without changing into the rejected status at the time of receiving the frame Z3, the control unit 60 of the GW apparatus 6a, 6c determines that the transmission source apparatus identification number "4" of the frame Z3 is larger than own identification number "2", "3", discards the frame Z3, and keeps cyclically transmitting the candidacy notification frame.

The control unit 60 of the GW apparatus 6a transmits the candidacy notification frame Z4 through the communication port "1", through the communication port "2", through the communication port "3" and through the communication port "4", before changing into the rejected status. The frame Z4 transmitted from the GW apparatus 6a is configured with "7" "0" "2" "0" "23" "5", as shown by the examples of contents in FIG. 35. The transmitted frame Z4 is received by the control unit 60 of the adjacent GW apparatus 6b, 6c, 6d, 6e. The control unit 60 of the GW apparatus 6b determines that the transmission source apparatus identification number "2" of the frame Z4 is larger than own identification number "1", discards the frame Z4, and keeps cyclically transmitting the candidacy notification frame.

When a predetermined time passed, the control unit 60 of the GW apparatus 6a, 6c, 6d, 6e has changed into the rejected status. However, the control unit 60 of the GW apparatus 6b is still in the unselected status and keeps cyclically transmitting the candidacy notification frame Z1. When having determined that a predetermined time passed, the control unit 60 of the GW apparatus 6b changes into the selected status because receiving no notification frame showing success in selection from the other GW apparatuses 6a, 6c, 6d, 6e. Therefore, it is possible to automatically select the GW apparatus 6b as the distribution apparatus.

The schematic view of FIG. 36 illustrates the examples of contents and flows of the notification frame showing success in selection transmitted from the GW apparatus 6b selected as the distribution apparatus. The GW apparatus 6a working as the distribution apparatus includes the database DBb of the storage unit 61 illustrated with solid line, and the unselected GW apparatus 6a, 6c, 6d, 6e includes the database DBa, DBc, DBd, DBe illustrated with broken line. The control unit 60 of the GW apparatus 6a, 6c, 6d, 6e in the rejected status starts the procedure shown by the flowchart of FIG. 31, and waits with all the communication port in listening status.

Because having been selected as the distribution apparatus, the GW apparatus 6b changes into the selected status and cyclically transmits the notification frame showing success in selection through all communication ports of own trunk line communication unit 63. In FIG. 36, a W1 represents examples of contents of the notification frame showing success in selection that is transmitted from the control unit 60 of the GW apparatus 6b, and a hollow arrow represents flows of the notification frame. The notification frame showing success in selection W1 is composed of for example, "7" "0" "1" "0" "1" "5" as shown in FIG. 36. The frame W1 has numbers "7" "0" "1" "0" from the first to forth, similarly to address information in the unicast transmission. Thus, broadcast transmission is performed for the notification frame showing success in selection Z1 with the GW apparatus 6b being set as the transmission source and with all the apparatuses being set as the transmission destination (in the case of 3 bits apparatus identification number, total bits is 1(111b), i.e., "7"). The fifth number "1" is a serial number for discriminating old and new frames, and the sixth number "5" is the frame useful life value.

The control unit 60 of the GW apparatus 6a, 6c, 6e, connected to the GW apparatus 6b through the trunk line 5a, 5b, 5g, receives the notification frame showing success in selection W1 through the communication port being set in the listening status. The control unit 60 stores or has already stored, as the identification number of the apparatus that works as the distribution apparatus, the apparatus identification number "1" of the transmission source contained in the frame W1. As having not received a notification frame showing success in selection W1 previously, the control unit 60 of the GW apparatus 6a associates the communication port "1" having currently received the notification frame showing success in selection W1 with the root side link, the GW apparatus 6c associates the communication port "1" with the root side link, and the GW apparatus 6e associates the communication port "2" with the root side link. Thus, the trunk lines 5a, 5b, 5g are selected as the transmission path, as shown by bold line in FIG. 36. Then, the control unit 60 of the GW apparatus 6a, 6c, 6e decrements the frame useful life value of the notification frame showing success in selection W1 for creating the notification frame showing success in selection W2 and transmits the created frame W2 to the adjacent GW apparatus 6a, 6c, 6d, 6e. It should be noted that FIG. 36 does not show the notification frame showing success in selection W2 transmitted from the GW apparatus 6e.

The control unit 60 of the GW apparatus 6e receives, through the communication port "1" of the trunk line communication unit 63, the frame W2 transmitted from the GW apparatus 6a. However, the control unit 60 of the GW apparatus 6e has already received the frame W1, and the frame useful life value "4" of the currently received frame W2 is smaller than the frame useful life value "5" of the already received frame W1. Thus, the control unit 60 of the GW apparatus 6e discards the currently received frame W2, and associates the communication port "1" with the unused link. The control unit 60 of the GW apparatus 6e then transmits the unused link notification frame in response to the association. When having received this unused link notification frame through the communication port "4", the control unit 60 of the GW apparatus 6a associates the communication port "4" with the unused link. Therefore, the trunk line 5f is set to be an unused line and is not selected as the transmission path.

Similarly, the control unit 60 of the GW apparatus 6a transmits the frame W2 through the communication port "3" of the trunk line communication unit 63 toward the GW apparatus 6c and the control unit 60 of the GW apparatus 6c also transmits the frame W2 through the communication port "3" of the trunk line communication unit 63 toward the GW apparatus 6a. However, both apparatuses already have received the notification frame showing success in selection W1. Thus, both apparatuses associate own communication port "3" with the unused link. Therefore, the trunk line 5e is set to be an unused line and is not selected as the transmission path.

The control unit 60 of the GW apparatus 6d receives through the communication port "1" the frame W2 transmitted from the GW apparatus 6a, and further receives through the communication port "2" the frame transmitted from the GW apparatus 6c. The control unit 60 of the GW apparatus 6d may be configured to receive the frame W2 transmitted from the GW apparatus 6a earlier than the frame W2 transmitted from the GW apparatus 6c. In that configuration, the control unit 60 of the GW apparatus 6d stores the apparatus identification number "1" of the transmission source contained in the received frame W2 as the identification number of the apparatus that works as the distribution apparatus. Further, the control unit 60 of the GW apparatus 6d associates, with the root side link, the communication port "1" having received the frame W2 transmitted from the GW apparatus 6a. Although the communication port "2" has received the frame W2 transmitted later from the GW apparatus 6c, the frame useful life value of the frame W2 from the GW apparatus 6c is the same as the frame useful life information of the early received frame W2 from the GW apparatus 6a. Thus, the control unit 60 of the GW apparatus 6d associates the communication port "2" with the unused link. Therefore, it is possible to select the trunk line 5d but not the trunk line 5c as the transmission path and to make the trunk line 5c be an unused line.

As described above, the control unit 60 of the GW apparatus 6b is selected to work as the distribution apparatus and then transmits the notification frame showing success in selection. Thus, the other apparatuses 6a, 6c, 6d, 6e receive the notification frame showing success in selection, and detect on the basis of the stored apparatus identification number that the GW apparatus 6b is selected as the distribution apparatus. At the same time, the control unit 60 of the GW apparatus 6a, 6c, 6d, 6e can select a proper transmission path that sets the GW apparatus to be the root, in accordance with the connection configuration of the GW apparatus 6b working as the distribution apparatus.

As described above, it is configured that a GW apparatus can be dynamically selected as the specific GW apparatus working as the distribution apparatus. Therefore, it is possible to set a proper position of the distribution apparatus being the root, in response to various connection configurations of the ECUs, 1, 1, . . . and the GW apparatuses 6a, 6b, 6c, 6d, 6e. For a communication system mounted on a motor vehicle, it can be thought that the same systems are mounted on various motor vehicles whose types are different from one another and which have different options from one another, rather than systems having different configurations one another based on the various motor vehicles are mounted. Thus, the same systems may be configured to work even on the various motor vehicles, in order to implements ex-post modification of the configuration of the same systems such as during manufacturing stage and on sale. Hence, it is possible to set the distribution apparatus at the proper position in response to the ex-post diverse change of the connection configuration, as shown in the embodiment 5. Therefore, a system can work properly even when being mounted on various types of motor vehicles having different options from one another.
(Embodiment 6)

In the Embodiment 5, it is not Mentioned Whether or not the control unit 60 of the GW apparatus 6b determines a communication port, among the communication ports "1", "2", and "3" associated with the leaf side link of the transmission path, through which a message is transmitted to an ECU 1 connected through the branch line 2h with the GW apparatus 6d. The properly selected transmission path can prevent loop like message transmission, even with the configuration that the GW apparatus 6b working as the distribution apparatus transmits a message through all the communication port associated with the leaf side link toward an ECU 1 connected with the GW apparatus 6d via the branch line 2h. However, it is desirable to determine a communication port based on a transmission destination of a message through which the message is transmitted, in order to implements more efficient message transmission and reduction of the communication load on the trunk lines 5a, 5b, 5c, 5d, 5e, 5f, 5g.

In an embodiment 6, a GW apparatus is selected to be the specific GW apparatus working as the distribution apparatus among the GW apparatuses 6a, 6b, 6c, 6d, 6e. At that time or later, the control unit 60 of the GW apparatus 6a, 6b, 6c, 6d, 6e learns relationships between the identification numbers of apparatuses and the identification numbers of communication ports of the trunk line communication unit 63, on the basis of message reception condition indicating through which communication port of the trunk line communication unit 63 a message is received or not while the message has been transmitted with address information from each apparatus.

The configurations of the communication system mounted on the motor vehicle of the embodiment 6 are common to those of the embodiment 5, except for the learning processes of the transmission path performed by the control unit 60 of the GW apparatus 6a, 6b, 6c, 6d, 6e. Thus, it is not described in detail about the common configurations. The processes of the embodiment 6 correspond to the processes performed after the GW apparatus 6b is selected, as shown in the embodiment 5, to work as the distribution apparatus. In the following description, the same numerals are utilized as those of the embodiment 5. It will be described below in reference to a flowchart about a procedure that the control unit 60 of the GW apparatus 6a, 6b, 6c, 6d, 6e stores relationships between apparatus identification numbers and communication port identification numbers and learns a transmission path.

Figure 37:
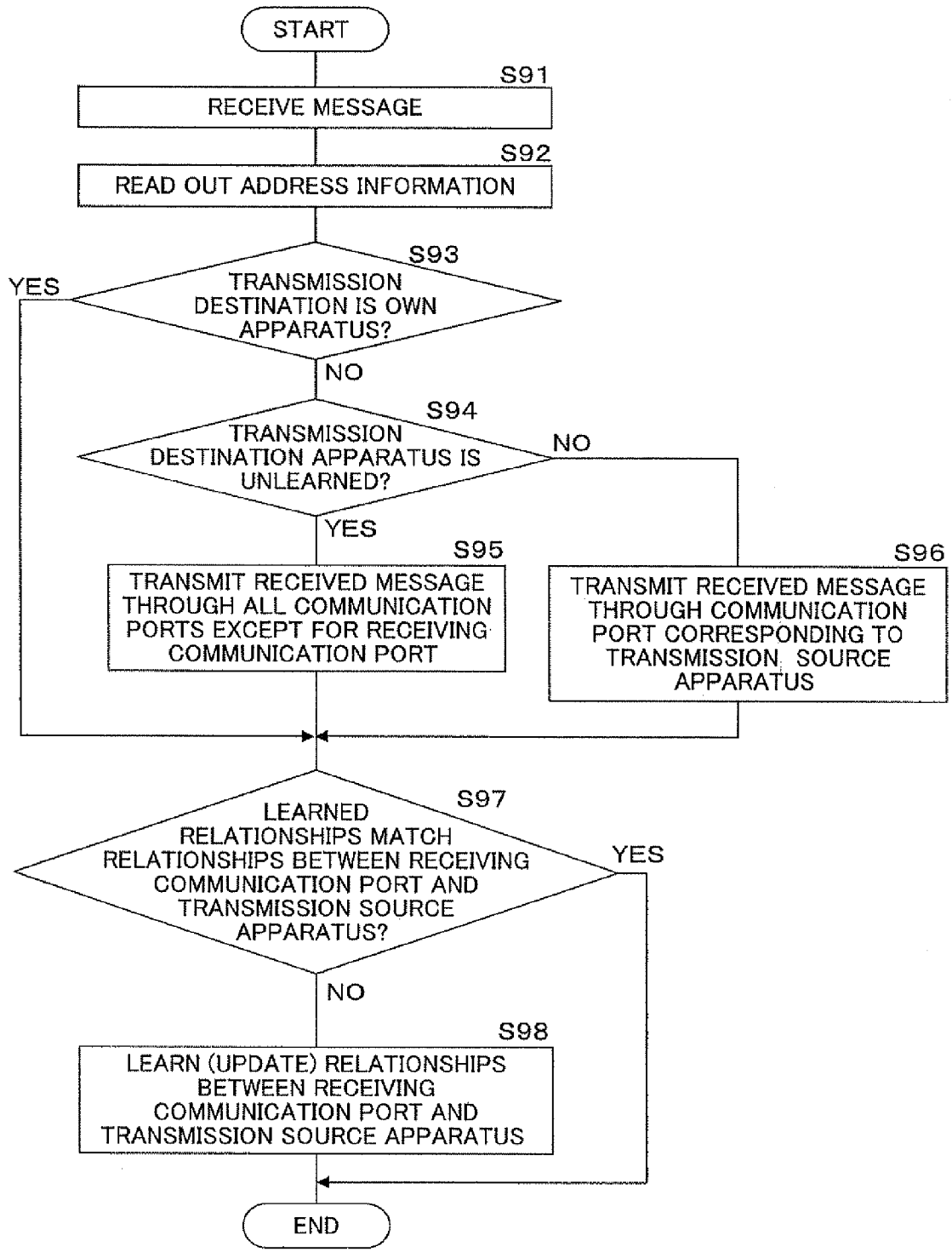
FIG. 37 is a flowchart showing an example of a learning procedure performed by the control unit of the GW apparatus included in the communication system mounted on the motor vehicle according to the embodiment 5.

FIG. 37 is a flowchart showing an example of the learning procedure performed by the control unit 60 of the GW apparatus 6a included in the communication system mounted on the motor vehicle according to the embodiment 5. The control unit 60 of the GW apparatus 6b, 6c, 6d, 6e also learns with a procedure similar to the procedure described below. Thus, it will not be described in detail about the procedure performed by the control unit 60 of the GW apparatus 6b, 6c, 6d, 6e.

The control unit 60 receives a message through the trunk line communication unit 63 (step S91), and reads out address information provided on the message (step S92). The control unit 60 determines whether the read address information has an apparatus identification number of the transmission destination that indicates own apparatus, i.e., the GW apparatus 6a or not (step S93). When having determined that the read address information has an apparatus identification number of the transmission destination that indicates own apparatus (S93:YES), the control unit 60 performs a process in response to the determination, and proceeds the procedure to the step S97 described later.

When having determined that the read address information has an apparatus identification number of the transmission destination that does not indicate own apparatus (S93: NO), the control unit 60 determines whether the control unit 60 has not learned yet an identification number of a communication port corresponding to an apparatus identification number of the transmission destination (step S94). When having determined that the control unit 60 has not learned yet (S94:YES), the control unit 60 transmits, through all the communication port except for the communication port having received the message at the step S91, the message received at the step S91 (step S95), and proceeds the procedure to the step S97 described later.

When having determined that the control unit 60 has already learned (S94: NO), the control unit 60 transmits, through the communication port whose identification number corresponds to the apparatus identification number of the transmission destination, the message received at the step S91 (step S96), and proceeds the procedure to the step S97.

Next, the control unit 60 determines whether the learned relationships match the relationships between the identification number of the communication port having received the message at the step S91 and the apparatus identification number of the transmission source indicated by the address information provided with the message having been read out at the step S92 or not (step S97). The control unit 60 determines at the step S97 that the learned relationships do not match, in the case that the control unit 60 has not learned about the identification number of the communication port having received a message and the apparatus identification number of the transmission source.

When having determined that the learned relationships do not match (S97: NO), the control unit 60 stores on the storage unit 61 the relationship between the identification number of the communication port having received the message and the apparatus identification number of the transmission source, through updating, modifying or learning in the case before having learned (step S98), and terminates the learning procedure. When having determined at the step S97 that the learned relationships match (S97: YES), the control unit 60 directly terminates the learning procedure.

Next, it will be more specifically described about an embodiment that the control unit 60 of the GW apparatus 6a, 6b, 6c, 6d, 6e performs the learning procedure shown by the flowchart of FIG. 37 and a message is properly transmitted on the basis of the address information even with the switch topology connection configuration of the trunk lines 5a, 5b, 5c, 5d, 5e, 5f, 5g. Assume that the message transmission corresponds to the multicast transmission.

Figure 39:
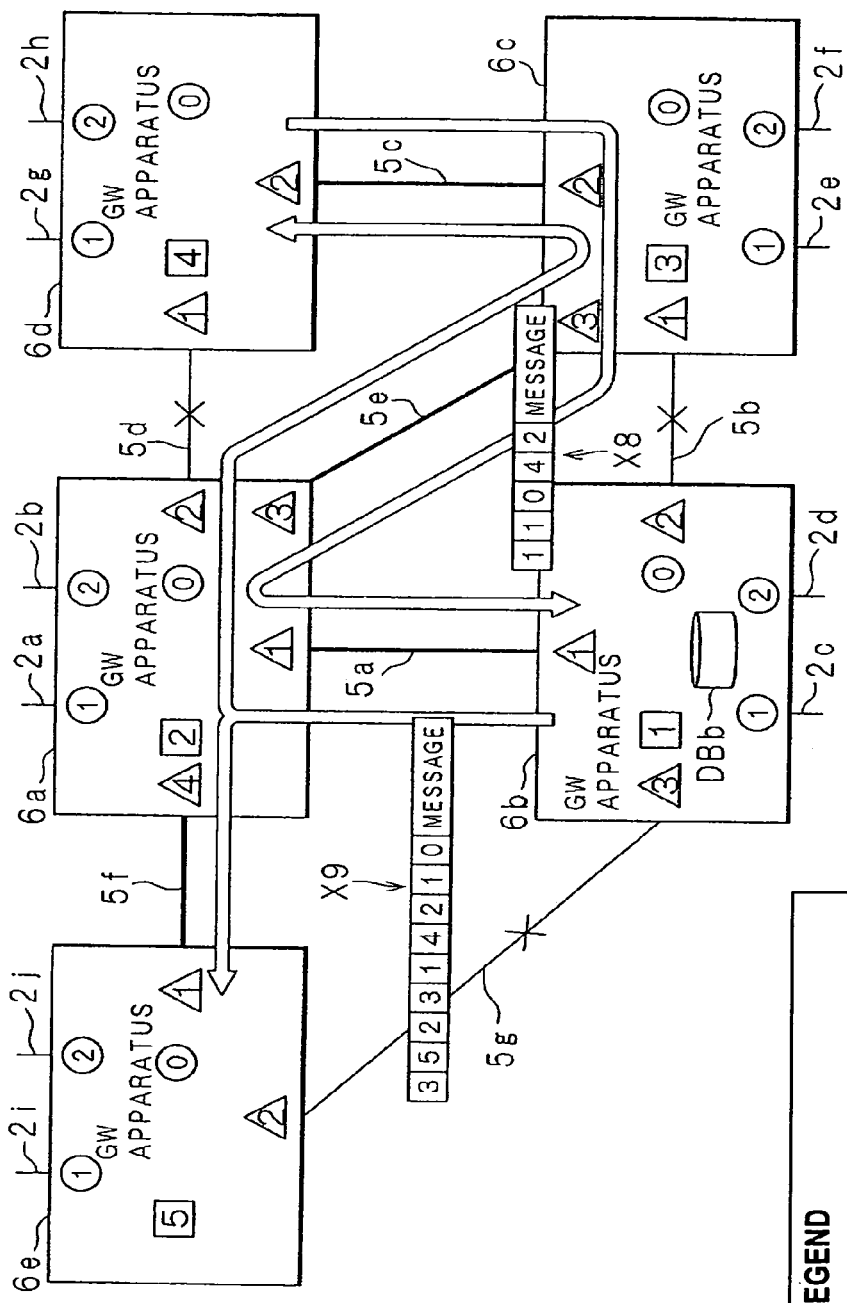
FIG. 39 is a schematic view showing an example of contents and flows of message transmitted in the communication system mounted on the motor vehicle according to the embodiment 6.

FIG. 38 and FIG. 39 are schematic views showing examples of contents and flows of message transmitted in the communication system mounted on the motor vehicle according to an embodiment 6. Each apparatus is illustrated by a block in the schematic views of FIG. 38 and FIG. 39. In FIG. 38 and FIG. 39, a number is boxed by a square in a block illustrating the GW apparatuses 6a, 6b, 6c, 6d, 6e and the distribution apparatus 4. The boxed number represents an apparatus identification number. A number surrounded by a circle represents an identification number of a communication port, corresponding to each of the branch lines 2a, 2b, 2c, 2d, 2e, 2f, 2g, 2h, 2i, 2j, of the branch line communication unit 62. A number surrounded by a triangle represents an identification number of a communication port, corresponding to each of the trunk lines 5a, 5b, 5c, 5d, 5e, 5f, 5g of the trunk line communication unit 63.

In reference to the schematic views of FIG. 38 and FIG. 39, it will be described about the learning processes among the GW apparatuses 6a, 6b, 6c, 6d, 6e. The schematic view of FIG. 38 illustrates the example of contents and flows of message transmitted by the control unit 60 of the GW apparatus 6b working as the distribution apparatus. In the schematic view of FIG. 38, the trunk lines 5a, 5b, 5d, 5f are selected as the transmission path and a hollow arrow represents a message flow. The other trunk lines 5c, 5e, 5g are not selected as the transmission path, and it is configured to associate communication ports corresponding to trunk lines 5c, 5e, 5g in the communication unit 63, with the unused link.

The GW apparatus 6b works as the distribution apparatus. When transmitting a message containing data being read out from the database DBb toward an ECU1 connected to the branch line 2g that corresponds to the communication port "1" of the GW apparatus 6d whose apparatus identification number is "4", the control unit 60 of the GW apparatus 6b adds the address information composed of "1" "4" "1" "1" "0" as shown by X5 of FIG. 38. In the address information, the first number "1" represents a number of the transmission destinations. The second number "4" and the third number "1" represent the transmission destinations, and the fourth number "1" and the fifth number "0" represent the transmission sources (see FIG. 4B). The control unit 60 of the GW apparatus 6b may transmit the message X5 through all the communication ports "1" and "2" associated with the leaf side link in the trunk line communication unit 63, in the case that the control unit 60 of the GW apparatus 6b does not learn to transmit the message X5 through the communication port "1" of the trunk line communication unit 63 when transmitting the message X5 to the GW apparatus 6d whose apparatus identification number is "4".

When having received the message X5 of FIG. 38, the control unit 60 of the GW apparatus 6a reads out address information and then determines that the apparatus identification number "4" of the transmission destination does not indicate the own apparatus, i.e., the GW apparatus 6a. Because having not learned the relationship between the apparatus identification number of the transmission destination and the identification number of the communication port of the trunk line communication unit 63, the control unit 60 of the GW apparatus 6a transmits the message X5 through all the communication ports "2" and "4" that are not associated with the unused link except for the communication port "1" having received the message X5. Furthermore, the control unit 60 of the GW apparatus 6a associates the identification number "1" of the communication port of the trunk line communication unit 63 through which the message X5 has been received and the apparatus identification number "1" of the transmission source indicated by the address information, and then learns the association as the relationship. After this learning, the control unit 60 of the GW apparatus 6a automatically transmits a message through the communication port "1", in the case that the message should be transmitted to the GW apparatus 6b whose apparatus identification number is "1".

It should be noted that the control unit 60 of the GW apparatus 6c does not transmit a message as shown by X5 of FIG. 38 even when having received the message, because the apparatus identification number of the transmission destination does not indicate the GW apparatus 6c and further the other communication ports "2" and "3" of the trunk line communication unit 63 are associated with the unused link the control unit 60 even in the case that the GW apparatus 6c has not learned yet. The control unit 60 of the GW apparatus associates the identification number "1" of the communication port of the trunk line communication unit 63 through which the message X5 has been received and the apparatus identification number "1" of the transmission source indicated by the address information, and then learns the association as the relationship.

The control unit 60 of the GW apparatus 6a transmits the message X5 through the communication port "2", and then the control unit 60 of the GW apparatus 6d receives the message X5 through the communication port "1". The control unit 60 of the GW apparatus 6d determines that the apparatus identification number of the transmission destination provided in the received message X5 indicates the GW apparatus

6d itself. The control unit 60 of the GW apparatus 6d transmits the message X5 to an ECU 1 that is connected to the branch line 2g with the communication port "1" of the branch line communication unit 62 indicated by the transmission destination of the address information. Furthermore, the control unit 60 of the GW apparatus 6d associates the identification number "1" of the communication port of the trunk line communication unit 63 through which the message X5 has been received from the GW apparatus 6a and the apparatus identification number "1" of the transmission source indicated by the address information, and then learns the association as the relationship.

The control unit 60 of the GW apparatus 6a transmits the message X5 through the communication port "4" of the trunk line communication unit 63, and then the control unit 60 of the GW apparatus 6e also receives the message X5 through the communication port "1". The control unit 60 of the GW apparatus 6e determines that the apparatus identification number of the transmission destination provided in the received message X5 does not indicate the GW apparatus 6e, associates the identification number "1" of the communication port of the trunk line communication unit 63 through which the message X5 has been received and the apparatus identification number "1" of the transmission source indicated by the address information, and then learns the association as the relationship.

The control unit 60 of the GW apparatus 6a already stores on the storage unit 61 the apparatus notification number "1" of the transmission source contained in the notification frame showing success in selection. Furthermore, the control unit 60 of the GW apparatus 6a already learns to transmit the message X5 through the communication port "1" of the trunk line communication unit 63, in the case of receiving the message X5 and transmitting the message X5 to the GW apparatus 6b whose identification number is "1". Thus, the control unit 60 of the GW apparatus 6a adds the address information as shown by the X6 of FIG. 38, in the case of receiving a message from the ECU 1 connected to the branch line 2b and transmitting this received message to the GW apparatus 6b working as the distribution apparatus. The address information at that time is configured with "1" "1" "0" "2" "2". In the address information, the first number "1" represents a number of the transmission destinations. The second number "1" and the third number "0" represent the transmission destinations, and the fourth number "2" and the fifth number "2" represent the transmission sources (see FIG. 4B).

The control unit 60 of the GW apparatus 6b receives the message X6 through the communication port "1" of the trunk line communication unit 63, and stores data contained in the received message X6 on the database DBb. Furthermore, the control unit 60 of the GW apparatus 6b associates the identification number "1" of the communication port of the trunk line communication unit 63 through which the message X6 has been received and the apparatus identification number "2" of the transmission source indicated by the address information of the message X6, and then learns the association as the relationship.

The control unit 60 of the GW apparatus 6d already stores the apparatus identification number "1" of the transmission source contained in the notification frame showing success in selection on the storage 61, and already learns the association between the identification number "1" of the communication port of the trunk line communication unit 63 and the apparatus identification number "1" in response to receiving the message X5. Thus, the control unit 60 of the GW apparatus 6d adds the address information as shown by the X7 in FIG. 38, in the case of receiving a message from the ECU 1 connected to the branch line 2h and transmitting this received message to the GW apparatus 6b working as the distribution apparatus. The address information at that time is configured with "1" "1" "0" "4" "2". In the address information, the first number "1" represents a number of the transmission destinations. The second number "1" and the third number "0" represent the transmission destinations, and the fourth number "4" and the fifth number "2" represent the transmission source (see FIG. 4B).

When having received through the communication port "2" of the trunk line communication unit 63 the message X7 transmitted from the GW apparatus 6d, the control unit 60 of the GW apparatus 6a determines that the apparatus identification number of the transmission destination does not indicate the GW apparatus 6a. The control unit 60 of the GW apparatus 6a already learns the apparatus identification number "1" of the transmission destination contained in the received message X7. Thus, the control unit 60 of the GW apparatus 6a can transmit the message X7 through the communication port "1" toward the GW apparatus 6b, but not through the communication port "4" of the trunk line communication unit 63. The control unit 60 of the GW apparatus 6a associates the identification number "2" of the communication port of the trunk line communication unit 63 through which the message X7 has been received and the apparatus identification number "4" of the transmission source indicated by the address information of the message X7, and then learns the association as the relationship.

The control unit 60 of the GW apparatus 6b stores data contained in the message X7 on the database DBb, when having received through the communication port "1" of the trunk line communication unit 63 the message X7 transmitted from the GW apparatus 6a. Furthermore, the control unit 60 of the GW apparatus 6b associates the identification number "1" of the communication port of the trunk line communication unit 63 through which the message X7 has been received and the apparatus identification number "4" of the transmission source indicated by the address information of the message X7, and then learns the association as the relationship. After this learning, the control unit 60 of the GW apparatus 6b automatically transmits a message through the communication port "1", in the case that the message should be transmitted to the GW apparatus 6d whose apparatus identification number is "4".

The schematic view of FIG. 39 illustrates the case that the transmission paths among the GW apparatuses 6a, 6b, 6c, 6d, 6e are changed from the transmission paths shown in the schematic view of FIG. 38, for example, by the disconnection of the trunk line 5d. The transmission paths of the trunk lines 5a, 5c, 5e, 5f are represented by bold line, and a message flow is represented by a hollow arrow in FIG. 39. The other trunk lines 5b, 5d, 5g are not selected as the transmission path, and the communication port of the communication unit 63 corresponding to the trunk lines 5b, 5d, 5g are associated with the unused link.

Before the transmission paths are changed, the control unit 60 of the GW apparatus 6a learns that a message should be transmitted through the communication port "2" to the GW apparatus 6d whose apparatus identification number is "4", as shown by the schematic view of FIG. 38. However, when a transmission path is automatically re-selected, the communication port "2" of the trunk line communication unit 63 of the GW apparatus is associated with the unused link and then the association is stored on the storage unit 61.

When the message X8 is transmitted from the GW apparatus 6d toward the GW apparatus 6b working as the distribution apparatus after the change of transmission path, address information "1" "1" "0" "4" "2" is provided in the message X8 as shown by the X8 of FIG. 39. The control unit 60 of the GW apparatus 6d transmits the message X8 through the communication port "2" of the trunk line communication unit 63 which is associated with the root side link after the change of transmission path. The control unit 60 of the GW apparatus 6c transmits the message X8 through the communication port "3" that is not associated with the unused link among the all communication ports except for the communication port "2" having received the message X8, in response to receiving the message X8.

The control unit of the GW apparatus 6a updates associations in response to receiving the message X8, to associate the apparatus identification number "4" of the transmission source indicated by the address information with the identification number "3" of the communication port of the trunk line communication unit 63 through which the message X8 has been received. In short, the control unit 60 of the GW apparatus 6a re-learns that a message should be transmitted through the communication port "3" of the trunk line communication unit 63 towards the GW apparatus 6d whose apparatus identification number is "4", before the following change of transmission path.

The GW apparatus 6b works as the distribution apparatus and transmits a message provided with data read out from the database DBb toward: the ECU 1 connected to the branch line 2j corresponding to the communication port "2" of the GW apparatus 6e whose apparatus identification number is "5"; the ECU 1 connected to the branch line 2e corresponding to the communication port "1" of the GW apparatus 6c whose apparatus identification number is "3"; and the ECU 1 connected to the branch line 2h corresponding to the communication port "2" of the GW apparatus 6d whose apparatus identification number is "4". For the transmission of the message described above, the control unit 60 of the GW apparatus 6b adds address information as shown by the X9 of FIG. 39 on the message. The address information at that time is configured with "3" "5" "2" "3" "1" "4" "2" "1" "0". In the address information, the first number "3" represents a number of the transmission destinations. The second number "5" and the third number "2" represent the first transmission destination, and the fourth number "3" and the fifth number "1" represent the second transmission destination, the sixth number "4" and the seventh number "2" represent the third transmission destination, and the eighth number "1" and the ninth number "0" represent the transmission source (see FIG. 4B). The control unit 60 of the GW apparatus 6b transmits the message X9 through the communication port "1" associated with the leaf side link, because the communication ports "2" and "3" of the trunk line communication unit 63 are associated with the unused link.

When having received the message X9, the control unit 60 of the GW apparatus 6a transmits the message X9 through the communication port associated to the apparatus identification number of the transmission destination, because the provided address information of the received message X9 has the apparatus identification number of the transmission destination that does not indicate the GW apparatus Ga. In the case that the communication ports associated with apparatus identification numbers of the plurality of transmission destinations are the same, the control unit 60 of the GW apparatus 6a performs one time transmission of the message X9, but not three times transmission of the message X9 based on three transmission destinations. In other words, the control unit 60 of the GW apparatus 6a transmits the message X9 through the communication port "4" associated with the apparatus identification number "5" of the first transmission destination and transmits the message X9 once through the communication port "3", because the identification number "3" of the communication port is associated through the learning processes with the apparatus identification numbers "3" and "4" of the second and third transmission destinations. The address information provided in the message may be configured to keep required address data and delete not-required address data on the basis of the message transmission destination.

When having received the message X9, the control unit 60 of the GW apparatus 6c can detect on the basis of the number of the transmission destinations indicated by the address information provided in the message X9 that there are a plurality of transmission destinations. The control unit 60 of the GW apparatus 6c determines that one of the identification numbers of the transmission destinations indicates the GW apparatus 6c, performs processes in response to the determination, and transmits the message X9 through the communication port "2" corresponding to the other apparatus identification number "4" of the transmission destination.

FIG. 40 is an explanation view showing contents about relationship stored in the storage unit 61 through the learning processes performed by the control unit 60 of the GW apparatus 6a included in the communication system mounted on the motor vehicle according to the embodiment 6. The examples of contents of the schematic view in FIG. 40A illustrates relationships between the GW apparatus 6b whose apparatus identification number "1" and the communication port "1", and the relationships are learned when the control unit 60 of the GW apparatus 6a has received the message X5 shown by the schematic view of FIG. 38. As shown in the explanation view of FIG. 40A, the relationships are further associated with available period that is counted down at a predetermined interval. Although it is not essential to associate with the available period, it is possible to invalidate older information based on the available period in the case that the connection configurations are changed by some problems as shown in the schematic view of FIG. 39.

The examples of contents of the schematic view in FIG. 40B illustrate relationships between the GW apparatus 6d whose apparatus identification number "4" and the communication port "2", and the relationships between the GW apparatus 6e whose apparatus identification number "5" and the communication port "4" and the former relationship is learned when the control unit 60 of the GW apparatus 6a has received the message X7 shown by the schematic view of FIG. 38. As shown in the explanation view of FIG. 40B, the available period is counted down in association with the relationships between the GW apparatus 6b whose apparatus identification number "1" and the communication port "1".

The examples of contents of the schematic view in FIG. 40C illustrate relationships that are learned when the control unit 60 of the GW apparatus 6a has received the message X8 shown by the schematic view of FIG. 39. As shown in the explanation view of FIG. 40C, the identification number of the communication port, corresponding to the transmission destination apparatus whose identification number is "4", is changed from "2" to "3", in response that the GW apparatus 6d whose apparatus identification number is "4" transmits the message X8 and the transmitted message X8 is received through the communication port "3" of the trunk line communication unit 63 of the GW apparatus 6a. Furthermore, it is illustrated in FIG. 40C that the available period is updated to be "5" in response to re-learning process.

The examples of contents of the schematic view in FIG. 40D illustrate relationships that are learned when the control unit 60 of the GW apparatus 6a has received the message X9 shown by the schematic view of FIG. 39. As shown in the explanation view of FIG. 40D, the available period is counted down in association with the relationships of the apparatus identification number "4" and another available period is also counted down in association with the relationships of the apparatus identification number "5", in comparison with the explanation view of FIG. 40C. On the other hand, the available period is updated to be "5" from "2" in association with the relationships of the apparatus identification number "1" in the explanation view of FIG. 40D, because the GW apparatus 6b whose apparatus identification number is "1"transmits the message X9, the transmitted message X9 is received through the communication port "1" of the trunk line communication unit 63 of the GW apparatus 6a and re-learning processes are performed.

As described above, each control unit 60 of the GW apparatuses 6a, 6b, 6c, 6d, 6e learns relationships between the apparatus identification numbers of the transmission sources and the communication ports of the trunk line communication unit 63, when a message is transmitted. Thus, it is possible to add proper address information, in response to various connection configurations, for efficient message transmissions. Therefore, it is possible to reduce the communication load on the trunk lines 5a, 5b, 5c, 5d, 5e, 5f, 5g.

In the embodiment 6, the control unit 60 of the GW apparatus 6a, 6b, 6c, 6d, 6e is illustrated to learn the relationship between the communication port identification numbers and the apparatus identification numbers, when transmitting and receiving a message. However, the control unit 60 of the GW apparatus 6a, 6b, 6c, 6d, 6ecan learn the relationship between the communication port identification numbers and the apparatus identification numbers, not only when transmitting and receiving a message, but also when transmitting and receiving a candidacy notification frame and/or a notification frame showing success in selection at the time of creating a logical tree.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A communication system that transmits data by utilizing a plurality of relay apparatuses each of which is connected to a plurality of communication apparatuses, wherein
each relay apparatus comprises:
a communication apparatus data communication unit that performs transmission of data with a connected communication apparatus;
a relay apparatus data communication unit that performs transmission of data with another relay apparatus;
a determination unit that determines whether or not the data received by the relay apparatus data communication unit is for said each relay apparatus comprising the determination unit and receiving the data;
a control unit that transmits the data received by the relay apparatus data communication unit toward the connected communication apparatus when the determination unit determines positive, and to discard the data received by the relay apparatus data communication unit when the determination unit determines negative; and
an address information additional unit that adds address information indicating a transmission destination onto the data transmitted by the relay apparatus data communication unit, and allows the determination unit to determine in accordance with the additional information added by the address information additional unit; and
one relay apparatus further comprises:
a storage unit that stores data received by the communication apparatus data communication unit and relay apparatus data communication unit of said one relay apparatus; and
a storage control unit that stores on the storage unit the data received by the relay apparatus data communication unit of said one relay apparatus, when the determination unit of said one relay apparatus determines positive,
wherein
said each relay apparatus further comprises a candidacy generation unit that generates candidacy information for declaring to be said one relay apparatus, and allows said each relay apparatus data communication unit to add said each identification information on the candidacy information generated by the candidacy generation unit and then to transmit the added candidacy information toward another relay apparatus,
said each relay apparatus further comprises:
a comparison unit that performs a comparison between the identification information added on the candidacy information generated by said each candidacy generation unit and the identification information added on the candidacy information which is generated by another relay apparatus but received by said each relay apparatus data communication unit: and
a withdrawal unit that withdraws, on the bases of the comparison performed by the comparison unit, the candidacy information generated by said each candidacy generation unit, and
a relay apparatus finally holding said each candidacy information without withdrawing becomes said one relay apparatus.

2. The communication system according to claim 1, wherein
the storage unit further stores a transmission information table that associates, with each other, apparatus identification information for identifying the plurality of communication apparatuses and data identification information for identifying data type,
when a new communication apparatus is connected and then transmits data, the storage control unit stores, on the storage unit, apparatus identification information about the new connected communication apparatus and data identification information about the new connected communication apparatus, and
the communication apparatus data communication unit and the relay apparatus data communication unit of said one relay apparatus transmit data based on the transmission information table stored by the storage unit.

3. The communication system according to claim 2, wherein
the transmission information table further associates the data identification information with transmission timing information indicating a transmission timing of data.

4. The communication system according to claim 1, wherein
said each relay apparatus further comprises a plurality of communication ports that allows said each relay apparatus data communication unit to communicate with another relay apparatus, said one relay apparatus further comprises a logical tree information unit that generates a logical tree notification utilized for selecting a transmission path of data in the communication system, the relay apparatus data communication unit of said one relay apparatus transmits the logical tree notification generated by the logical tree information unit toward another relay apparatus, and when a relay apparatus has a first communication port through which the logical tree notification having transmitted by the said one relay apparatus is firstly received and a second communication port through which the logical tree notification having transmitted by the said one relay apparatus is secondly received, the second communication port is set to be unavailable.

5. The communication system according to claim 4, wherein
the logical tree notification contains useful life information indicating useful life span for information.

6. The communication system according to claim 4, wherein
the plurality of relay apparatuses are connected in a ring topology or in a mesh topology.

7. The communication system according to claim 1, wherein
the communication system is for a motor vehicle.

8. The communication system according to claim 1, wherein
said each relay apparatus further comprises a plurality of communication ports that allows said each relay apparatus data communication unit to communicate with another relay apparatus, said one relay apparatus further comprises a logical tree information unit that generates a logical tree notification utilized for selecting a transmission path of data in the communication system, the relay apparatus data communication unit of said one relay apparatus transmits the logical tree notification generated by the logical tree information unit toward another relay apparatus, when a relay apparatus has a first communication port through which the logical tree notification having transmitted by the said one relay apparatus is firstly received and a second communication port through which the logical tree notification having transmitted by the said one relay apparatus is secondly received, the second communication port is set to be unavailable, in a case that a relay apparatus finally holding said each candidacy information becomes said one relay apparatus and then another relay apparatus newly becomes said one relay apparatus, the second communication port is changed from unavailable to available, and said another relay apparatus newly becoming said one relay apparatus transmits the logical tree notification.

9. A relay apparatus that is connected to a plurality of communication apparatuses and performs data communication with the plurality of communication apparatuses and another plurality of relay apparatuses, comprising:

a communication apparatus data communication unit that performs transmission of data with the plurality of communication apparatuses;

a relay apparatus data communication unit that performs transmission of data with said another plurality of relay apparatuses;

a determination unit that determines whether or not the data received by the relay apparatus data communication unit is for said each relay apparatus;

a control unit that transmits the data received by the relay apparatus data communication unit toward the connected communication apparatus when the determination unit determines positive, and that discards the data received by the relay apparatus data communication unit when the determination unit determines negative;

a storage unit that stores data received by the communication apparatus data communication unit and the relay apparatus data communication unit;

a storage control unit that stores on the storage unit the data received by the relay apparatus data communication unit, when the determination unit determines positive;

an address information additional unit that adds address information indicating a transmission destination onto the data transmitted by the relay apparatus data communication unit, wherein the determination unit performs the determination in accordance with the additional information added by the address information additional unit;

a candidacy generation unit that generates candidacy information for declaring to be a distribution apparatus, wherein the relay apparatus data communication unit adds said each identification information on the candidacy information generated by the candidacy generation unit and then transmits the added candidacy information toward the plurality of relay apparatuses;

a comparison unit that performs a comparison between the identification information added on the candidacy information generated by said each candidacy generation unit and the identification information added on the candidacy information which is generated by another relay apparatus but received by said each relay apparatus data communication unit; and a withdrawal unit that withdraws, on the basis of the comparison performed by the comparison unit, the candidacy information generated by said each candidacy generation unit, wherein when the relay apparatus finally holds the candidacy information without withdrawing, the relay apparatus becomes the distribution apparatus.

10. The relay apparatus according to claim 9, wherein
the storage unit further stores a transmission information table that associates, with each other, apparatus identification information for identifying the plurality of communication apparatuses and data identification information for identifying data type, when a new communication apparatus is connected and then transmits data, the storage control unit stores, on the storage unit, apparatus identification information about the new connected communication apparatus and data identification information about the new connected communication apparatus, and the communication apparatus data communication unit and the relay apparatus data communication unit transmit data based on the transmission information table stored by the storage unit.

11. The relay apparatus according to claim 10, wherein
the transmission information table further associates the data identification information with transmission timing information indicating a transmission timing of data.

12. The relay apparatus according to claim 9, wherein
the relay apparatus is for a motor vehicle.

13. The relay apparatus according to claim 9, further comprising:

a plurality of communication ports that allows the relay apparatus data communication unit to communicate with said another plurality of relay apparatuses; and a logical tree information unit that generates a logical tree notification utilized for selecting a transmission path of data, wherein when the relay apparatus becomes the distribution apparatus, the replay apparatus data communication unit transmits the logical tree notification generated by the logical tree information unit toward another relay apparatus that is connected to the relay apparatus through a communication port, when the relay apparatus, without becoming the distribution apparatus, receives a logical tree notification transmitted from said connected another relay apparatus through a first communication port and then re-receives the logical tree notification through a second communication port, the relay apparatus makes the second communication port be unavailable.

14. The relay apparatus according to claim 13, wherein when the relay apparatus newly becomes the distribution apparatus after once becoming the distribution apparatus, the logical tree information unit generates a new logical tree notification, when the relay apparatus newly becomes the distribution apparatus after never becoming the distribution apparatus, the relay apparatus changes the second communication port from unavailable to available and the logical tree information unit generates the new logical tree notification, when the relay apparatus, once becoming the distribution apparatus but not newly becoming the distribution apparatus, receives the logical tree notification transmitted from said connected another relay apparatus through the first communication port and then re-receives the logical tree notification through the second communication port, the relay apparatus makes the second communication port be unavailable, and when the relay apparatus, without newly becoming the distribution apparatus after never becoming the distribution apparatus, the relay apparatus changes the second communication port from unavailable to available, and makes the second communication port be unavailable in response to receiving the new logical tree notification transmitted from said connected another relay apparatus through the first communication port and then re-receiving the new logical tree notification through the second communication port.

15. The relay apparatus according to claim 13, wherein
the logical tree notification contains useful life information indicating useful life span for information.

16. The relay apparatus according to claim 13, wherein
the relay apparatus is connected with said another plurality of relay apparatuses in a ring topology or in a mesh topology.

* * * * *